United States Patent [19]

Nelson et al.

[11] Patent Number: 5,325,795
[45] Date of Patent: Jul. 5, 1994

[54] MOBILE MATERIAL DECONTAMINATION APPARATUS

[75] Inventors: Joseph M. Nelson, Westover Hills, Del.; Michael G. Hrubetz, Dallas, Tex.

[73] Assignee: Hrubetz Environmental Services, Inc., Dallas, Tex.

[21] Appl. No.: 841,350

[22] Filed: Feb. 25, 1992

Related U.S. Application Data

[63] Continuation-in-part of Ser. No. 667,952, Mar. 12, 1991, Pat. No. 5,261,765, which is a continuation-in-part of Ser. No. 458,084, Feb. 5, 1990, Pat. No. 5,011,329.

[51] Int. Cl.$^5$ .............................................. B09B 3/00
[52] U.S. Cl. ..................... 110/236; 110/229; 110/241; 110/242; 110/346; 110/204; 110/205; 405/128; 588/230
[58] Field of Search ............. 110/236, 242, 235, 256, 110/241, 229, 346, 204, 205; 405/128; 588/228, 230

[56] References Cited

U.S. PATENT DOCUMENTS

| | | | |
|---|---|---|---|
| 1,758,487 | 5/1930 | Warren | 110/235 |
| 3,293,863 | 12/1966 | Cox et al. | 61/36 |
| 3,807,321 | 4/1974 | Stockman | 110/236 |
| 4,348,135 | 9/1982 | St. Clair | 405/36 |
| 4,376,598 | 3/1983 | Brouns et al. | 405/258 |
| 4,469,176 | 9/1984 | Zison et al. | 166/250 |
| 4,518,399 | 5/1985 | Croskell et al. | 55/16 |
| 4,670,148 | 6/1987 | Schneider | 210/603 |
| 4,670,634 | 6/1987 | Bridges et al. | 219/10.41 |
| 4,776,409 | 10/1988 | Manchak, Jr. | 175/50 |
| 4,834,194 | 5/1989 | Manchak, Jr. | 175/50 |
| 4,838,733 | 6/1989 | Katz | 405/129 |
| 4,842,448 | 6/1989 | Koerner et al. | 405/258 |
| 4,849,360 | 7/1989 | Norris et al. | 435/264 |
| 4,850,289 | 7/1989 | Beausoleil et al. | 110/256 X |
| 4,900,196 | 2/1990 | Bridges | 405/267 |
| 4,919,570 | 4/1990 | Payne | 405/128 |
| 4,982,788 | 1/1991 | Donnelly | 166/266 |
| 5,213,445 | 5/1993 | Ikenberry et al. | 405/128 |

OTHER PUBLICATIONS

"Superfund Innovative Technology Evaluation (SITE) Program", HMCRI Conference, Nov. 28-30, 1988.
Brochure by AKI Systems, Inc. (undated).
"Performance of Selected In Situ Soil Decontamination Technologies: An Air Force Perspective", *American Institute of Chemical Engineers 1989 Summer National Meeting*, Aug. 20-23, 1989.
"Terra Vac In Situ Vacuum Extraction System-Applications Analysis Report," Jul. 1989.
"Addendum to EPA Site-004 Proposal," Jun. 6, 1989.

*Primary Examiner*—Edward G. Favors
*Attorney, Agent, or Firm*—Richards, Medlock & Andrews

[57] ABSTRACT

A technique for decontaminating material, including disposing a grid network of perforated pipes on a base, and covering the same with contaminated soil. A barrier layer is laid on the contaminated material and provided with a vent port coupled to a vapor disposal unit via a suction system. A source of heated gas is coupled to the grid system to force heated air through the contaminated soil and vaporize the contaminants. A mobile decontamination system includes an insulated container having a top lid for loading contaminated material in the container, and an insulated back door for removing decontaminated material. Apertured pipes on the container floor convey a high temperature gas to the contaminated material to vaporize the contaminants. A suction system is coupled to a vapor outlet of the container to remove vaporized contaminants. The contaminated vapors are incinerated and either discharged as a harmless gas, or recirculated to the container for providing thermal energy and further vaporizing contaminants in the material.

46 Claims, 17 Drawing Sheets

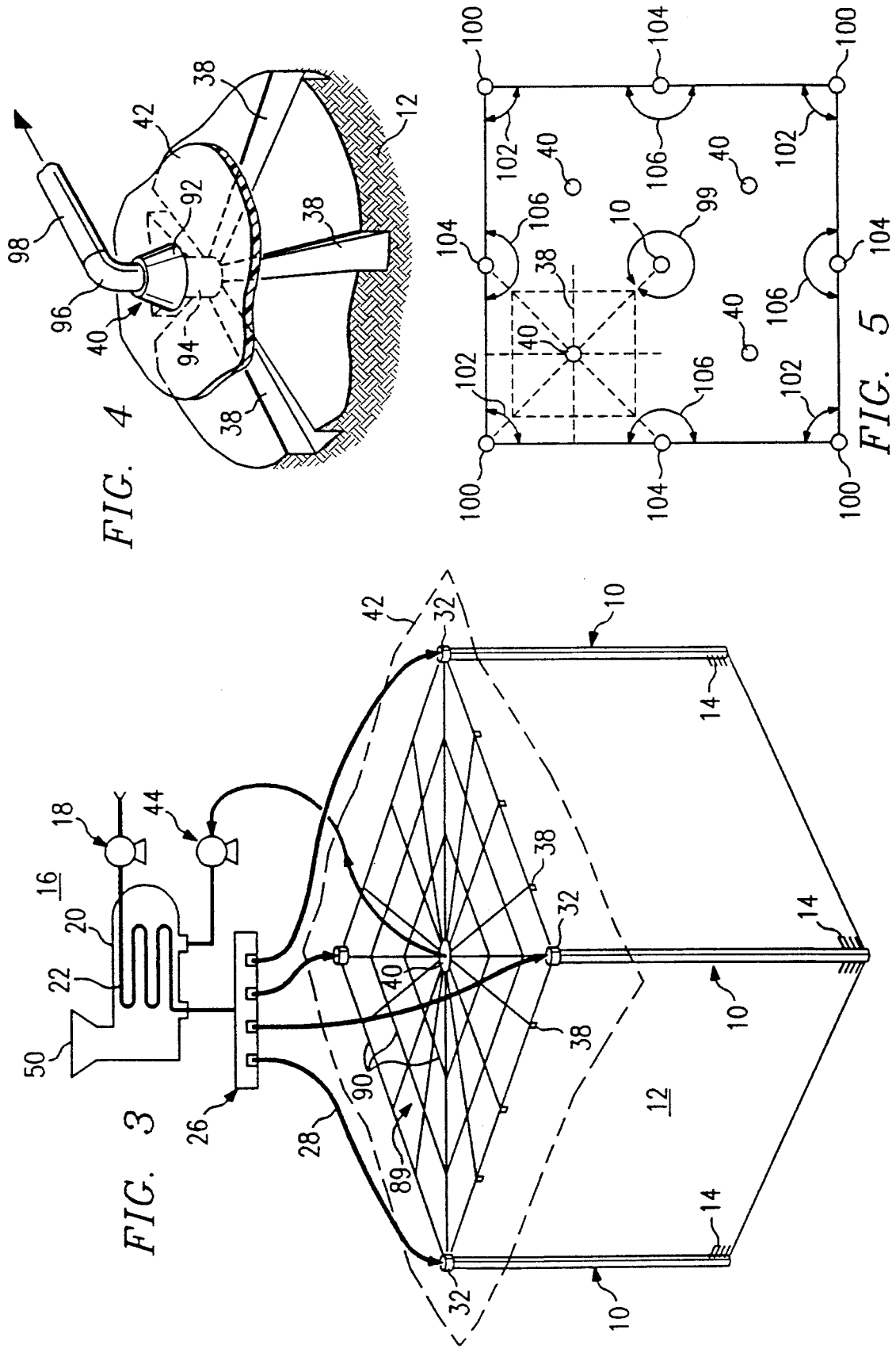

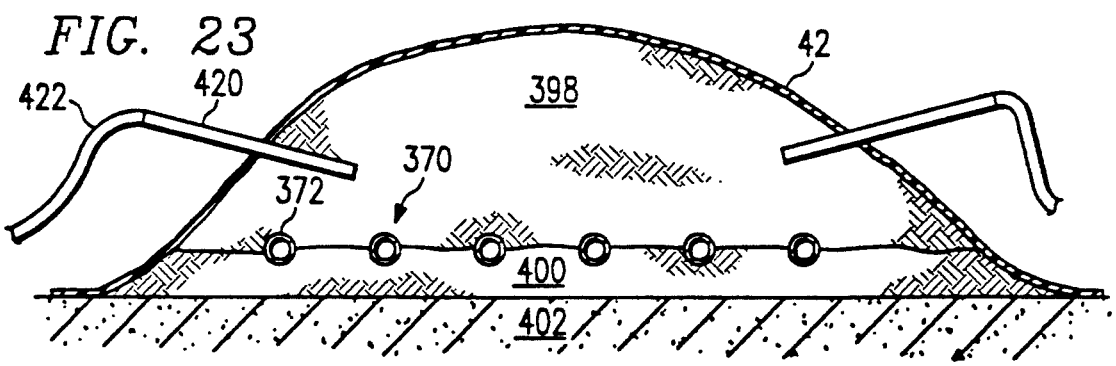
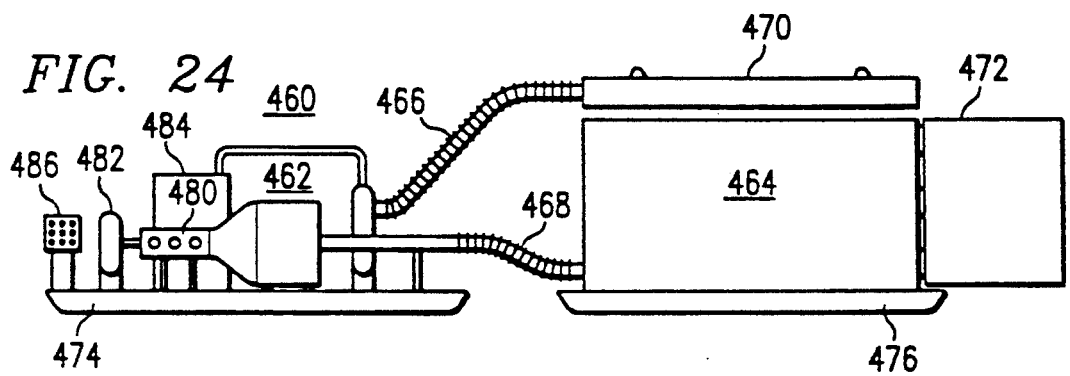
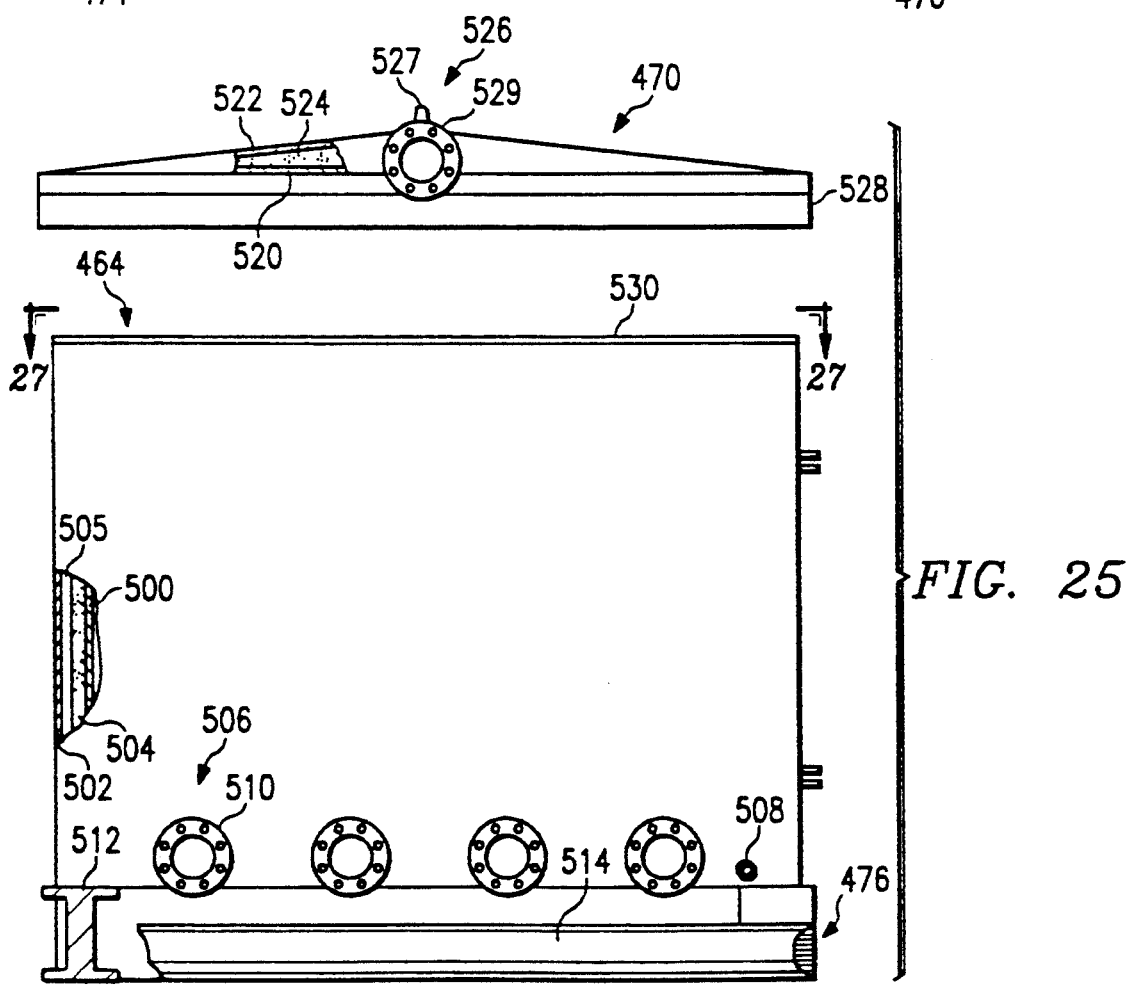

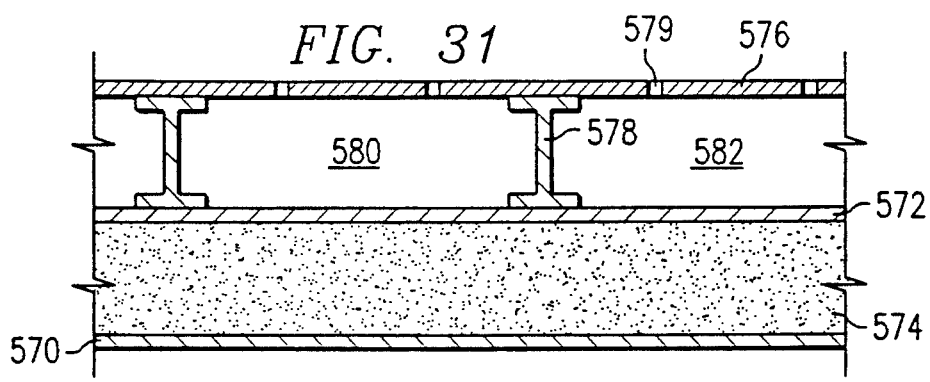
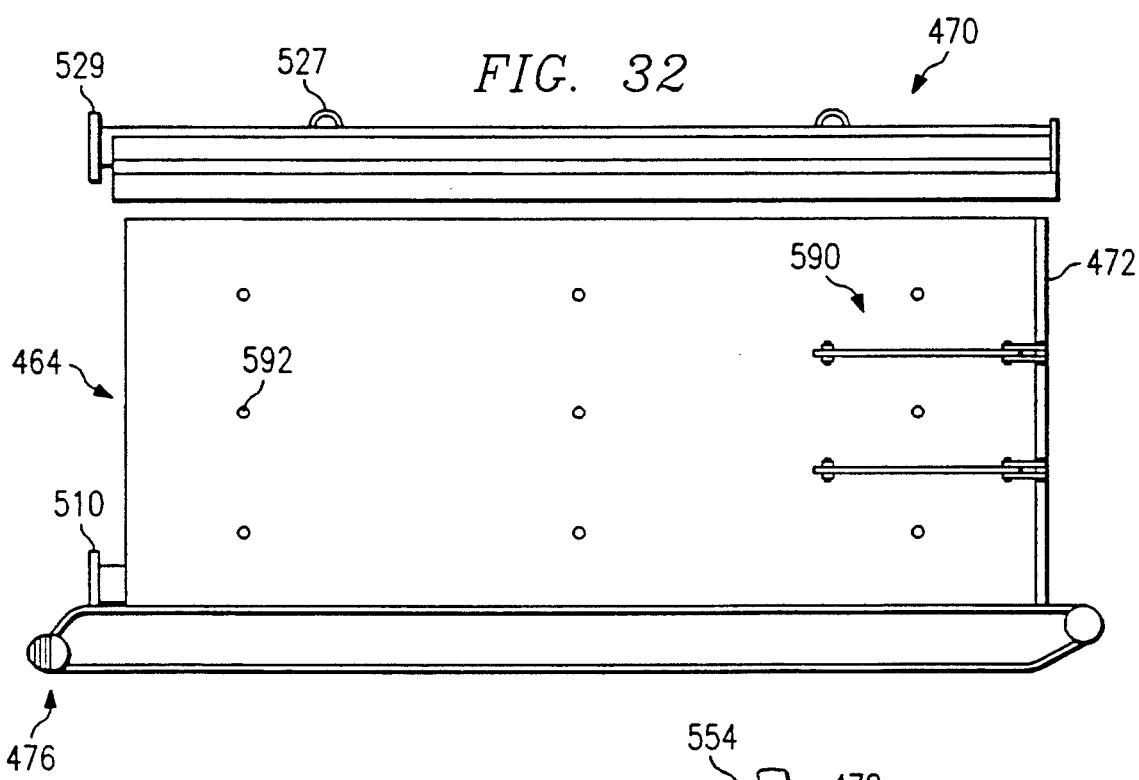
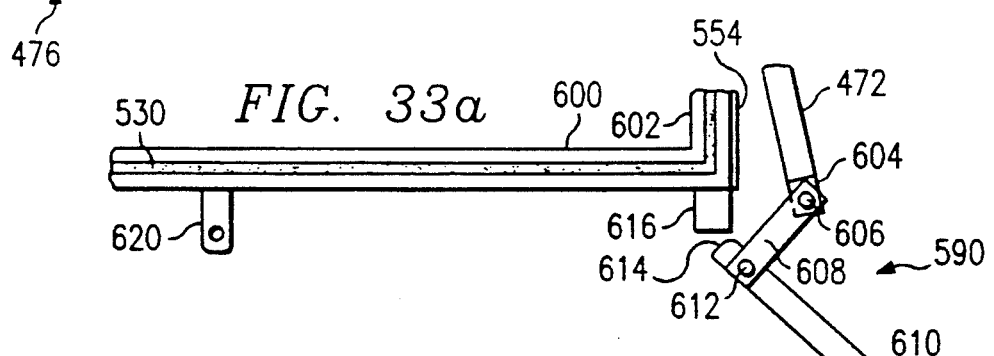
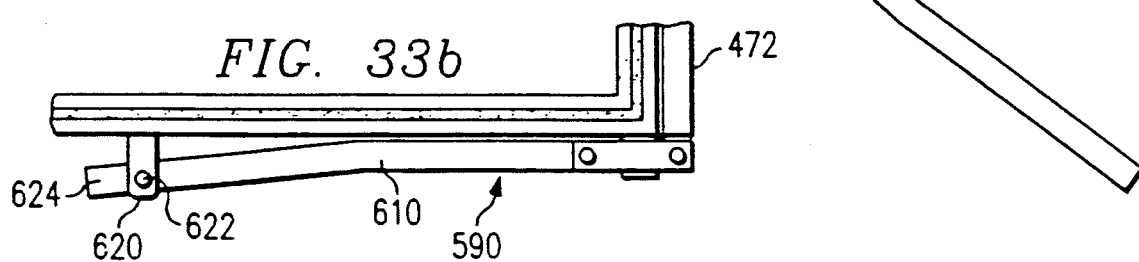

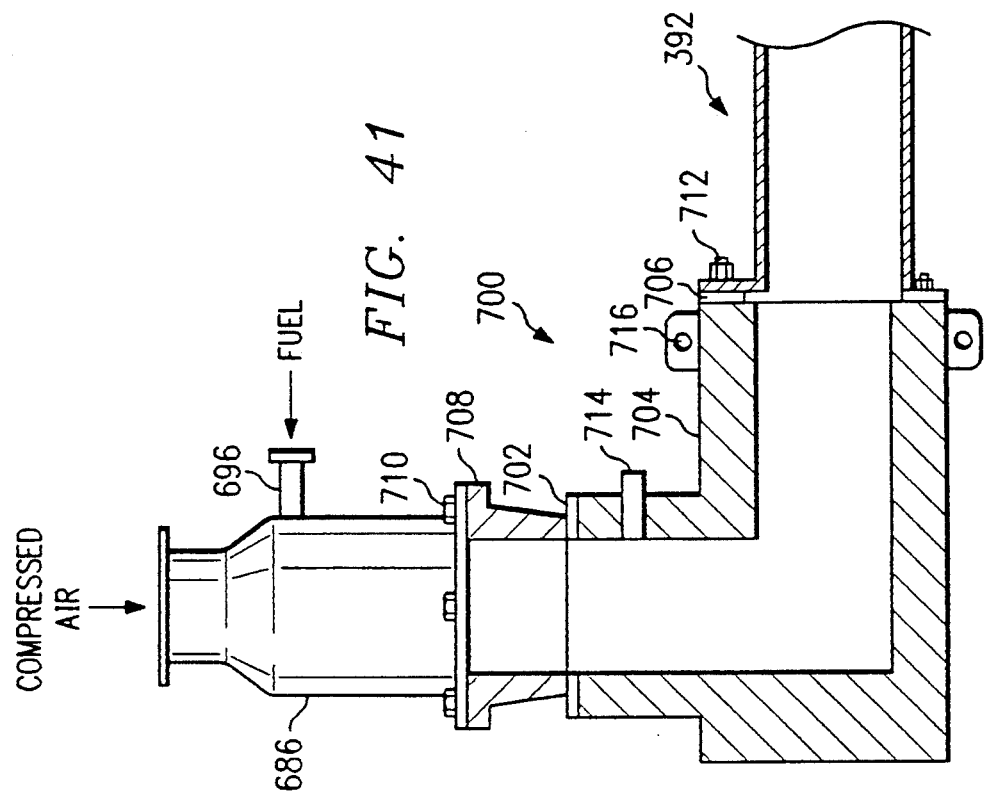
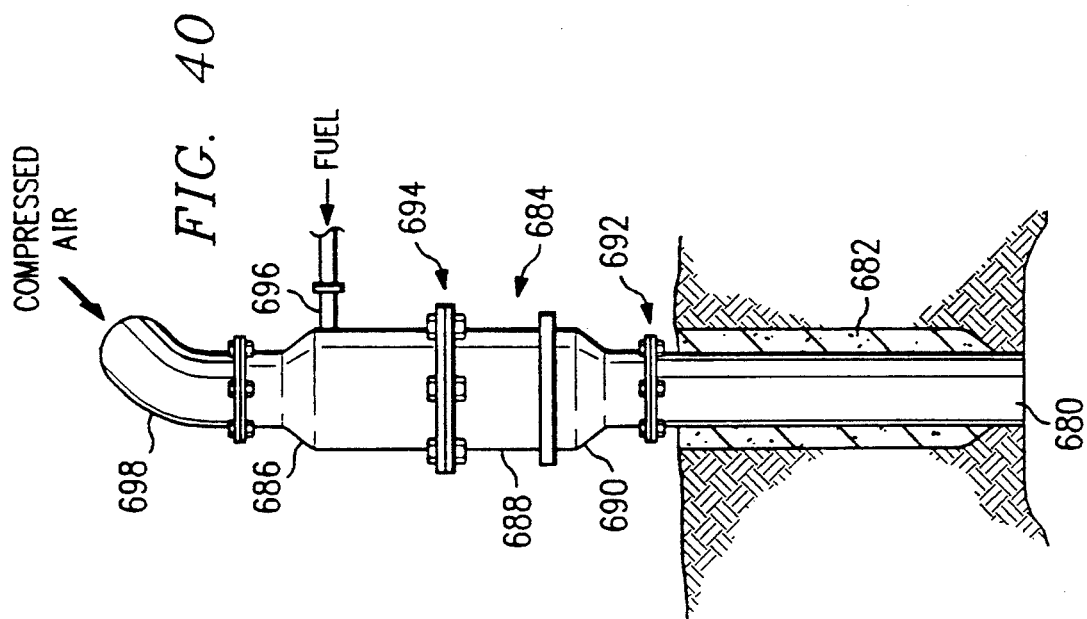

MOBILE MATERIAL DECONTAMINATION APPARATUS

RELATED APPLICATIONS

This application is a continuation-in-part patent application of U.S. application filed Mar. 12, 1991 and bearing Ser. No. 667,952, U.S. Pat. No. 5,261,765 which is a continuation-in-part of a parent application filed Feb. 5, 1990, Ser. No. 458,084, entitled "In Situ Decontamination Method and Apparatus" now U.S. Pat. No. 5,011,329.

TECHNICAL FIELD OF THE INVENTION

The present invention relates in general to the treatment of materials to remove toxic or unwanted substances therefrom, and more particularly relates to the treatment of excavated soil to remove or obviate the effects of the toxic or undesirable substances.

BACKGROUND OF THE INVENTION

In recent years, a special awareness or interest has been placed on the quality of the environment. This has been due, in a large part, to the realization that many substances, both old and newly developed, can lead to present and future detrimental effects. Chemicals and toxic materials which adversely affect the air, earth or water present a serious concern as to the storing of such substances, and the subsequent environmental cleanup in the event of contamination of the environment by the inadvertent release of such materials.

One environmental concern that has prompted recent investigation and remedial action is that caused by petrochemical spills and leakages into the earth due to defective containers or pipelines. The oil, gas or fuel which contaminates the soil, if not checked, can pollute the soil as well as contaminate groundwater supplies and aquifers. One technique which has been employed effectively to decontaminate soil is to excavate the contaminated area and to process the soil through a kiln at an elevated temperature. While such a technique is effective, it is apparent that the time, cost and labor is appreciable and not cost effective for large contaminated areas.

The in situ treatment of contaminated soil has been carried out by use of neutralizing chemicals and solvents, as well as nutrients and microorganisms to promote in situ biodegradation of the contaminants. In addition, in situ soil flushing has been carried out by injecting solvents or surfactants into the soil to enhance the contaminant solubility. This technique involves the drilling of an extraction well in the contaminated soil zone, the drilling of reinjection wells upgradient of the contaminant area, and the construction of a waste water treatment system. Subsequent to the soil treatment, the groundwater is reinjected upgradient of the extraction well, which then leaches through the contaminated soil. The leachate is then collected, treated and reinjected back into the system, creating a closed loop system.

Yet another in situ treatment of contaminated soil involves a process in which production wells are drilled through the contaminated soil zone to a depth just above the water table. Monitoring wells are drilled around the production wells to monitor pressure gradients. A vacuum is then applied to the production wells. Because of the horizontal pressure gradient created in the soil zone by the vacuum pumps, volatiles in the soil percolate and diffuse through the air spaces between the soil particles to the production well. The vacuum established in the soil continuously draws volatile organic compounds and contaminated air from the soil pores, and draws free air through the soil surface down into the soil. The volatiles removed from the monitoring wells are then processed through a liquid-vapor separator. This procedure applies no heat input and is limited in both the rate of contaminant removal and the types of contaminants which can be vaporized.

In another variation of the foregoing technique, the treatment system includes injection wells for injecting steam, hot air and liquid chemicals into the churned soil. Extraction wells operating in a partial vacuum environment provide a horizontal pressure gradient in the soil. The mixture heats the soil and raises the temperature of the chemicals, eventually causing them to evaporate. The evaporated chemicals are drawn horizontally to the extraction wells and piped to a processing system that cools the chemical vapors for conversion into a liquid. The liquid chemicals are then further processed by an incinerator to detoxify the contaminants. One disadvantage of this technique is that the steam is prone to condense in the soil and form a liquid barrier to the further movement of contaminants to the extraction wells. Another disadvantage is that the soil temperature cannot be raised substantially above 212° F. to remove less volatile contaminants.

In U.S. Pat. No. 4,670,634, there is disclosed a technique for decontaminating soil by the use of radio frequency energy to heat the soil. Electrodes located over the surface of the decontaminated area radiate RF energy into the soil and heat the soil to the extent that gases and vapors are produced. The rising gases and vapors are collected by a vapor barrier which operates under a slight vacuum. While the system appears to be effective, the energy requirements are substantial and costly, and the depth of the heat penetration into the soil is limited.

In those in situ decontamination systems where the soil is heated to either vaporize or oxidize the contaminants, there is the recurring problem of how to deliver the energy to the contaminated zone in the most efficient manner. As noted above, in heating the soil with RF energy, such a technique is costly and time consuming. Experimental in situ decontamination efforts have been carried out in which hot gases generated by surface heaters are carried by ducts and forced into injection wells. Since there is a limit to which air can be heated, conveyed and injected, there is a corresponding limitation to which the subsurface soil contaminants can be heated. As a result, soil contaminants characterized by low volatilities, such as polychlorinated biphehyls (PCBs), are difficult to remove from the soil as they require substantially high soil temperatures.

U.S. Pat. No. 5,011,329, assigned to the assignee hereof, discloses a technique for carrying out the in situ decontamination of earth material, such as petroleum contaminated soil. According to such technique, bore holes are formed in the contaminated earth material and cased with a perforated casing. Hot air is forced in the cased bore holes, and into the contaminated earth material until the contaminants either are vaporized or oxidized. A surface extraction system, comprising a barrier layer coupled to a suction or vacuum pump, removes the contaminated vapors for incineration or other disposal. While this technique is highly effective to decontaminate the soil, it is not readily mobile and is not practical for surface decontamination or soil and materials that are saturated with moisture, where the moisture or ground water cannot be readily or economically removed.

While many of the foregoing techniques are effective in providing decontamination of the soil, many of the shortcomings attendant with such techniques are that the processes incur high operating expenses which are not practical for small volumes of contaminated material, require expensive equipment or chemicals, some techniques are limited in the rate at which energy can be introduced into the soil and as a final result are not effective for small volumes of soil or where the soil is heavily water saturated and not readily removable.

From the foregoing, it can be seen that a need exists for an improved technique to remove contaminants from a material in an efficient and cost effective manner. Yet another need exists for an efficient utilization of energy, in which combustion gases used in heating the injection gas are reused for injection into a mobile decontaminator to raise the temperature so that volatile and less volatile contaminants can be vaporized from the contained material. Yet another need exists for a technique to deliver high temperature gases to a mobile piping grid system or a container to achieve oxidation of low volatile contaminants.

SUMMARY OF THE INVENTION

In accordance with the invention, soil decontamination apparatus and corresponding techniques are disclosed which substantially reduce or eliminate many of the shortcomings associated with the prior art techniques.

According to one embodiment of the invention, a network or grid system of perforated pipes is laid on a cement pad or directly on the ground to provide a temporary or mobile decontamination facility. The perforated pipes are flanged and coupled to an input manifold at one end of the network, and coupled to a closed manifold at the other end so that a hot gas forced into the input manifold is uniformly distributed by the perforated pipes throughout the network. A mobile blower/burner assembly and incinerator are provided to generate the hot gases and force the same into the input manifold of the network, and to recover vaporized contaminants for disposal thereof.

According to the decontamination process of the invention, contaminated material is piled on the network of perforated pipes by a front end loader, or the like. A material barrier, such as a foil or high temperature plastic, is laid over the contaminated material and the vapor recovery equipment is connected to the barrier to draw off vaporized contaminants. Hot gases are then injected into the perforated pipe network to first vaporize water moisture, and thereafter the gas temperature is increased to achieve a temperature to vaporize or oxidize the contaminants. The contaminants are then incinerated, collected by catalytic converters or destroyed by other disposal equipment.

According to an important feature of the invention, a mobile containment vessel includes an opening for loading the container with excavated contaminated material. Subsequent to the decontamination process, the decontaminated material is removed from the vessel via the same opening or a different opening in the side of the container. The container is an insulated vessel that includes an interior circulation system for forcing hot gases via an injection inlet into the container to vaporize the contaminants, and a vapor outlet for recovering contaminated vapors for incineration or other processing or disposal thereof. In the preferred embodiment of the invention, a system of perforated pipes is fabricated on the floor of the container so that the hot air emitted therefrom is forced through the contaminated material to increase the temperature thereof. As the contaminants reach a temperature of vaporization, the contaminants are vaporized and removed at the top of the system via the vapor outlet where the pressure is less than that at the injection inlet.

In accordance with another feature of the invention, a mobile hot gas circulation system includes a blower/burner assembly to provide a source of hot gas coupled to the perforated injection pipes within the container. A high-temperature incinerator or other disposal system is connected to the vapor outlet of the container for incinerating the vapor contaminants and discharging the same as harmless gases into the air.

According to another embodiment of the invention, a closed-loop circulation system includes a blower/burner having an inlet connected from the container vapor outlet, and an outlet for forcing hot gases into the perforated injection pipes via the injection inlet to form a closed loop system. In the closed-loop system the high-temperature vent gases removed from the container via the vapor outlet are coupled to the burner for reheating, incineration and reinjection into the perforated injection pipes. In addition, perforated exhaust pipes are disposed between the perforated injection pipes, with the exhaust pipes extending through the sidewall of the container. The exhaust pipes have adjustable valves therein for controlling the extent of gases exhausted from the system to the atmosphere. In this manner, a controlled amount of the incinerated vapors passing through the burner back to the container are conveyed from the injection pipes to the exhaust pipes and exhausted. With this path of recirculated gases, the residence time is increased, and complete incineration is assured. An aggregate may be placed between the injection pipes and the exhaust pipes to facilitate the incineration process. Additionally, a reactive material, such as limestone, can be placed in lieu of or in addition to the aggregate for reacting with chlorinated hydrocarbon gases to remove the hydrogen chloride and allow the resulting harmless gases to be exhausted from the system. A fresh air make-up inlet is provided with the closed loop system for replacing substantially the same volume of air that is discharged by way of the exhaust pipes. A highly efficient system is realized by reusing the high-temperature vent gases for recirculation through the system to vaporize additional contaminants in the material within the container.

When the contaminated material comprises water-saturated soil, the excess moisture is drained by way of liquid drain formed at the bottom of the container, and thereafter capped during the operation of the blower-burner.

The decontamination process is carried out in the following manner. The contaminated material is first loaded into the container and allowed to set so that water or moisture can be drained off through the liquid drain outlet. The container is then closed and sealed, whereupon a hot gas at a temperature of about 1200° F. to about 1600° F. is forced by the burner/blower assembly into the container so that the remaining water moisture is evaporated and removed from the system. After a soil temperature of about 212° F. has been reached and substantially all of the water vapor has been removed, the soil temperature further increases to vaporize and/or oxidize the contaminants. The maximum temperature to which the soil is raised depends upon the temperature by which the contaminants become vaporized. If a closed-loop type system is employed, a certain portion of the vaporized contaminants are incinerated and removed from the system, and the remaining vent gas is reheated and again recirculated for continued vaporization of the contaminants. The same volume of vent gas that is incinerated and output from the system is supplied as make-up air to thereby support combustion in the burner.

In accordance with another aspect of the invention, the entire system is made mobile by fabricating the blower/burner assembly separate and apart from the containment vessel. The blower/burner assembly can be transported on a trailer, as can be the containment vessel, and connected together at the destination either by rigid or flexible insulated tubing.

BRIEF DESCRIPTION OF THE DRAWINGS

Further features and advantages of the present invention will become apparent from the following and more particular description of the preferred embodiment of the invention, as illustrated in the accompanying drawings in which like reference characters generally refer to the same or similar elements or functions throughout the views, and in which:

FIG. i illustrates the major components of the in situ soil decontamination system of the invention, and particularly a cross-sectional view of the contaminated area and the zone affected by the injected, heated gas;

FIG. 3 is an isometric view which illustrates the surface recovery system employed in accordance with the preferred embodiment of the invention;

FIG. 4 is an isometric view which illustrates a central collection point from which the contaminants are extracted and directed by trenches to disposal equipment;

FIG. 5 is a top view of a contaminated site with spaced apart boreholes which are adapted to direct a heated gas in the soil with a predefined pattern;

FIG. 23 is a sectional view of alternative apparatus for removing contaminated vapors from the excavated material;

FIG. 24 is a side view of a mobile decontamination system, showing the blower/burner assembly coupled to a containment vessel;

FIG. 25 is a partially sectioned rear view of the containment vessel illustrating the structural features of the floor and sidewalls of the container;

FIG. 31 is a cross-sectional view of another embodiment of a perforated floor structure for use with the container;

FIG. 32 is a side view of the container of the invention, with the lid shown removed therefrom and the back door latched to the container;

FIGS. 33a and 33b are top views of the door latching mechanism, shown with the latching apparatus in different positions;

FIG. 40 illustrates a burner adapted for fixing to a casing head for heating and injecting hot air directly into a vertical injection well of the invention; and FIG. 41 is a cross-sectional view of an adapter for utilizing a burner in horizontal air flow situations.

DETAILED DESCRIPTION OF THE INVENTION

Figure 1:
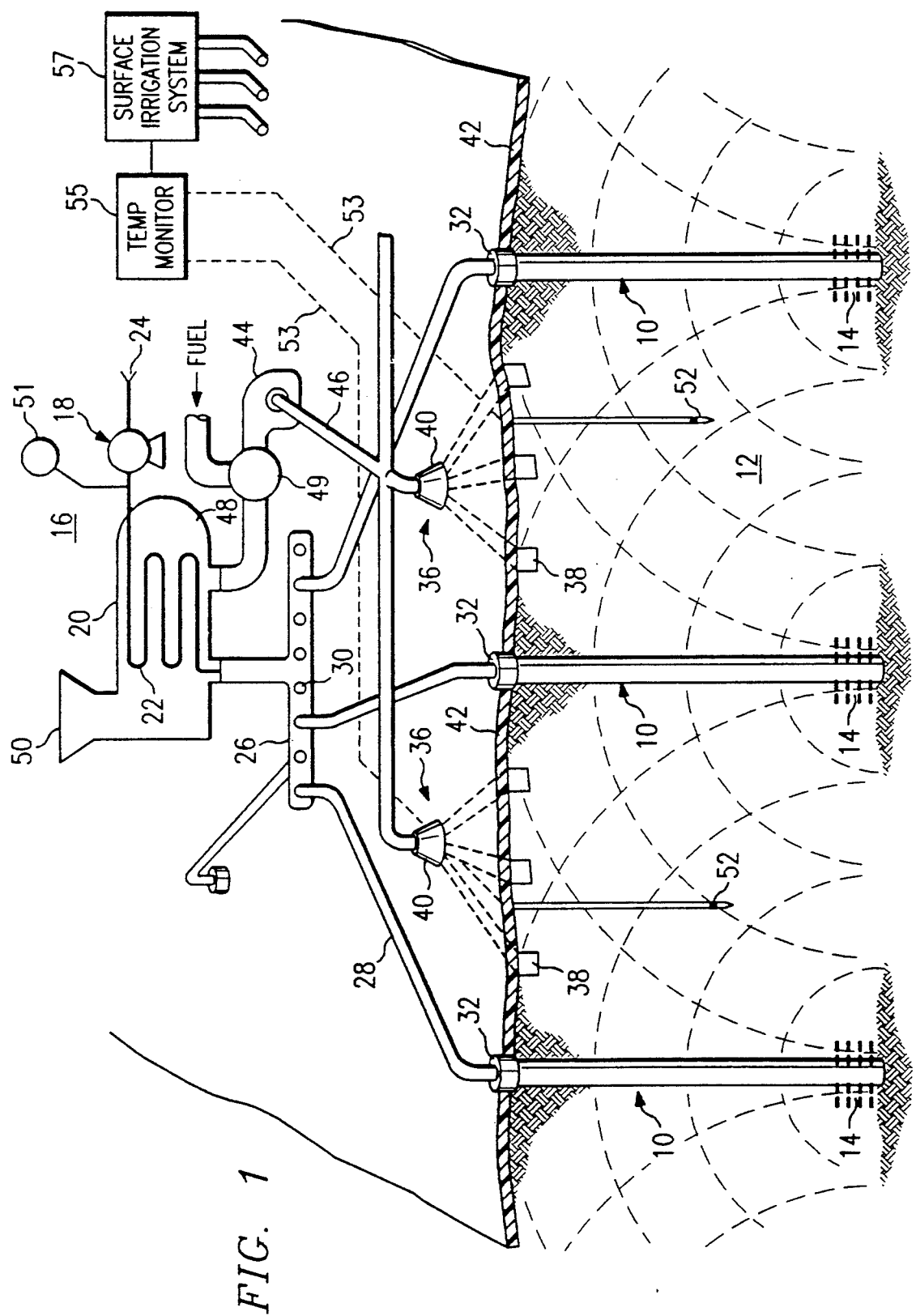

FIG. 1 is a diagrammatic illustration of the invention in an environment in which it can be advantageously practiced. Shown are a number of hot gas injection wells 10 drilled or otherwise formed in a contaminated soil zone 12. According to one technique, the injection wells 10 are each lined with a casing in such a manner that slots formed at a lower end allow pressurized hot gases 14 to horizontally penetrate the contaminated soil 12. Preferably, the injection wells 10 are drilled to a depth at least as deep as the contaminated soil and preferably somewhat deeper in order to allow the laterally directed gases 14 to permeate all regions of the contaminated soil 12. The decontamination technique of the invention is generally applicable to contaminated materials in the vadose zone, i.e., that zone of the earth above the permanent groundwater level.

As will be described in more detail below, the hot gases 14 are injected into the wells with a heat sufficiently high to vaporize the soil moisture and carry such moisture vapor, as well as vaporized contaminants, under the influence of differential vertical pressure gradients and gravity to the surface of the earth. Such a technique is highly advantageous in removing volatile and less volatile hydrocarbons, as well as other diverse types of contaminants.

A source of pressurized hot gases is shown as reference character 16. In one embodiment, air is utilized as the gas which is heated, pressurized, and injected into the wells 10. The gas heating and pressurization apparatus includes a compressor 18 and a furnace 20 equipped with an internal heat exchanger 22. The furnace 20 preferably includes a fuel-fired burner 49 for heating the heat exchanger 22 to a high temperature. As the compressor 18 draws in air or gases from an inlet 24 and forces such gases through the exchanger 22, such gases reach a temperature which may range upwardly of 1200° F. before injection into the wells 10. The temperature to which the gases are heated is a function of the distance that such gases travel before being injected in the wells 10, as well as the nature of the contaminants to be removed. From the heat exchanger 22, the hot gases exit the furnace 20 and are routed to a manifold 26. The manifold 26 is essentially a large ported structure to which a number of pipes 28 are connected for further routing of the hot gases to the individual injection wells 10. The unused manifold ports 30 are simply capped to prevent the escape from the system of the hot injection gases. The manifold 26, as well as the pipes 28 can be insulated to improve the thermal efficiency of the system.

Each injection well 10 includes a "cross" wellhead 32 for providing instrumentation couplings, as well as apparatus for coupling the hot gas pipes 28 to the casings of the injection wells 10. The hot gases generated from a primary fuel combustion and forced in the injection wells 10 can be utilized to vaporize contaminants in the formation 12, or can be used as a preheated gas to ignite fuel for a secondary combustion at the bottom of the injection well 10. Both techniques are described in greater detail below.

A central contaminant collection system 36 is effective to collect the contaminant vapors and gases (vent gases) which have risen to the surface of the soil 12. The contaminant collection system 36 includes a network of trenches 38, all of which are dug toward a central vapor collector 40. Importantly, the surface of the soil 12 is covered with an impervious barrier 42 to prevent the escape of vapor contaminants into the atmosphere. The impervious barrier 42 extends sufficiently beyond the lateral boundaries of the contaminated area. A suction blower 44 is connected to each of the central vapor collectors 40 to draw the vent gases into an input plenum 46 and force such vent gases into the furnace 20. As can be appreciated, the suction blower 44 maintains the trenches 38 generally at a below atmospheric pressure level, thereby drawing the vapor contaminants vertically out of the soil. The necessity for extraction wells is thereby obviated.

In accordance with an important feature of the invention, the vapor contaminants are forced into a high temperature firebox 48 of the furnace 20 where they are incinerated and output via an exhaust 50 into the atmosphere as harmless gases. The combined gas heater and incinerator assembly comprising a tubular coil 22, through which the gas to be heated flows, is arranged in the discharge plenum of a firebox 48 in such a way that the gas being heated flows counter-currently to the direction of the flue or combustion gases generated by combustion of a hydrocarbon fuel in burner 49. This apparatus utilizes as combustion air the vent gases containing hydrocarbon contaminants removed from the soil 12, and forced by suction blower 44 into the burner air inlet ports.

In a typical application, 5000 pounds per hour of air are compressed by compressor 18, from atmospheric pressure to about 18 psig. The compressor 18 can be either a reciprocating piston compressor, a turboblower, or a direct displacement blower. The compressed air is forced through the tubular heat exchanger coil 22 where it is raised from the compressor discharge temperature of approximately 300° F., to the desired injection temperature which ranges up to about 1200° F. The heat required is supplied by burning a hydrocarbon fuel at burner 49 in the firebox 48. The temperature of the gases can be regulated by appropriate control of the flow rate of the fuel fed to the burner 49. By utilizing the vent gases containing the hydrocarbon contaminants removed from the soil 12 as combustion air, the contaminants are thermally and oxidatively destroyed, and converted into harmless carbon dioxide and water vapor, at the flame temperature of approximately 1500° F. or higher. This process is in contrast with prior art techniques, in which the contaminants are generally condensed, collected, and transported to an approved site for appropriate disposal.

As will be described more fully below, thermocouple temperature probes 52 may be driven into the contaminated zone 12 to obtain temperature reading. As an alternative, the vent gas temperature may be monitored at the various points of surface recovery, such as in the trenches 38. In any event, the electrical signals representative of soil temperatures are coupled by wires 53 to a temperature monitor 55. The temperature monitor 55 can be connected to a surface irrigation system 57 to irrigate certain soil areas to reduce subsurface channeling of hot injection gases 14. The surface irrigation system 57 is adapted to selectively wet the surface of the soil areas indicated by the temperature monitor 55 as being hotter than other areas.

In order to return moisture to the soil after the decontamination process is completed, water vapor or a mist can be introduced into the compressed gas, such as by a mist injector, illustrated by reference numeral 51. The mist injector 51 can be activated to inject moisture into the compressed air stream, after the burner 49 has been shut off and the air stream has returned to a normal operating temperature.

Figure 2:
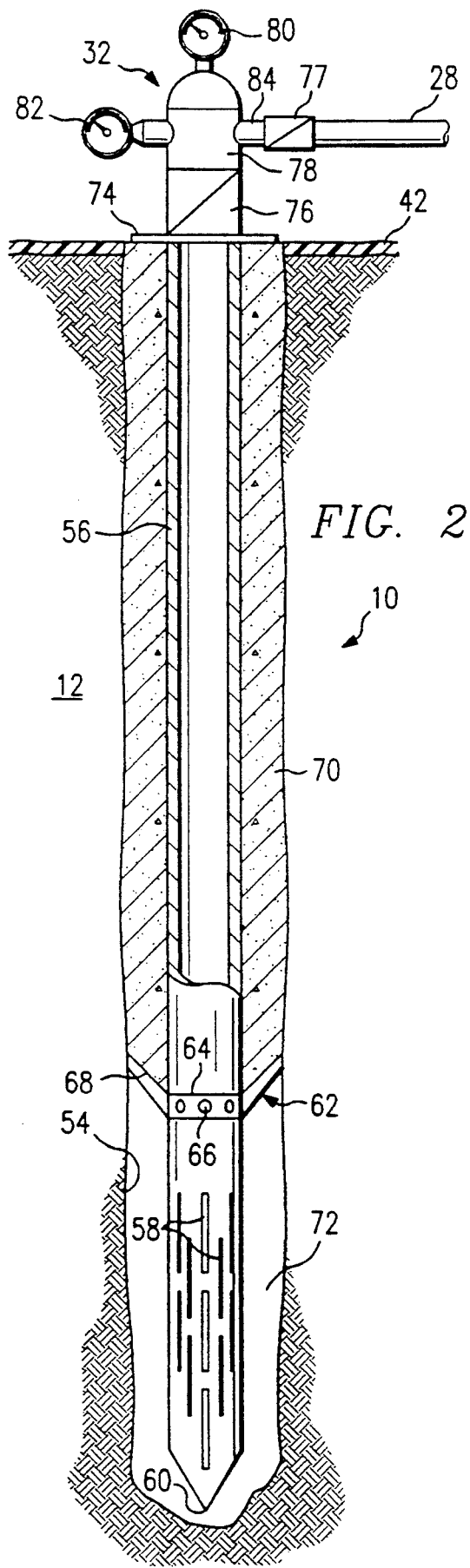
FIG. 2 is a sectional view which illustrates the detailed structural features of a wellbore and casing especially adapted for injecting heated gas into the earth.

Having described the basic structural and operational features of the invention, reference is now made to FIG. 2 where further details of the invention are shown. In order to properly and thoroughly remove the contaminants from the soil 12, it must first be determined the extent of the contamination, the type of the soil, porosity, moisture content and the type of contamination. Such information can be obtained by drilling sample boreholes, extracting soil samples, and through laboratory analysis determining the noted information. After the pattern of the contaminated area has been determined, injection wells are drilled within the contaminated soil area, as well as on the border of the area. The wells may be located in and about the contaminated zone, as dictated by soil tests to determine contaminant concentration, soil texture, etc. In the event that the contaminated area is larger than can be accommodated by the in situ decontamination apparatus, various sections of the area can be decontaminated in a sequence, until the entire area has been decontaminated. In this case, a certain degree of overlap between sections may be required in order to assure substantially complete removal of the contaminants.

It has been experimentally determined that the injection gases 14 permeate laterally outwardly from the well 10 to a distance about equal to that of the depth of the well. Hence, the injection wells 10 can be appropriately spaced in and about the contaminated area to assure that complete hot gas permeation of the soil is achieved. The slotted sections in certain of the injection well casings can be equipped with vertical blades to direct the hot gases in a specified pattern and thereby minimize the injection of gases 14 in areas of little or no contamination. Such bladed casings are well adapted for use around the periphery of the contaminated zone 12.

In accordance with one technique, the boreholes 54 of the injection wells 10 (FIG. 2) are formed with a diameter of about six inches. A casing, pipe, or tube 56 of about 2⅜ inch to 4 inches, depending on the rate of injection desired, is then assembled for lowering into the boreholes 54. The casing 56 is smaller in diameter than the borehole 54, and is preferably constructed of steel. Further, a number of vertical slots 58 are formed in the bottom portion of the casing 56. The slots 58 are about eight inches in length and about ⅛ inch in width. While vertical slots are disclosed, other aperture shapes and sizes may function to disperse injection gases 14 with equal effectiveness. The bottom edge 60 of the casing is pinched together and suitably sealed, such as by welding. At a location just above the slots 58 there is removably attached an annular expandable cement basket 62. The cement basket 62 includes an annular flange 64 which is fastened to the casing outer sidewall 56 with shear pins 66. The expandable cement basket 62 includes a conical expandable annular member 68 which allows it and the casing 56 to be lowered into the borehole 54. After the casing 56 and attached expandable cement basket 62 are lowered to the proper location in the borehole 54, the upper annulus is filled with cement 70 and allowed to set. The expandable basket annular member 68 prevents the cement from filling a lower annulus portion 72 of the borehole 54. The cement 70 is of the type which can withstand high temperatures without fracturing, cracking or otherwise deteriorating. Preferably, the high temperature composition is a mixture of Class H cement, silica flour and perlite mixed with water. This mixture has been laboratory tested and is usable at temperatures in excess of about 900° F. In addition, the cement 70 prevents the leakage of the pressurized hot gases 14 upwardly in the borehole, thereby forcing the hot gases 14 to permeate throughout the contaminated soil 12. The cement basket 62 can be sheared from the casing 56 to allow retrieval of the casing 56 after the decontamination process is completed.

A flange or collar 74 screwed to the top of the casing 56 allows for the connection thereto of a ball valve, schematically shown as reference character 76. The ball valve 76 is manually adjustable to seal off the injection well 60 and retain formation pressure after injection is completed. Fixed atop the ball valve 76 is a cross wellhead 78 which is equipped with a pressure gauge 80, a temperature gauge 82 and a fitting 84 for attachment to the hot gas pipe 28. The pressure gauge 80 can be monitored to detect rises in pressure which are indicative of soil flooding due to condensation. The fitting 84 may be any of the well-known type which can withstand the temperature and pressure characteristic of the hot gases. A manually adjustable valve 77 is fixed between the pipe line 28 and fitting 84 to control the rate of injection of hot gases 14 into the well 10. The pipe line 28 is sized to enable delivery of a sufficient volume of hot gases through the contaminated soil, depending upon the porosity and texture thereof. The hot gas pipe 28 is generally sufficient to deliver at least 1500-2500 standard cubic feet per minute (SCM) of hot gases 14 to the injection well 10.

Once the construction of all of the injection wells 10 has been completed, a trench network 89 is formed between the injection wells 10. FIG. 3 illustrates one type of trench layout for recovering contaminated vapors drawn vertically out of the soil 12. Illustrated is a contaminated soil zone 12 which is generally square or rectangular in shape, with a hot gas injection well 10 formed in the earth at the corners of the zone. The trench network 89 includes a number of individual trenches 38 which are arranged radially inwardly toward a central collection point 40. The trenches 38 can be dug to a convenient depth, such as 6-12 inches, with a width of corresponding dimensions. In addition, shown are a number of other trenches 90 which intersect with the radial trenches 38, and are generally orthogonal thereto. Other types or configurations of trenches may be utilized with equal effectiveness to recover the contaminated vapors for incineration, or other disposal.

Preferably, the trenches 38 and 90 are left open to provide conduction channels of the contaminated vapors directed toward the central collection point 40. After the trench network 89 has been completed, the entire area is covered with the impervious material 42. The impervious material 42 can be a heavy gauge, heat resistant foil or other material which is impervious to the type of vapor contaminants brought to the soil surface by the decontamination system of the invention.

After the contaminated area has been covered with the impervious material 42, the vapor gas central collector 40 is installed so it is sealed to the impervious material 42 and is connected at a point common of a plurality of the trenches 38. The vapor gas collector 40 is shown in more detail in FIG. 4. The vapor gas collector 40 is constructed of sheet metal, including a bonnet 92 attached to a base 94 which rests on the surface of the earth. The vapor collector 40 is preferably located over an intersection common to plural radial trenches 38. The top of the bonnet 92 includes an elbow 96 which connects to a low pressure return pipe 98 which is coupled to the suction blower 44. The impervious material 42 is fastened around the collector 40 by a band or collar, or other suitable means.

FIG. 5 illustrates a technique for injecting hot gases 14 into the earth in a predetermined pattern commensurate with the shape of the contaminated area. A basic injection well grid pattern is utilized to determine spacing of the injection wells 10. The design of the pattern is dependent on the depth of the base of leachate, concentration of contamination and soil permeability. The basic grid pattern may be expanded or contracted to effectively cover the affected area. For purposes of example, the contaminated area is illustrated as being square. A hot gas injection well 10 is formed centrally within the square, and includes casing slots all around the bottom portion thereof so that the hot gases 14 permeate laterally in a pattern 360° around the well 10. The circumferential hot gas permeation pattern is shown as numeral 99. A cone of hot gas permeation thereby extends entirely around the central hot gas injection well 10. Located at each corner of the contaminated area is an injection well 100 which has slots formed in the sidewall of a bladed casing in a 90° angular area of the casing. The hot gases 14 are directed into the contaminated soil in a pattern of 90°, thereby concentrating the dispersal of hot gases in the corner of the contaminated soil zone. The pattern is shown by the arrow 102. Between each corner hot gas injection well 100 there are formed other boundary injection wells 104 which have slots formed in a lower part of bladed casings covering a 180° angular area thereof. Accordingly, the hot gases 14 forced out of the slots are directed outwardly in a pattern of 180° thereby concentrating the permeation of hot gases to the soil locations intermediate the corner wells 100 and in the contaminated zone.

Figure 6:
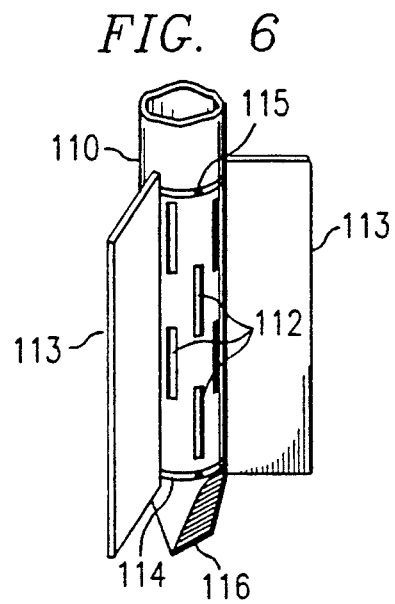
FIG. 6 is a side view of a bladed casing having a quarter section slotted for directing gases in a 90° pattern.

FIG. 6 illustrates a bottom portion of a casing 110 adapted for directing hot gases in a 90° pie-shaped pattern around the wellbore. A number of apertures or slots 112 are cut in the casing 110 in an angular surface area thereof which subtends an arc of about 90°. A pair of blades 113 are spaced apart 90° to enclose the slots 112 and enhance the directionality by which the gas is injected into the contaminated zone 12. The blades 113 may be slightly larger in diameter than the diameter of the borehole to reduce gas leakage therearound. The blades 113 are held together by a pair of metal bands which, in turn, are attached to the casing 110 by shear pins or bolts 115. When it is desired to pull the casing after the decontamination process is completed, the blades 113 can be sheared from the casing should such blades become lodged in the borehole. As further shown in FIG. 6, the casing 110 is pinched together at a bottom edge to cap the bottom end so that hot gases 14 are forced to exit the borehole in a lateral direction.

Figure 7:
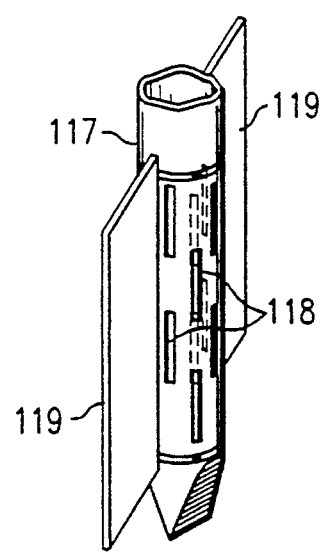
FIG. 7 is a side view of a bladed casing having a half section slotted for directing gases in a 180° pattern.

FIG. 7 is illustrative of another embodiment of a casing 117 in which a number of slots 118 are symmetrically formed around only half of the casing 117. A pair of blades 119, spaced apart 180° enhance the directionality of the gas injected into the contaminated soil 12. In this manner, hot gases 14 are directed from the casing 117 in a pattern of 180° surrounding the casing 117. It can be appreciated that by forming the slots and blades in patterns other than shown, other directional hot gas patterns can be realized. For example, certain soil conditions may allow for desired directivity of the injected gases by using casings shown in FIGS. 6 and 7, but without the guide blades. It may be found that the resulting pattern of injected gas is lobe shaped, with minor or insignificant spillover into areas of no concern. Yet other techniques of patterned gas injection may be employed, such as backfilling a portion of the borehole around a slotted casing with cement so that the gas escapes only from a circumferential portion of the casing.

Figure 8:
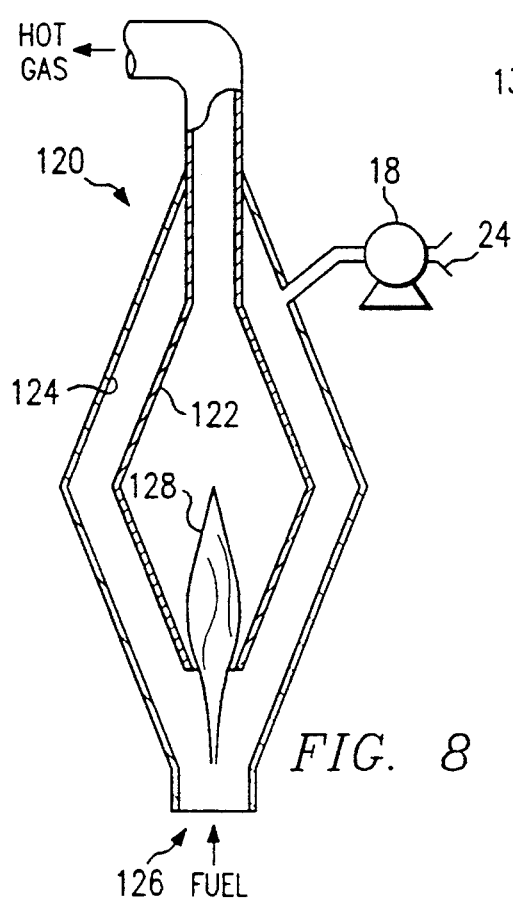
FIG. 8 is a side sectional view of a pressurized gas heater which can be employed for on-site heating of a pressurized gas for injection purposes.

FIG. 8 illustrates an embodiment of a gas heater adapted for use with the invention, should separate heater and incinerator apparatus be desired. An adiabatic gas heater 120 provides hot combustion gases under pressure for injection into the contaminated soil 12. The heater is an assembly in which a biconical flame chamber 122 is suspended inside a biconical exterior housing 124. Air or a gas enters compressor 18 through intake port 24. The air is compressed to the desired injection pressure, typically 15 to 20 psig. The compressed air enters the top of the biconical annulus 124 and flows downwardly in a spiral, thus absorbing the heat transmitted from the inner biconical flame chamber 122, thereby rendering the overall assembly adiabatic. The air then mixed in a burner 126, where it is combined with a hydrocarbon fuel injected to operating pressure through burner 126, and is ignited into a stable flame 128 within the inner biconical chamber 122. Complete combustion is obtained, resulting in a hot flue gas under pressure sufficient for injection into the soil. Typically, it is expected that the flue gas will range in temperature between a compressor discharge temperature of about 300° F. to 1200° F. The composition of the flue gas depends on the temperature at discharge, which is a function of the amount of air in excess of the stoichiometric quantity needed to completely combust the fuel. This excess ranges from infinity, at 300° F. to 4:1 excess at about 1200° F., approximately. Since the compressed flue gas contains moisture of combustion, a considerable amount of excess air is needed so that the moisture content will be low enough to allow the air injected into the soil to absorb and remove additional water. With a 4:1 ratio of excess air, the moisture content will result in a 90° F. dew point. At 300° F., where substantially no combustion takes place, the dew point will be that of the ambient air, typically 40° to 70° F. Within this range, which is expected to be utilized during operation, the injected flue gas will have ample capacity to absorb additional water evaporated from the soil. A burner which is adapted to heat a pressurized gas is available from Thermoflux, Inc., of Tulsa, Oklahoma.

Figure 9:
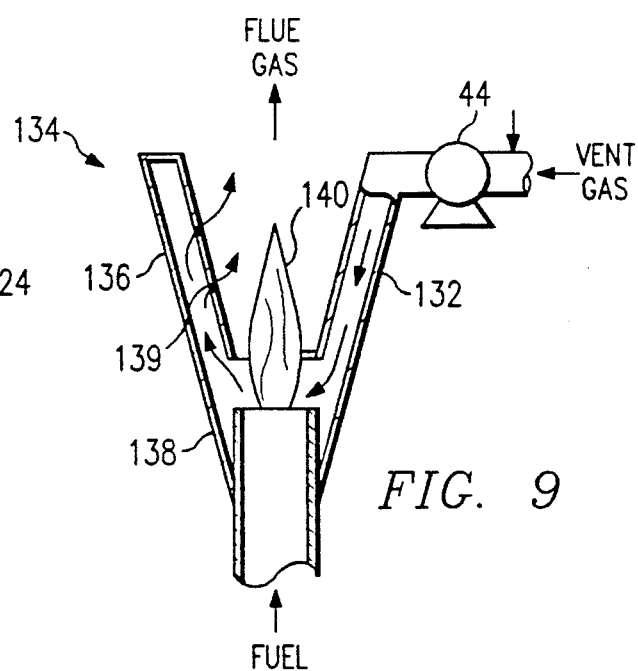
FIG. 9 is another embodiment of a heater which can be utilized for incinerating vaporized contaminants recovered as a vent gas from the soil.

In the event that separate gas heater apparatus and incinerator apparatus is employed, the vapor contaminant disposal technique of FIG. 9 can be utilized. The vent gas from the soil 12, which may contain low concentrations of hydrocarbon contaminants, is recovered from the vent gas collection system under a slight negative pressure by suction blower 44, which injects it into the annulus 132 of an inverted conical incinerator 134. An incinerator suitable for such use is obtainable from Thermoflux, Inc. of Tulsa, Okla. The flue gas enters the conical annulus 136, near the top and recovers heat transferred from the hotter internal cone, as it progresses spirally downward to the apex 138 of the cone, where it is mixed with fuel and burned. Perforations 139 located near the bottom of the annulus 132 allow the heated vent gas to escape with the combustion gases as a flue gas. The high temperature of the flame 140, in excess of 1500° F., causes the contaminants to be thermally and oxidatively converted into harmless water vapor and carbon dioxide for discharge to the atmosphere.

Figure 10:
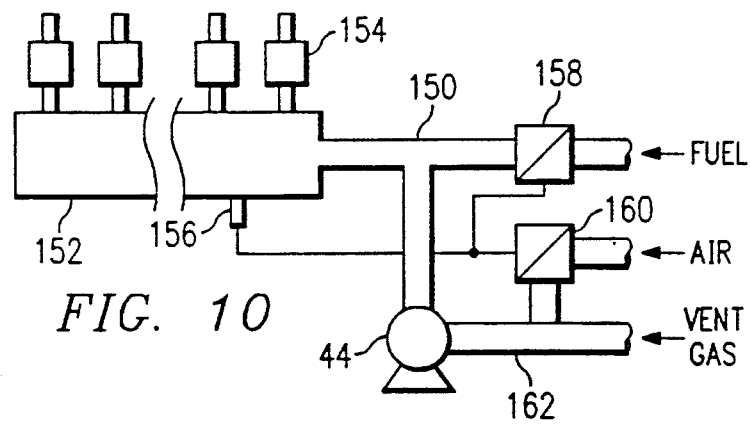
FIG. 10 schematically depicts a catalytic oxidizer for on-site disposal of contaminated vapors.

An alternative to the foregoing decontamination technique is shown in FIG. 10. The main advantage to this latter technique is that it uses less fuel to convert the contaminants oxidatively into carbon monoxide and water. The vent gas from the soil, which may contain low concentrations of hydrocarbon contaminants, is recovered from the vent gas collection system under slight negative pressure by suction blower 44, which injects it into the burner 150, sufficient to raise the temperature of vent gas in the manifold 152 of the vent gas catalytic converter 154 to about 300° F. to 400° F. as required for the 10 operation of the standard automobile catalytic converters. As illustrated, the catalytic converters 154 are arranged in parallel to supply sufficient capacity for the vent gas stream. The converters 154 catalytically oxidize the contaminants and discharge the gas harmlessly to the atmosphere. At times when the vent gas entering the blower 44 is higher than about 400° F., a temperature controller 156 shuts off the fuel to the burner 150 with valve 158 and opens an air valve 160 at the intake 162 of blower 44 to maintain the proper temperature of the gas entering the catalytic converters 154.

Having described the details of the structural features of the invention, the exemplary steps of the in situ soil decontamination technique are set forth below. Soils in general do contain water under normal conditions, but in vastly different degrees. The soil may be saturated or lie beneath the water when the soil is below the water table, or when water has percolated downwardly after surface rains or floods. The water can be contained in the pore spaces between soil particles, or water can be adsorbed on the surface of the particles. Soil which is saturated with water or beneath the water table functions as a barrier to the flow of gases to the soil, at practical flow pressures and rates. The water contained in the pore spaces between the soil particles may, or may not, impede the flow of the injection gases, depending upon the fraction of the pore space which is occupied by the liquid water. On the other hand, in conditions where the water is adsorbed on the surface of the soil particles, such water is not free to flow, but the transmission of gases therethrough is not substantially impeded.

In the event that the contaminated soil is fully saturated with water, such as that which is located below a water table, the water can be gravity drained by the injection wells drilled to or below the bottom of the contaminated zone. Such wells can later serve as the boreholes for insertion of casings to inject the hot gases in the contaminated zone. The wells can be utilized to remove substantially all of the liquid water from the zone.

After the decontamination apparatus has been connected together and tested for operability, the compressor 18 is started, as is the suction blower 44. The burner 49 is not ignited and thus air or gas at a compressor outlet temperature of about 300° F. is forced into the injection wells 10. Initially, the compressor 18 is adjusted to force a gas through the heater-incinerator assembly 20 such that the pressure, as measured at the wellhead, is about 8-15 psig for a well having a depth of about twenty feet. If the contaminated zone is much deeper, for example, fifty feet, it may be necessary to increase the wellhead pressure, for example, to about 20-30 psig, due to the higher hydrostatic head at the greater depth. This initial pressure of the low temperature gas gradually moves the liquid water from the wellbore, thus establishing greater gas permeability within the contaminated soil 12. However, a higher pressure may be required to overcome threshold effects of initially generating a water flow through the contaminated soil.

Figure 11:
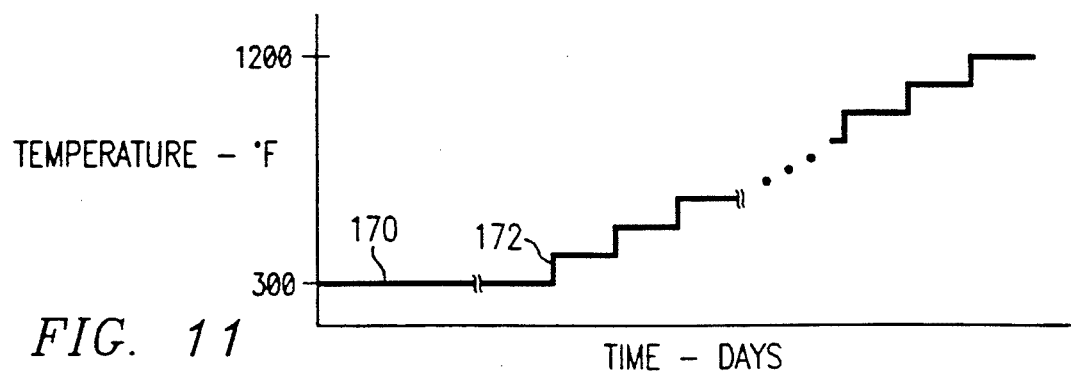
FIG. 11 is a graphical depiction of a time/temperature schedule of gas injection.

The injection of the low temperature gas continues until a steady state flow rate is established. FIG. 11 illustrates a gas temperature schedule believed to be effective in accomplishing the in situ decontamination of the zone 12. Reference numeral 170 shows the steady state injection achieved after the liquid water is substantially removed from the soil 12.

After removal of liquid water, the burner 49 is fired to increase the temperature of the injected gases 14. The procedure for the hot gas injection operation varies, depending upon the type and water content of the contaminated soil. The temperature and pressure of the injected gas 14 is regulated to prevent the formation of condensation ahead of the hot gas front so that the soil formation does not become flooded or water logged, thereby reducing the permeation of the soil and the flow of hot gases therethrough. The hot gases 14 are injected into the contaminated zone by slowly raising the pressure at the bottom of the injection wells. The temperature increase can be at a steady rate, or increased incrementally in predefined steps, as shown by reference numeral 172 of the graph. The hot injected gases 14 displace the remaining liquid water occluded in the pore spaces adjacent to the injection well borehole until the gas can be transmitted from the well bore into the contaminated zone. As heat is applied, some of the initially occluded water evaporates into the air steam, gradually opening the pores, thereby increasing the flow of injection gases 14.

As noted above, when a steady state rate has been achieved at a satisfactorily high gas flow, the temperature of the gas 14 is slowly raised to evaporate additional water from the soil. For illustration purposes, it is believed that a temperature rise of 20° F. every 2-3 hours will be effective to achieve contaminant vaporization without vapor condensation and resultant flooding. As the temperature rise is being carried out, the air stream picks up what moisture it can hold at the particular injection temperature, until the injected gas 14 becomes saturated with water vapor. The gas initially injected into this soil becomes saturated and flows outwardly to cooler zones, whereupon some of the water vapor condenses, so that the air is saturated at the lower temperature of the cooler zone. Preferably, the desire is to raise the temperature of the injection gases 14 very gradually during the early periods when a substantial amount of water is present in the soil pores, such that the recondensation occurring ahead of the heated front is limited to a level that will not completely fill the pores and thus flood the soil. As can be appreciated, such flooding restricts the passage of injected gases 14 and thus limits the rate at which the soil can be further heated. The regulation of temperature and pressure of the heated gas 14 contrasts with the steam injection technique, in that the steam provides the bulk of its heat by condensing and thus maintains the soil ahead of the heated zone in a flooded state.

If, indeed, soil flooding should occur ahead of the heated zone, due to having raised the gas temperature too rapidly, an increase in the injection pressure at a constant gas flow rate can be noticed. Alternatively, when employing a constant injection pressure, a sudden reduction in the flow rate can be detected. When the temperature of the soil is raised to rapidly, too much water may be evaporated in the heated front which could result in increased condensation in the cooler zone immediately downstream therefrom. The increased condensation has the effect of filling the soil pores, thus resulting either in diminished flow or increased pressure, or both. It is thus highly advantageous to monitor the condition of flooding by observing either the flow rate or the gas injection pressure. In the event that condensation of water in the heated front results in a flooded condition, the gas injection temperature can be held constant, and the pressure can be gradually increased to displace the excess liquid in the formation ahead of the flooded zone. Such a procedure is continued until the air flow is reestablished at a desired rate. The gas flow rate and pressure can be regulated by the appropriate controls of the compressor 18.

As the temperature of the soil formation is increased, the contained water is decreased, thereby enabling the gas injection temperature and flow to both be increased. When substantially all of the water has been evaporated in the contaminated soil, which is around 212° F., the injection temperature can be increased toward a maximum amount. Depending on the soil type and consistency, it is expected that generally the soil temperature can be increased about 200° F. per day, thereby raising the soil temperature to about 800° F. in 4–5 days. The flow rate of the heated soil is then limited only by the resistance of the open soil pores, in the absence of water therebetween, or by the gas injection equipment.

It follows that one skilled in the art can utilize this pore flooding phenomenon for useful purposes. For example, it is desirable that the flow of heated gas occurs uniformly from the points of injection at the base of the contaminated zone to the surface, where the vent gases containing removed contaminants can be collected for disposal. Due principally to lack of uniformity in porosity of the soil in the contaminated zone, both laterally and vertically, some non-uniformity of gas flow can be expected. This can be observed by monitoring the temperature profile developed in the contaminated zone by the thermocouples 52 disposed in the contaminated zone 12. In most instances, this non-uniformity can be tolerated and accommodated by continuing the air flow until all the contaminated zone is swept of contaminants. In the case where the non-uniformity results in uneven channelling of the air, such that some zones are not adequately swept, it is desirable to be able to impede the channelling to some extent, so that greater uniformity of sweep is achieved. This may be accomplished by intentionally irrigating or flooding with water the zone where more air is channeled, thus restricting flow. This may be carried out by the selective and controlled addition of water by the irrigation system 57 into the path of channelling. In most cases, this would be done by wetting down the surface over the area where it is desired to reduce flow.

A soil temperature of about 500° F. is sufficient to remove 400° F. end point gasoline which is one predominant soil contaminant. Due to the energy required to raise the soil temperature this amount, some extended heating may be required, to the extent of two to three weeks. In addition, a quick elevation of the soil temperature could cause severe cracking and the resulting failure of complete permeation of the soil, due to escape of the gas through such cracks or fissures. Relatively less volatile compounds can be removed at higher temperatures, and involatile compounds can be oxidized at higher temperatures, such as 800° F. It has been experimentally found that the soil structure remains stable at temperatures up to 800° F. where humus is oxidized completely in about two hours. By carrying out the progressive increases in the temperature of the contaminated soil 12, substantially all hydrocarbon contaminants can be removed. With the foregoing, those skilled in the art can readily devise of other pressure and temperature schedules for removing other types of contaminants.

While the various flow rates and pressures are required to be adjusted according to the type of soil and contaminants, the parameters identified herein were adapted for experimental soils having 99% sand, reddish in color, angular and of a texture, from very fine to fine. Such soil is subrounded, 1% muscovite and plagioclase. The soil grains tended to be cemented by iron oxide.

After achieving a stabilized injection operation in an actual field test program, a flow rate of about 1000 scf/hr was achieved after seven hours of operation. After several days of operation, an air balloon reached the surface and numerous percolations developed out to a surface radius approximately equal to the depth of the injection well. Preferably, the hot gas injection is carried out at a slow rate and low pressure to reduce the risk of premature breakthrough or fracture of the crust. After several days of hot gas injection, the process stabilized with a steady injection rate of about 2000 scf/hr and a pressure of about 12 psig.

After all of the contaminants have been removed from the soil, the burner 49 can be shut off, but the compressor 18 and the suction blower 44 can continue to operate to provide a circulation of cooler gases through the decontaminated soil. This is especially advantageous as the soil temperature can be restored to sufficiently low values. Unless the decontaminated soil is cooled to a lower temperature, it could remain hot for an extended period of time, due to the insulating properties of soil. As noted above, moisture, by way of a mist injector 51, can be injected downstream of the air compressor 18 or the heater-incinerator 20 in a controlled manner with the cool air to restore the water removed during the decontamination process.

While the foregoing discloses the in situ soil decontamination process by the injection of air and combustion gases, other gases can be injected to improve decontamination, depending upon the soil, temperature, type of decontaminant, etc. For example, oxygen, nitrogen and carbon dioxide are readily available types of gases which can be heated and injected into the soil. In addition, the air or gases can be dehumidified before being injected into the contaminated area.

It is also contemplated that the invention may be readily adapted to reduce the viscosity of surface and subsurface hydrocarbon tars, heavy oils and oil sands by raising the ground temperature to a level which will cause the hydrocarbon substances to transform from a solid to a liquid phase. A system of collection wells can then be employed to pump the liquid hydrocarbons from the affected area. The process can be further used for near surface mining of certain mineral compounds and complexes. Certain gold, silver, mercury, molybdenum and platinum compounds, or other certain nitrates, sulfides, phosphates and bromides are amenable to extraction by the apparatus and methods described above. The vapors are confined and captured at the surface by a hood or vapor barrier and collected appropriately. The method can be utilized for increasing soil permeability over specified areas to enhance the transmissibility, drainage and discharge of fluids or gases in subsurface media. Also, frozen ground can be thawed to allow easier access to existing subsurface installations, or to allow easier access for new construction of subsurface facilities or installations. Frozen fluids and slurries can be thawed in underground pipelines by employing the method of the invention to reestablish a fluid flow in such pipelines. The method can also be utilized for removing moisture from the soil over specific area patterns to create constant thermal conductivity in the soil for engineering or scientific investigations or applications. Also, the method can be employed to maintain soil at a constant elevated temperature to provide a stabilized environment for engineering or scientific investigations or applications, or to stimulate the growth of certain microbial cultures. In that vein, the method can be employed to prolong the growing season of specified plants or biocultures in colder climates. Also, the method can be employed for uniformly distributing moisture into dry soils for agriculture or engineering purposes by the injection of air and moisture into the subsoil.

A technical advantage of the invention, as described above, is that a burner heats a pressurized air stream, and combines the combustion gases with the air stream for injection into wells drilled in the contaminated zone. The injected gas is heated in excess of 212° F. to temperatures sufficient to vaporize volatile and less volatile contaminants, as well as to oxidize other nonvolatile contaminants. A further technical advantage of the invention is that the injected hot gases rise upwardly through the soil, due to a vertical pressure differential between the surface and the bottom of the pressurized wellbores. The rising action of the hot gases also facilitates the removal of the vaporized contaminates at the surface, without the need of extraction wells. An additional advantage of the invention is the ability to direct the hot gases in a predefined pattern so that energy can be utilized efficiently in the contaminated zone to vaporize contaminants. Yet another advantage of the invention is that energy can be conserved by utilizing a burner-incinerator assembly which employs a single burner to heat the injection gases and to incinerate the vaporized contaminants. Other advantages of the invention are apparent to those skilled in the art.

The foregoing describes techniques in which air or gas is heated by primary combustion surface equipment to the appropriate temperature. Such gases are then conveyed to the injection wells by insulated pipes. There are various limitations which limit the temperature by which air or gases can be heated and conveyed to remote locations for injection into the ground. For example, at gas temperatures above 1500° F., the surface pipes must be made of thicker sidewalls, and of different materials which are capable of withstanding such temperatures. Hence, the surface distribution of hot gases above 1500° F. becomes more expensive, and thus the decontamination process becomes less cost effective. The techniques set forth below permit the generation of gas temperatures in the neighborhood of 1200° F.–4500° F., while yet remaining cost effective.

Figure 12:
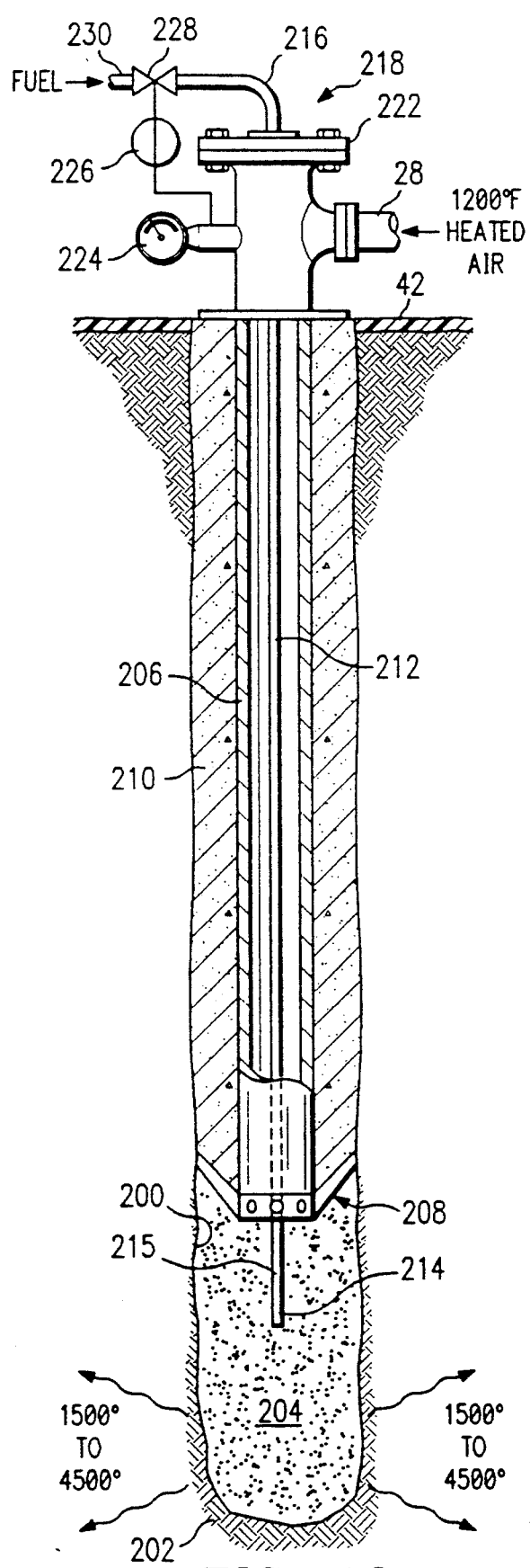
FIG. 12 is a side sectional view of an injection well adapted for burning a liquid fuel at the bottom of the well to achieve high gas temperatures.

FIG. 12 illustrates a cross-sectional view of an injection well and associated apparatus for increasing the downhole temperature of gases before lateral injection of the same into the contaminated formation. According to this technique, a wellbore 200 is formed in the contaminated formation 202 to a suitable depth. Preferably, the wellbore 200 is drilled with the diameter of about 6 inches–8 inches. The bottom six foot, or so, of the wellbore 200 is then filled with small pebbles 204, such as the well-known pea gravel or other nondecomposable material capable of functioning as a heat ballast. Other aggregate of a ⅛–174 inch size may be suitable, so long as it is of the type which does not melt or fuse together at temperatures in excess of about 3500° F. Next, a casing 206 with a cement basket 208 attached at the lower end thereof is lowered into the wellbore 200. The open bottom of the casing 206, as well as the cement basket 208 rest atop the bed of pebbles 204. The casing 206 can be of a conventional type, having a diameter of about 2⅞ inches. The annulus of the wellbore is then filled with a cement 210 of the type which can withstand the increased temperatures. As noted above, the cement basket 208 prevents the cement 210 from falling into the pebbles 204. The cement 210 is then allowed to set, thereby fixing the casing 206 centrally within the wellbore 200.

A supply of a liquid fuel for secondary combustion purposes is provided to a downhole location, and preferably within the pebbles 204, by a fuel line 212. The fuel line may have a ¼ inch inside diameter, and be constructed of a 316 stainless steel tubing. This fuel line diameter is believed to be of sufficient size to provide a flow rate sufficient to achieve the temperatures required to vaporize and oxidize various contaminants. While the fuel line 212 can be fastened internal to the casing 206, it can otherwise be suspended centrally within the casing 206. The end 214 of the fuel line 212 is an open ended length of ceramic tubing 215 to allow a full release of the fuel into the pebbles 204. The ceramic fuel distributor 215 can withstand the high temperatures generated by the secondary combustion of the fuel fed downhole. In order to provide a more uniform distribution of fuel within the pebbles 204, an end length of the ceramic fuel line 212 can be perforated, with the end thereof capped. The ceramic distributor 215 can be fastened by conventional techniques to the end of the fuel line 212.

In order to locate the end 214 of the ceramic fuel distributor 215 within the pebbles 204, the following procedure can be carried out. When installing the fuel line 212 within the casing 206 and into the pebbles 204, a pressurized air line can be connected to the surface end 216 of the fuel line 212 by apparatus not shown. By forcing air out of the end 214 of the ceramic fuel distributor 215, the fuel line can be manually rotated and wiggled so that the ceramic end 214 works itself well into the pebbles 204. By employing air pressure in the line, small pebbles are prevented from plugging the end 214 of the fuel distributor 215.

When the fuel line end 214 is suitably located within the pebbles 204, the wellbore 200 is capped with a wellhead 218. The wellhead 218 can be of the type having various fixturing, including a pipe 28 for admitting preheated air into the casing 206. Also, the wellhead 218 includes a cap 222 to which the top end of the fuel line 212 can be attached to provide a seal to the fuel line 212. Temperature measuring equipment 224 may also be provided to monitor the temperature of the pebbles at the well bottom. Radiation pyrometers for this purpose are commercially available. The temperature measuring equipment 224 can be connected to a control system 226 to regulate the flow of fuel into the fuel line 212. The control system 226 is shown connected to a fuel line valve 228. While not shown, a source of fuel, either a gas or a liquid, can be connected to the surface fuel line 230.

According to the structure set forth in FIG. 12, the heated air which is injected into the casing 206 can be further heated by the provision of supplying fuel at the downhole location. The temperature of the air forced into the top of the casing 206 via the pipe 28 is preferably at about 1200° F., but with the addition of fuel and the resulting heat of combustion in the area of the pebbles 204, the temperature of the preheated air can be increased in the range of 1200° F.–4500° F., depending upon the type and amount of fuel utilized. In the preferred form of the invention, it is contemplated that gases, including natural gas, propane, butane, etc., can be utilized as the fuel, as such fuels are characterized by a clean burn. However, other gases can be utilized, as well as liquid fuels such as fuel oil and diesel can be injected at the downhole location.

It is contemplated that a number of injection wells, such as the type shown in FIG. 12, will be formed in the contaminated zone to provide wide area decontamination coverage. The injection wells may be spaced apart in a network at distances of about 15 feet. Again, temperature monitoring probes can be inserted into the ground at suitable depths to monitor the temperature of the contaminated formation.

After the requisite number of injection wells have been constructed, preheated air is injected therein, according to a schedule described above for initially purging the formation of water, and in a manner to prevent excessive condensation of soil moisture. After the initial heating steps have been carried out, the temperature of the preheated air forced into the wellhead pipe 28 is increased to about 1200° F. The equipment described above can be utilized for producing such a source of pressurized and preheated air. The preheated air is forced into the casing 206 at a pressure of about 7–20 psig. The preheated air is forced into the casing 206 for a time sufficient to heat the pebbles 204 to a temperature for igniting the type of fuel supplied to the surface fuel line 230. A pebble temperature of 1200° F.–1500° F. is generally sufficient to ignite most hydrocarbon fuels. After the pebbles 204 have been heated sufficiently, the supply of fuel is allowed to flow into the fuel line 212 where it exits in the area of the pebbles 204. The fuel then ignites to provide a hot combustion gas for further heating the pebbles 204 to a higher temperature. Depending upon the type of fuel, and the fuel flow in the line 212, downhole temperatures ranging upwardly of 4500° F. can be achieved. The constant source of pressurized preheated air supplied to the wellhead pipe 28 forces the yet hotter downhole gases laterally into the contaminated formation 202. The hot gases permeate the formation and vaporize and/or oxidize the contaminants in the manner described above.

Under steady state conditions, the downhole temperature of the gases can be mathematically calculated, based upon the temperature of the preheated air forced down the casing 206, the type of fuel, and the fuel flow. After a steady state temperature condition has been reached, the fuel flow can be regulated by the control system 226. Also, the combustion of the fuel provided at the downhole location can be adequately supported by the oxygen in the pressurized preheated air forced into the casing 206. The pebbles 204 function somewhat as a heat sink to thereby provide a rapid and constant heating of the fuel as it exits the bottom 214 of the ceramic fuel distributor 215.

A significant advantage of the downhole heating of gases and air by a secondary combustion is that expensive surface equipment can be eliminated. Further, with an increased air temperature forced into the contaminated formation 202, organic compounds, such as polychlorinated biphenyls (PCBs) can be oxidatively destroyed. PCBs are of very low volatility and are resistant to oxidation at lower temperatures. Soil temperatures in the range of 800° F.–850° F. are achievable by utilizing this technique to oxidize many organic and inorganic contaminants. Moreover, even if these high soil temperatures are not desired, the present technique can be utilized to heat the soil more quickly to achieve a stable temperature. Indeed, many hours and days of soil heating by primary combustion techniques can be saved, which otherwise would be required to heat the soil to the requisite steady state temperature. In this latter case, a smaller volume of heated air can be supplied to the casing 206, thereby further reducing the volume requirements of air compressing equipment. While the present technique is described in terms of maintaining a 1200° F. supply of preheated air to the casing 206, those skilled in the art may find that after the fuel has been sufficiently heated to ignite at a downhole location, such combustion can provide sufficient heat that the surface burner 49 can be deenergized. As noted above, the temperature of the air from the compressor is then about 300° F., which provides the necessary pressurized air and oxygen supply for the downhole fuel combustion, thereby further realizing system efficiency.

Figure 13:
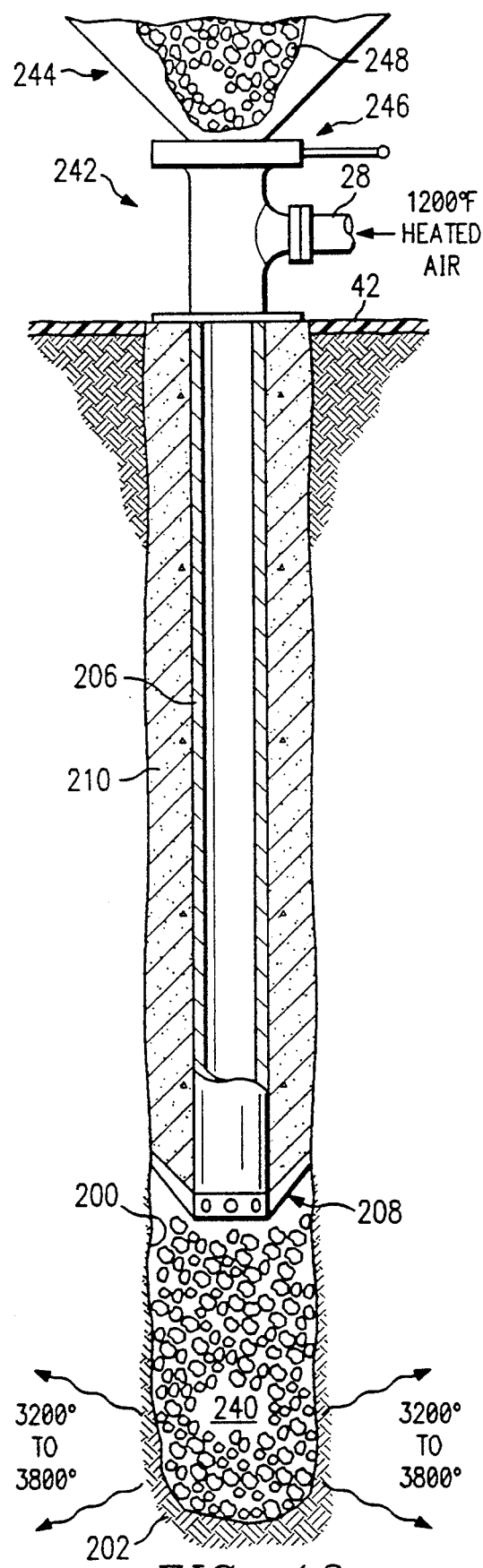
FIG. 13 is a side sectional view of an injection well adapted for burning a solid fuel at the bottom of the wellbore.

FIG. 13 illustrates another technique for providing a secondary combustion fuel at a downhole location to increase the temperature of the air or gas injected into the contaminated formation 202. The injection well according to this technique is similar to that described above in connection with FIG. 12, in that the casing 206, the cement basket 208 and the annulus cement 210 are formed in a similar manner. However, no pebbles are provided at the bottom of the borehole 200, but rather a solid combustion fuel 240 fills such area. The solid fuel 240 may be a coke, coal, charcoal or other suitable solid fuel. The solid fuel 240 can be initially loaded at the downhole location before the fixing of the casing 206 therein, or subsequent thereto. In other words, after the casing 206 is fixed in the wellbore 200 by the cement the solid fuel can be manually fed down the casing 206 until it fills the bottom of the wellbore 200. A sufficient volume of the wellbore can be filled with the solid fuel 240 to provide the requisite energy for increasing the temperature of the preheated air forced into the wellhead pipe 220. Those skilled in the art can readily calculate the heat energy required to decontaminate the soil, and therefrom the amount of solid fuel to be burned to provide such energy. 15 The wellhead 242 may be fabricated to seal the top of the casing 206, provide a source of heated air to the casing by way of the pipe 28, as well as provide attachment to a slide chute 244 for holding a reserve supply 248 of the solid fuel. Fixed between the top of the wellhead 242 and the slide chute 244 is a slide valve 246 which can either manually or hydraulically operated. The slide valve 246 can be opened to allow the reserve solid fuel 248 to fall down the casing 206 to restore spent fuel. In this embodiment, an excess of the solid fuel 240 would remain at the bottom of the wellbore 200, and thus a temperature controller for controlling the rate of fuel flow is not required. However, during burning of the solid fuel 240 it may advantageous to periodically add the reserve solid fuel 248 by actuation of the slide valve 246, and the temperature of the hot gases forced in the formation can be maintained constant. Depending upon the type of solid fuel utilized, the 1200° F. preheated air forced into the casing 206 can be increased at the downhole location to about 3800° F. Again, once the solid fuel 240 is ignited by the temperature of the preheated air forced into the casing 206, the temperature of the preheated air can be lowered to about 500° F., under which condition, the exit temperature of the gases forced into the formation 202 would remain at about 3200° F. For a six inch diameter wellbore 200, and with a ten feet column of solid fuel 240 at the bottom of the borehole 200, it is envisioned that an initial charge of coke or coal would last about 24 hours. However, and as noted above, it would be preferable to recharge the depleted solid fuel 240 at periodic intervals, such as every six hours.

Figure 14:
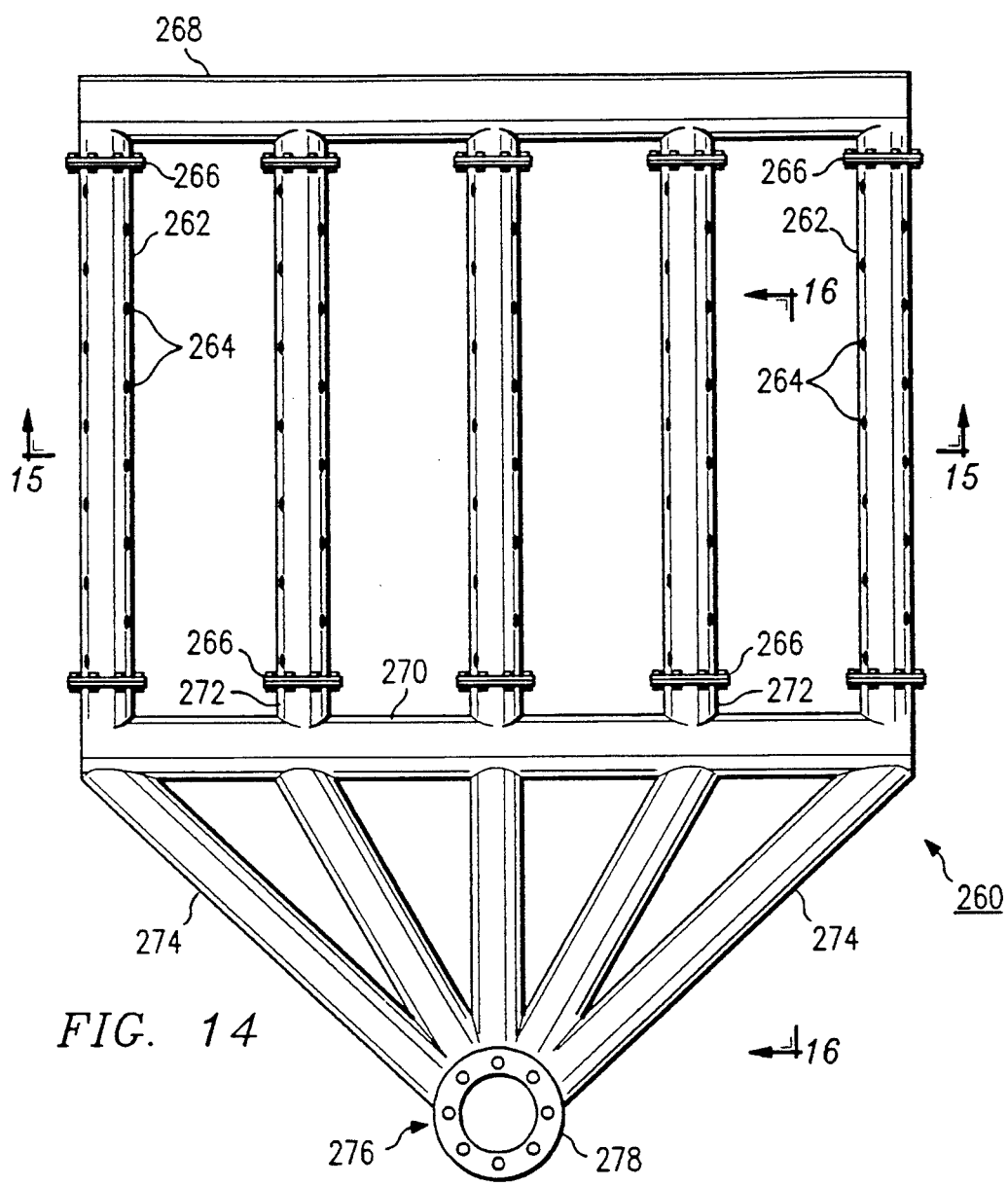
FIG. 14 is a top view of a subsurface pipe network through which heated air flows to treat excavated contaminated earth material.
Figure 15:
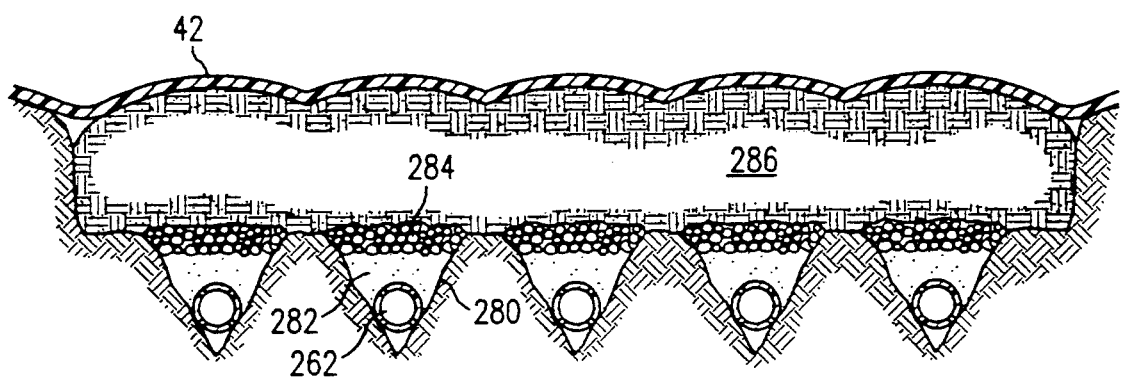
FIGS. 15 and 16 are respective cross-sectional views of the subsurface pipe network of FIG. 14, taken along lines 15—15 and 16—16 of FIG. 14.
Figure 16:
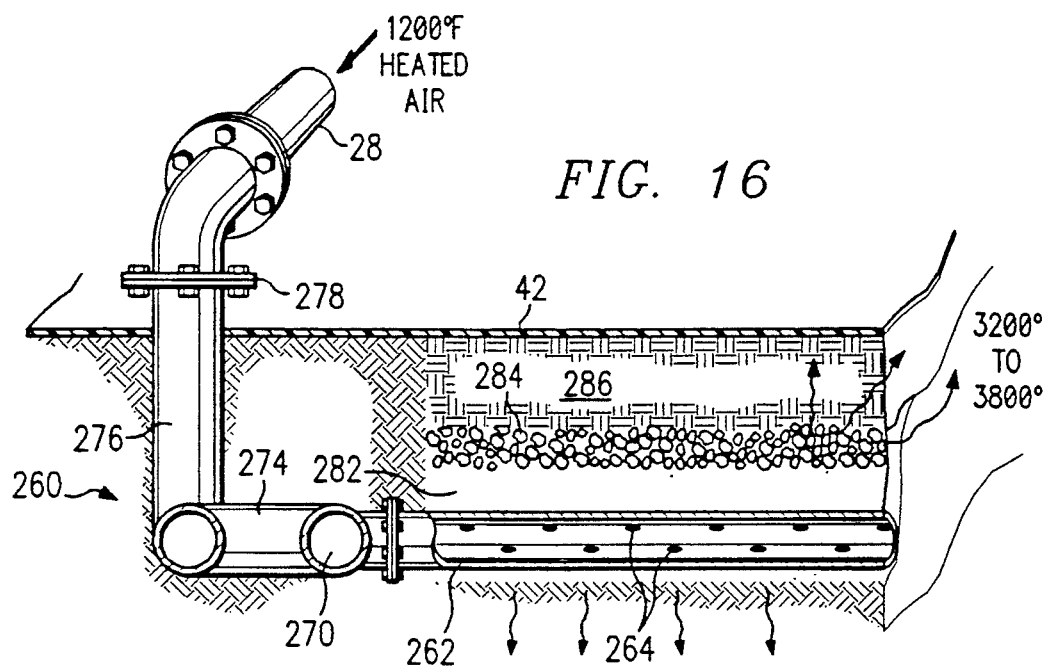

FIGS. 14-16 illustrate yet another embodiment for disposing a solid fuel at a subsurface location to further increase the temperature of a preheated gas or air which is supplied to the fuel. Such a technique is well suited for use with horizontal conduits or tubing disposed throughout the contaminated zone.

A portable and reusable tubular network or matrix 260 is employed for decontaminated excavated soil or earth material. Decontaminated earth material arising from surface petroleum spills or leaks can be excavated to a depth sufficient to remove the contaminated material. The tubular matrix 260 is then installed at the bottom of the excavated depression and covered with an insulating material, a secondary fuel, and then the excavated and contaminated soil. Energy derived from a heated gas and a secondary combustion of a subsurface fuel is utilized to vaporize contaminants from the earth material.

The tubular network 260 includes a number of sections which can be assembled and disassembled for purposes of portability from one location to another. The same network 260 can be employed in a series of operations to provide wide area decontaminating coverage. Alternatively, a number of such tubular networks 260 can be installed at the same time in a large contaminated and excavated area and operated simultaneously to decontaminate the earth material at one time. The tubular network 260 includes a number of generally parallel laterals 262, each of which includes a number of perforations 264 therearound to allow dispersion of the hot air forced therein. Each tubular lateral 262 is constructed of a high grade stainless steel or carbon steel pipe to withstand the temperature to which it is subjected. The tubular laterals 262 are preferably about 2½ inches in diameter and spaced apart from each other about 5 feet. The length of the perforated pipes 262 and the number of such pipes utilized depends on the area of coverage desired, as well as the volume and pressure of heated air supplied thereto. The ends of the laterals 262 terminate in respective flanges 266 for connection to transverse tubular manifolds 268 and 270. The transverse manifolds 268 and 270 each include spaced apart flanged tubular stubs 272 for connected to the flanged ends of the perforated lateral pipes 262. The transverse tubular manifolds 268 and 270 are each about 4½ inches in diameter to provide equalization of heated air forced into and circulated through the perforated lateral pipes 262. With this construction, the pressure of heated air forced into the perforated lateral pipes 262 is generally equal, thereby providing uniformed dispersion of the heated gas from the perforations 264 and into the surrounding material. A number of hot air distribution pipes 274 branch from a central inlet 276 to the transverse manifold 270. The respective ends of the distribution pipes 274 tend to be aligned with the lateral pipes 262. The central inlet 276 includes a flanged part 278 for connection to surface pipes which deliver the high temperature air to the grid network.

FIG. 15 shows the tubular grid network 260 of FIG. 14 installed in a trench structure for decontaminating excavated soil disposed thereover. The perforated laterals 262 are each disposed in a V-shaped trench 280 which can be easily formed by motor driven plows, or the like. Of course, the transverse manifolds 268 and 270, as well as the distributor pipes 274 would be buried in similar trenches. The trench structure 280 is formed in an excavated area, e.g., an area in which the overlying contaminated soil has been temporarily removed. Ideally, the trench structure is formed in the same shape as the grid network 260, and then the tubular network is laid at the bottom of the trenches. When installed at the bottom of the trenches 280, the entire tubular grid network is covered with an insulating layer 282 of sand, dirt or other earth material. Overlaid on the insulating material 282 is a layer of solid fuel 284, comprising charcoal or other solid fuel. The insulating material 282 prevents the high temperatures of the ignited solid fuel 284 from melting or otherwise deteriorating the grid network 260.

Once the grid network 260 has been appropriately installed in the trench structures, with the insulating material and the solid fuel overlying the perforated pipes 262, the previously excavated and contaminated soil 286 is pushed or otherwise moved into a location overlying the grid network 260. Air or gas heated to a temperature of about 1200° F. can be supplied by way of the surface pipes 28 and other connections or fittings, to the inlet 276 of the grid network 260. The heated air is distributed through the distribution tubes 274 and the transverse manifold 270 to the perforated lateral pipes 262. The heated air exits the perforations 264 and is directed generally upwardly through the insulating material 282 to the overlying solid fuel 284. After a period of heating, the solid fuel reaches a combustion temperature and ignites. The ignition of the solid fuel 284 gives rise to the generation of substantial additional heat which rises through the excavated contaminated soil 286. The contaminants are either vaporized or oxidized and collected under the vapor barrier 42. While not shown, vapor collection apparatus similar to that shown in FIG. 4 can be utilized for attachment with respect to the vapor barrier 42 for withdrawing the contaminated vapors and carrying the same to disposal equipment.

Figure 17A:
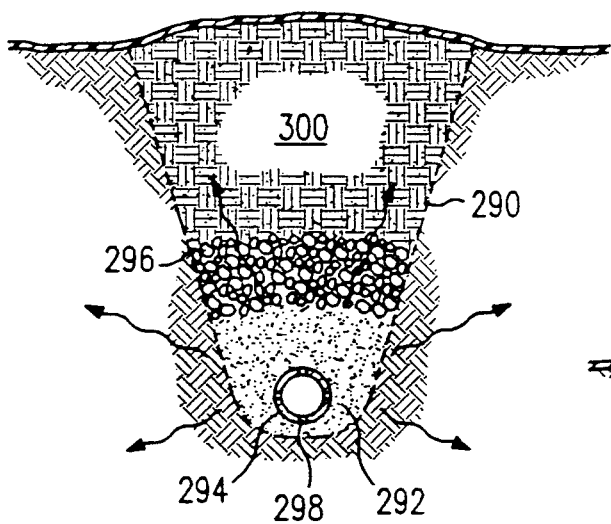
FIGS. 17a and 17b are partial sectional views of trench structures for carrying hot gases and for burning a solid fuel to increase the temperature of the gases injected into the surrounding contaminated soil.

According to another embodiment shown in FIG. 17a, a matrix, or a number of radial trenches are formed either in or at the bottom of the contaminated zone. It is contemplated that with utilization of this technique, it will be especially adapted for decontaminating excavated soils from the surface to a depth of about ten feet. In any event, a trench 290 is formed at the bottom of the zone to be decontaminated. The trench 290 can be of suitable width, such as two feet. A perforated pipe 294 adapted for carrying the heated air is laid on the floor of the trench 290, and covered with an insulating material 292. The insulating material 292 may be sand, soil or sized gravel. In this manner, the insulating material 292 completely covers the perforated pipe 294 to a dimension of about 6-12 inches. The insulating material 292 is preferably of the type which will not fuse at 1200° F.—the temperature of the air which is forced out of the perforated pipe 294. The insulating material should also be adapted for allowing a substantial flow of the heated air outwardly therethrough. Then, a layer of solid fuel, such as coke, coal or charcoal 296 is deposited on top of the insulating material 292.

The pipe 294, having perforations 298, is then connected to surface piping 28 which carries the 1200° F. preheated air. The pipe 294 can be of three inch diameter, constructed of steel or stainless steel. In order to provide sufficient exit of the preheated air from the subsurface pipe 294, the perforations 298 are of about ¼ inch diameter, spaced apart about 36 inches. The spacing and diameter of the perforations depend on the area being treated and available air flow.

After the insulating material 292 has been completely covered with the solid fuel 296, the trench can be covered with the excavated contaminated soil, such as shown by reference character 300. Lastly, the impervious layer 42 of material is placed over the surface to prevent contaminated vapors from escaping into the atmosphere.

Once the horizontal trench structures, pipe and subsurface solid fuel have been distributed throughout the contaminated zone, the surface equipment is activated to force 700° F.-1200° F. preheated air through the delivery pipes 28. The preheated air is generated by the primary combustion of fuel of surface burner/heater equipment. Such preheated air is forced through the horizontal subsurface pipes 294 and exits through the apertures 298. The preheated air exiting the subsurface apertured pipes 294 is effective to heat the solid fuel 296 above the pipe 294 to a temperature sufficient for ignition. It is expected that it will take about 12 hours for the solid fuel 296 to be heated sufficiently to ignite. Thereafter, the solid fuel 296 overlying the subsurface pipe 294 produces a sufficient secondary self-combustion to raise the temperature of the air forced into the contaminated formation to about 3200° F.-3800° F. Such final temperature is a function of the temperature of the preheated air forced into the subsurface pipe structure, as well as the type of solid fuel utilized. Based upon fuel/energy considerations, a charge of solid fuel can be loaded in the trench 290 to produce a desired soil temperature rise for a desired length of time. As can be appreciated, the high temperature air forced out of the subsurface pipe 294 disperses generally outwardly and upwardly, thereby volatilizing or oxidizing the contaminated soil in the vicinity of the pipe 294. After decontamination has been completed, the subsurface pipe 294 can either remain buried, or can be removed.

Figure 17B:
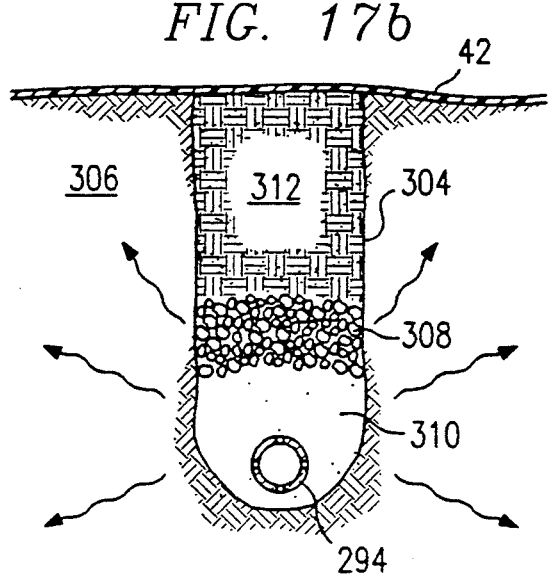

FIG. 17b discloses a preferred embodiment of a trench structure for use with a subsurface-disposed fuel to facilitate heating of the surrounding contaminated earth material. Advantageously, the trench structure shown in FIG. 17b can be utilized for the in situ decontamination of material, without substantially excavating the contaminated material. Shown is a trench 304 formed about 8 feet deep within the contaminated material 306, and about 4 inches wide. Laid within the bottom of the trench 304 is an apertured pipe 298 coupled at one end thereof to a source of pressurized and heated gas. The terminal end of the pipe 298 can be capped, thereby allowing the pressurized and heat air to escape through the apertures in the pipe 298. One or more such apertured pipes 298 can be connected together so as to be fed by a common source of pressurized and heated air. As noted above, a heated gas of a temperature upwardly of about 1200° F. is suitable for vaporizing contaminants in the earth material, as well as igniting a subsurface fuel, such as shown by numeral 308.

In installing the apertured pipe 298 within the trench 304, such pipe is covered with a layer of insulating material 310 such as soil or sand, or other thermal insulating material. Again, the insulating material 310 should overlie the apertured pipe 298 with a sufficient depth so as to prevent the heat generated by the fuel 308 from damaging the pipe 298. Once the insulating material 310 is in place, the fuel 308, preferably in a solid form, and of the type described above, is filled in over the insulating material 310. Sufficient fuel can be placed in the trench 304 to generate the desired amount of heat for a requisite amount of time to vaporize the contaminants in the surrounding soil.

In accordance with an important feature of the invention, the trench is then filled with a finely ground heat sealing material 312, such as limestone. The finely ground limestone 312 exhibits a low permeability to air, and thus to heat generated by the solid fuel 308. In addition, the limestone sealant 312 does not provide a thermal path for the heat generated by the fuel 308 in an upward direction, thereby forcing the heat generated by the solid fuel 308 to be dissipated outwardly. It has been found that by covering the solid fuel 308 with a sealant material 312, the lateral area influenced by the subsurface-generated heat is increased. As a result, the lateral area in which decontamination occurs due to vaporization of the contaminants is also increased by the provision of the sealant layer 312.

In practice, the layer of sealing material 312 comprises a 200 mesh ground limestone material. During installation of the sealing layer 312, the finely ground limestone is tamped or otherwise compressed so as to provide a low permeability to air or gas therethrough. In addition, the sealing material 312 can be wetted with various salt solutions to decrease the porosity of the sealing material 312. Various salt solutions, including calcium chloride, or sodium chloride, or sodium silicate, and water can be used to wet the sealing material 312 as successive layers thereof are installed in the trench 304. Once the water evaporates, the remaining salts crystallize and fill in the pore spaces within the sealing material 312, thereby reducing the permeability thereof. It is believed that other finely divided materials can function as the sealing material 312, including phosphate rock, bauxite, kaolinits, bentonits, and similar natural clays.

As with other embodiments described above, a heated gas or air can be forced through the apertured pipe 298 to ignite the fuel 308 and increase the temperature of the contaminated formation. Once the subsurface fuel 308 is ignited, the heated air which permeates the contaminated formation 308 accelerates the vaporization of contaminants so that the overall contamination procedure is enhanced. In addition, low volatility contaminants can be removed from the formation due to the increased formation temperature resulting from the energy given off by the fuel 308.

In all of the embodiments described above in which a fuel is provided at a subsurface location to increase the temperature of the air, a vapor recovery system, such as that described above, can be utilized.

Figure 18:
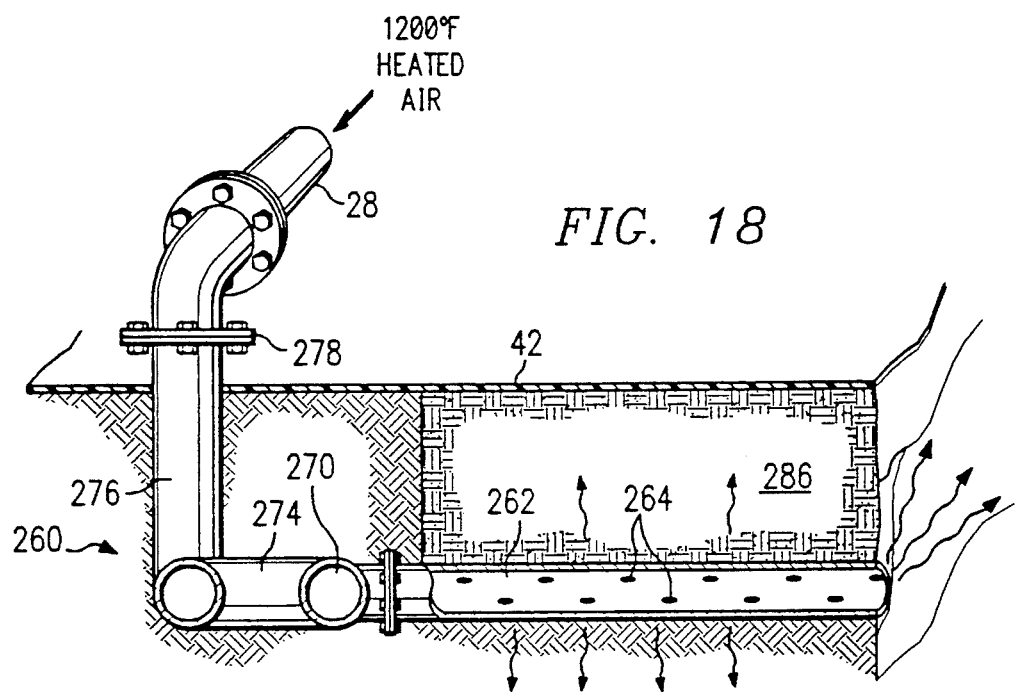
FIG. 18 is a sectional view of the trench structure and a buried apertured pipe adapted for carrying and dispersing heated air to provide energy to decontaminate overlying contaminated material.

The horizontally situated aperture pipes have been described above in connection with the use of a solid fuel for providing additional energy to vaporize contaminants. However, the use of a subsurface fuel is not absolutely necessary in order to provide decontamination capabilities. FIG. 18 illustrates the decontamination apparatus of FIG. 16, but without the use of a subsurface solid fuel. Here, the heated gas forced into the surface aperture pipes 262 is effective itself to provide the medium for vaporizing the contaminants in the overlying earth material. Also, because there is no subsurface fuel, the insulating layer is also not required. Singular apertured pipes, or a connected grid of such pipes can be laid on the floor of an excavated site, or in trenches formed in the excavated floor site. The contaminated earth material is then pushed back over the apertured pipes 262. Next, the apertured pipes 262 are connected to a source of heated air so that the air is forced out through the aperture of the pipe 262 and into the contaminated material overlying the pipes. Air heated upwardly to a temperature of 1200° F. can be forced into the apertured pipes 262 and provide sufficient heat transfer to the contaminated soil 286 to vaporize the contaminants therein. Of course, a vapor barrier 42 is overlaid on the contaminated soil 286 to prevent escape of the vapors into the environment. The contaminated vapors can be collected and disposed of in a safe manner.

After decontamination of the material 286 overlying the apertured pipes 262 has been achieved, the decontaminated soil can be removed by power equipment, and other contaminated material can be deposited on and about the apertured pipes 262. In the alternative, the apertured pipes 262 can be removed from the decontaminated soil and located at another excavated site for achieving decontamination of the material located at such site. In this manner, decontamination can be accomplished in the different sites in a series manner to effectively decontaminate a large area of earth material. Depending upon the area to be decontaminated, an entire surface layer of the contaminated site can be removed and the grid structure installed on a small area of the site floor. Contaminated soil can then be pushed by motorized equipment to cover the pipes 262 for decontamination in the manner described above. After the contaminants have been removed, the soil overlying the apertured pipes 262 can be pushed to a permanent position at another area of the excavated floor. This process can continue until all of the excavated soil has been decontaminated, and the site essentially restored with the decontaminated material.

Figure 19:
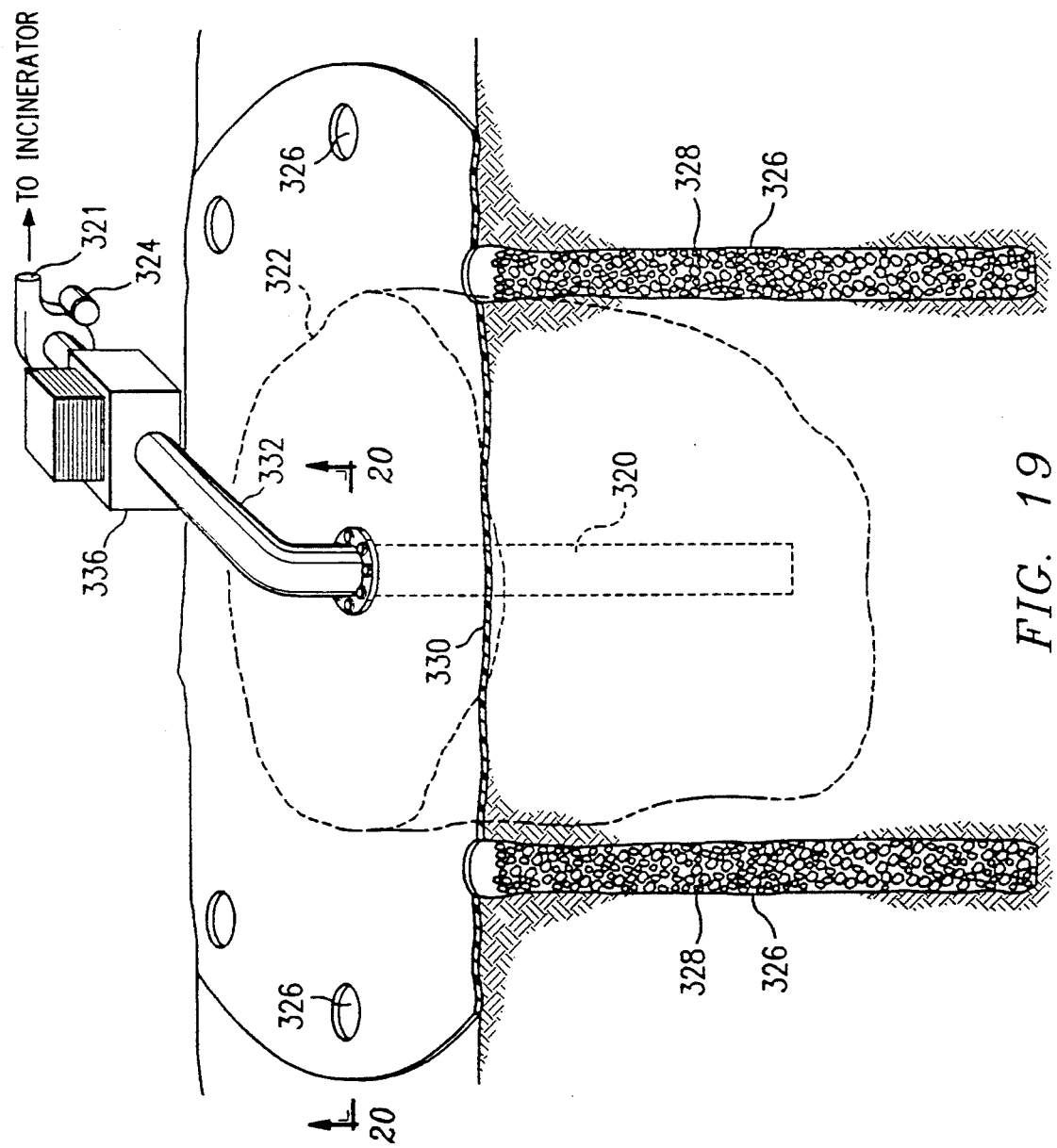
FIG. 19 is an isometric view of a sectioned portion of a contaminated zone in which a vacuum extraction well is formed to cause the movement of air heated by other fuel-loaded wells.

The invention is described above in terms of applications in which air or a gas is forced into casings or apertured pipes for communication thereof into the earth material. However, the movement of air through the contaminated soil can be achieved by vacuum techniques as well. U.S. Pat. No. 4,660,639 discloses apparatus and vacuum extraction techniques for the in situ removal of contaminants located in the vadose zone. Indeed, subsurface heating of the soil can be employed in conjunction with conventional vacuum extraction techniques to expedite the volatilization of contaminants and the removal thereof from the soil. FIG. 19 illustrates vacuum extraction equipment utilized in conjunction with a subsurface fuel to produce the movement of a heated gas through the contaminated material.

Shown in FIG. 19 is a vacuum recovery well 320, preferably formed within a zone of contaminated earth material 322, shown in broken line. The recovery well 320 is formed a suitable depth within the earth such that when a below-atmospheric pressure is applied to the well 320, air or gas is caused to be moved through the contaminated zone 322. Typically, vacuum extraction techniques do not move high temperature air through the soil, and thus the volatilization of the contaminants takes place over a substantial period of time, such as a number of months, or even a year. In addition, conventional vacuum extraction techniques are presently suitable for removal of only high volatility contaminants, and are ineffective to remove low volatility contaminants and solids. In accordance with conventional vacuum extraction techniques, the recovery well 320 is coupled to a source of vacuum, or a below-atmospheric pressure generating source 321, which is driven by a gasoline engine or electric motor 324. From the vacuum generator 321, the vapor contaminants extracted from the zone 322 are transferred to an incinerator, or to a condenser or charcoal absorber for recovery of the vaporized contaminants.

In accordance with the invention, one or more other wells 326 can be formed at a location in the earth formation, and filled with a fuel 328, such as coke, coal or charcoal. Preferably, the fuel-loaded wells 326 are formed at locations in the earth formation such that the contaminated zone 322 is located between the vacuum recovery well 320 and the fuel-loaded wells 326. Once the wells 326 are formed at appropriate locations with respect to the vacuum recovery well 320, an impervious layer or barrier 330 can be placed over the contaminated zone 322 and sealed to or around the vacuum extraction piping 332. The impervious material 330 is shown extending over the earth material in which the fuel-loaded wells 326 are formed, although it is not absolutely necessary that the impervious material extend outwardly to such an extent.

The impervious material 330 functions to prevent air from entering the surface of the soil over the contaminated zone 322. The impervious surface material 330 thereby extends the horizontal path of the air moved through the subsurface formation so that the air must pass in the vicinity of one or more of the fuel-loaded wells 326. The air which is caused to be moved through the earth material proximate the fuel-loaded wells 326 is heated to a temperature higher than it otherwise would be, thereby facilitating volatilization of the contaminants within the zone 322. Moreover, it is noted that the fuel-loaded wells 326 are open at the top so that air can be drawn downwardly into the wells 326 to provide an ample supply of oxygen for combustion of the solid fuel 328. The combustion byproducts generated by the burning fuel 328 are also drawn through the earth material, and through the contaminated zone 322 centrally to the vacuum recovery well 320. As can be appreciated, the impervious material 330 functions to prevent the short-cutting of air from the surface to the vacuum recovery well 320, without first passing proximate the fuel-loaded cells 326. As noted above, a substantial amount of energy can be generated by the burning of a solid fuel 328 within the wells 326. Such energy can be transferred in the form of heat to the contaminated zone 322 to facilitate the vaporization of contaminants, whether of the type characterized by high or low volatilities.

Because of the increase in temperature of the gas extracted by way of the recovery well 320, the piping connections 332 are preferably constructed of materials which can withstand the heat. The temperature of the air extracted from the contaminated zone 322, then carried by the surface piping 332, may be upwardly of about 800° F. As a result, cooling equipment 336 may be required before the air recovered from the earth formation is drawn into the vacuum pump 321. The cooling equipment 336 may comprise a cooler-condenser with circulating water functioning as the contact liquid. Sufficient energy in the form of heat can be removed from the contaminated air carried by the surface piping 332 so that the vaporized contaminants carried through the vacuum pump 321 do not exceed its operating temperature.

Figure 20:
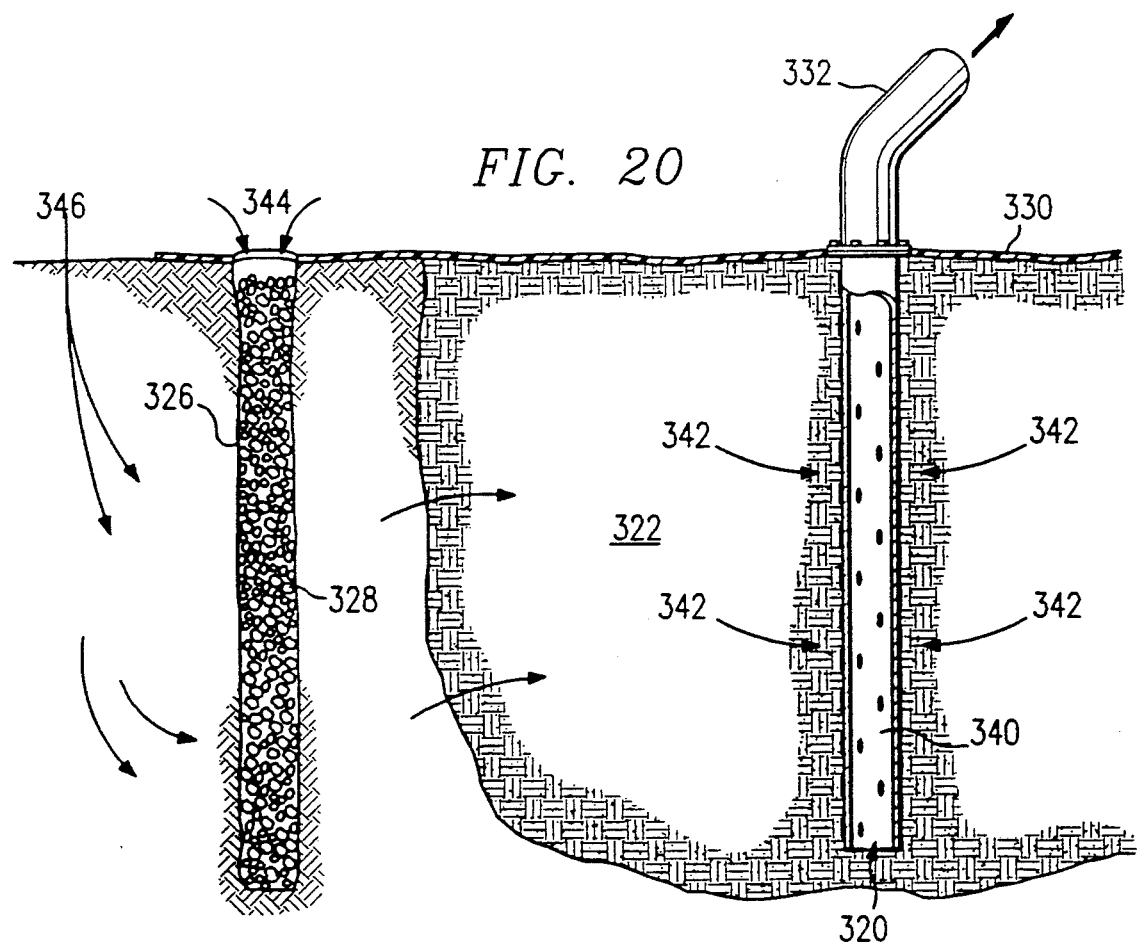
FIG. 20 is a sectional view of a portion of a contaminated zone, taken along line 20—20 of FIG. 19.

In operation of the enhanced vacuum extraction technique, reference is made to FIGS. 19 and 20. FIG. 20 illustrates the vacuum recovery well 320 having a perforated casing 340, the perforations being of sufficient number to provide an unrestricted flow of air from the surrounding contaminated zone 322 into the casing 340 by the action of a vacuum applied thereto, via the surface piping 332. The decontamination operation commences by starting the vacuum pump 321 to create a below-atmospheric pressure in the recovery well 320, via the surface piping 332. Once a flow of air has been established through the contaminated zone 322, the fuel 328 in the wells 326 is ignited by manual means, or otherwise. The fuel 328 can be ignited by saturating a top portion thereof with a liquid fuel, and igniting the liquid fuel with a flame. The solid fuel 328 will then ignite, and combustion will be sustained as fresh air is drawn into the top of the well 326 to provide the oxygen for continued combustion. Again, the impervious layer 330 or barrier material prevents air from entering the surface of the contaminated zone and bypassing the heat-generating wells 326. As the fuel 328 reaches its stabilized operating temperature, which may be as high as 3200° F., depending upon the type and amount of fuel utilized, the temperature of the air 342 moved through the contaminated zone 322 also increases. The increased temperature air 342 first vaporizes the moisture or other condensed liquids in the earth material and thereby enhances or facilitates the porosity of the earth material. With increased soil porosity, the volume of heated air moved through the contaminated zone 332 is increased, thereby reducing the overall time to remove the contaminants.

As noted in FIG. 20, atmospheric air which is drawn into the earth material by way of the surface opening to the wells 326, shown by arrows 344. A majority of air which is drawn from the atmosphere into the earth material is at a location peripheral to the barrier 330, such as shown by arrow 346. The air entrained into the soil peripheral to the barrier 330 passes proximate, or in the vicinity of the heat-generating wells 326 and therefore becomes elevated in temperature. Based upon the number of heat-generating wells employed, and the distance therebetween, the air 346 can reach a temperature of about 1500° F. as it enters the contaminated zone 322. Air temperatures of this nature are highly advantageous in removing contaminants characterized by low volatilities, as well as solid contaminants.

By utilizing bore holes formed into the earth material for holding the solid fuel 328, such fuel can be readily replenished by simply shoveling or otherwise dropping additional fuel down the well 326.

While the vertical wells 326 are contemplated as the preferred technique for use with vacuum extraction techniques, it should be understood that trench-filled solid fuels can also be utilized. The trench structures can be formed in the earth material to a depth of 5-10 feet and partially or fully filled with a solid fuel. The use of open trenches facilitates recharging with additional fuel. Once the solid fuel has been ignited, the heat generated thereby is drawn into the earth and moved toward the contaminated zone 322 under the influence of the pressure differential generated by the vacuum recovery well 320.

Figure 21:
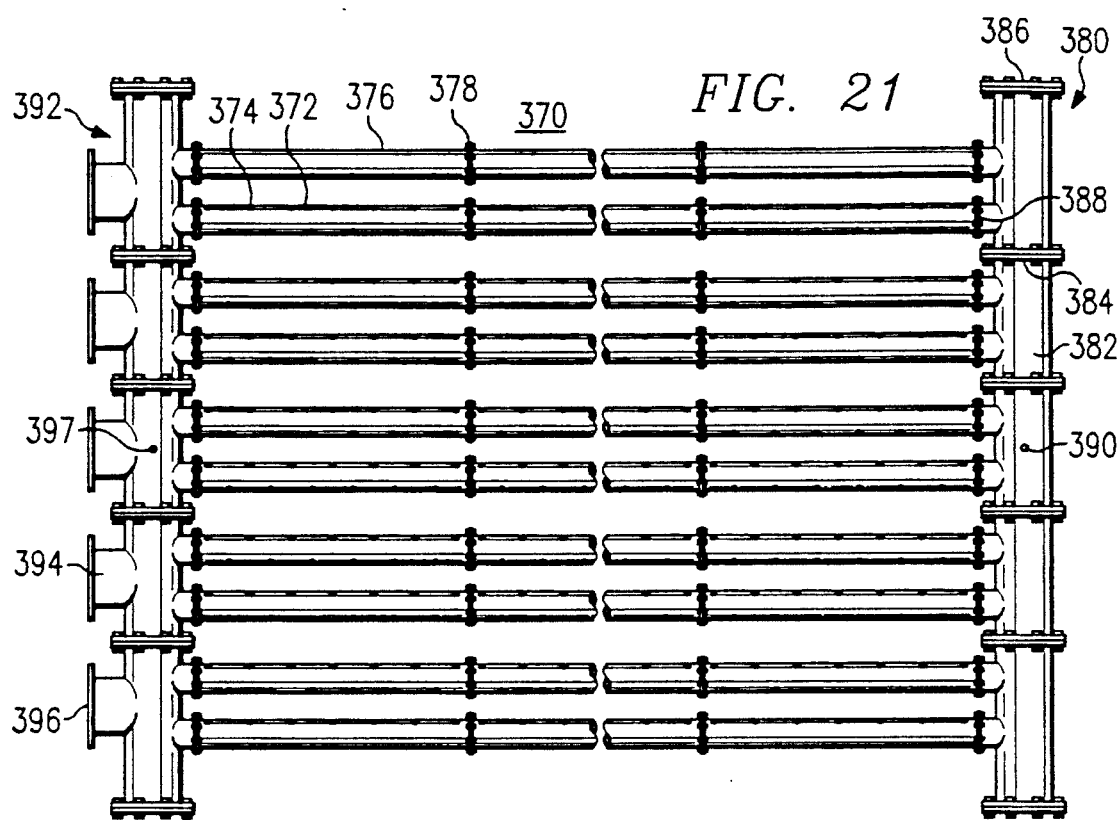
FIG. 21 is a top view of a perforated pipe matrix for decontaminating excavated material.
Figure 22:
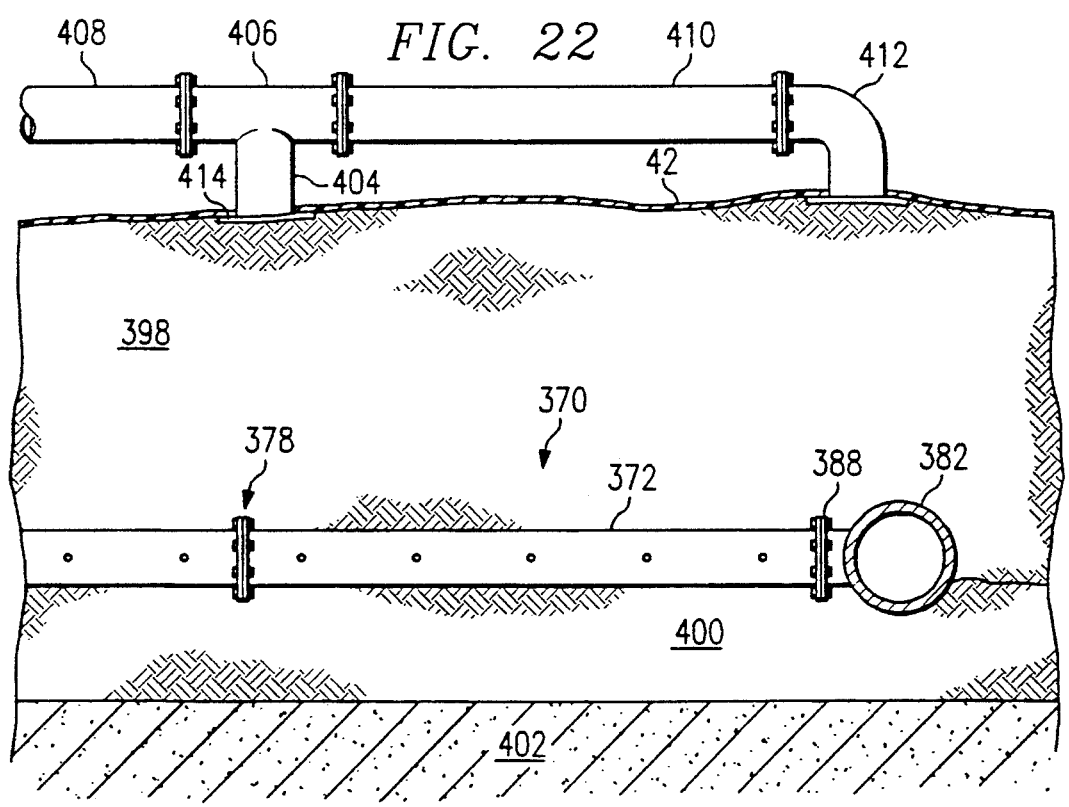
FIG. 22 is a cross-sectional view of the pipe matrix of FIG. 21, as buried in a pile of contaminated material.

FIGS. 21 and 22 illustrate apparatus for use in decontaminating excavated soil or material. According to this embodiment of the invention, a pipe network 370 is situated either on a concrete pad or in open channels of a concrete pad so that contaminated soil or material can be piled thereon, decontaminated using the techniques according to the principles and concepts of the invention, and thereafter removed so that the system can be reused with another load of contaminated material.

With particular reference to FIG. 21, there is illustrated an exemplary network of perforated pipes covering an area of about 110 feet in length by about 50 feet in width. The area of coverage for decontaminating material piled on the network depends of course on the number of perforated pipes utilized. The network 370 includes a number of pipes 372 that are perforated on each side thereof, i.e., at the 90° and 270° positions so that hot gases are forced laterally outwardly from the sides of the pipe. As noted, the perforated pipes 372 have perforations 374 at alternate axial positions therealong. Different perforated pipes 376 that extend along the opposing outside boundaries of the network 370 are perforated only one side thereof so that hot gases are emitted inwardly with respect to the pipe network. Each type of perforated pipe 372 and 376 includes opposing ends with flanges, such as 378 so that the pipes can be joined together end-to-end by bolts, clamps or other suitable fasteners. Each perforated pipe 372 and 376 is preferably about two inches diameter, and constructed of heat treated carbon steel with 0.043 inch sidewalls. The perforations comprise quarter inch holes spaced apart about four feet.

The perforated pipes 372 and 376 are joined together at one end of the network 370 to a multi-section manifold 380. Each manifold section 382 is constructed of a ten foot length of four inch diameter carbon steel pipe, of the same type as that of the perforated pipes 372 and 376. Each manifold section 382 includes an end flange 384 for joining to other similar manifolds, or for capping with a plate cap 386 at each end of the manifold 380. Again, bolts, clamps or other suitable fasteners fix the sections 382 together. Further, formed on the curved sidewall of each closed manifold section 382 is a pair of coupling flanges 388 for coupling to the flanged end of the perforated pipes 372 and 376. The manifold 380 functions to equalize the pressure of hot gases at the ends of each of the perforated pipes 372 and 376 and thereby allow the hot gases to be injected into the overlying contaminated material in a more uniform manner. The manifold 380 thereby provides a more uniform heating of the contaminated material and reduce the likelihood of hot or cold spots. At least one of the manifold sections 382 includes an instrumentation port 390 for receiving temperature, pressure or other instrumentation probes for use in monitoring the various parameters during the decontamination process.

At the inlet side of the pipe network 370, each perforated pipe 372 and 376 is coupled to an inlet manifold 392. The sections of the inlet manifold 392 are substantially identical to the manifold sections 382, except the inlet sections 392 include an inlet flanged pipe 394. The pipe 394 is of the same diameter as the manifold section. The inlet manifold sections 392 are also coupled together at flanged ends and capped as appropriate, with other flanged ports connectable to the perforated pipes 372 and 376. While not shown, the flanged inlets 394 of the inlet manifold sections can be connected together with flexible or rigid insulated pipes to a source of hot gas or air. In the preferred embodiment of the invention, each flanged inlet 394 is connected by an insulated flexible tube to a port on a combustion chamber fired by a blower/burner assembly (not shown). Temperature or instrumentation probes can be fixed to one or more ports 397 of the inlet manifold 392. As can be appreciated, contaminated soil can be piled over the perforated pipe network 370, including the closed manifold 380 and the inlet manifold 392. As can be appreciated from the foregoing, the network of perforated pipes can be made as a unitary welded structure, rather than fastened together in sections as illustrated.

FIG. 22 illustrates a sectional view along a portion of the network 370, with a contaminated material 398 piled thereon. Initially, the pipe network 370 can be laid on a bed of dirt 400 that remains on a concrete pad 402. The dirt bed 400 is not replaced, but remains as long as the system is used for decontaminating material.

The inlet (not shown) of the pipe network 370 is connected to a source of pressurized and heated air for delivery through the inlet manifold 392 to each of the perforated pipes 372 and 376. As shown, contaminated soil 398 or contaminated earth material is piled on the dirt bed 400 and over the pipe network 370, as shown in FIG. 21. The depth of the contaminated soil 398 may be 5–7 feet, although the dirt may be loaded on the pipe network 370 to a greater depth, with an attendant increase in the time required for complete decontamination. With this embodiment, no solid fuel is placed next to the pipe network 370, but rather the sole source of energy is the heated air forced into the inlet manifold 392. A foil or other suitable barrier 42 is laid over the contaminated soil 398 to capture vaporized contaminants during the decontamination process. The barrier 42 is connected to a suction system to aid in pulling the heated air through the contaminated material 398 and for removing the vaporized contaminants for incineration for other disposal. The peripheral edge of the barrier 42 is held tightly to the concrete pad 402 with weights to prevent entrainment of atmospheric air into the contaminated soil 398 which would otherwise reduce the efficiency of the system. Preferably, the barrier 42 is sealed around each vapor removal pipe 402 and 404 to maintain a seal and allow vaporized contaminants to either be drawn from the system and removed by incineration techniques, or to be reheated and recirculated through the system to further heat the contaminated material 398. In this latter case, and to be described in more detail below with another embodiment of the invention, make-up air is admitted into the system so that combustion in the burner can be supported.

In another embodiment of the invention, the concrete pad 402 is formed with open channels therein in the shape of the pipe network 370. The open channel network formed in the cement pad accommodates the perforated pipes 372 and 376, as well as the inlet and closed manifolds 380 and 392. With this construction, the perforated pipes 372 and 376, as well as the closed manifold 380 and the inlet manifold 392 are recessed from the surface of the concrete pad so that soil loading equipment can be operated on the cement pad. It can be appreciated that with this arrangement, contaminated soil can be carried and dumped on the pipe network 370 with dirt loading equipment.. After the decontamination process, the soil can then be removed with such equipment and other contaminated soil unloaded on the pipe network 370.

The vapor removal piping shown in FIG. 22 includes a number of "T" sections 406 joined together with a thin wall pipe 408. The T-section 406 is also connected with a pipe 410 to an angle section 412 which defines an end of the vapor removal piping. Each section 406 and 412 includes a collar 14 that rests upon the contaminated material 398 to maintain the vapor removal pipes in an upright position. Such piping can comprise thin wall metal, or even plastic.

FIG. 23 is a sectional view of another embodiment for removing vapor contaminants. The pipe network 370 is shown covered with the contaminated material 398, all sealed with a vapor barrier 42. This vapor removal technique employs a number of rigid pipes, one shown as numeral 420 that is forced through the barrier 42 and into the surface of the contaminated material 398. The ends of the pipes 420 are connected with other flexible hoses 422 to a source of suction and other vapor disposal equipment. This is an uncomplicated and efficient technique for setting up the vapor recover system with each new batch of contaminated material.

The decontamination process utilizing the perforated pipe network 370 is carried out as follows. After the equipment is set up as noted in either FIG. 22 or FIG. 23, a source of heated air or gas, such as a blower, a burner and combustion chamber, are connected to the flanged inlets 396 of the inlet manifold 392. A compressor or blower is then activated to commence forcing air through the piping network 370. Initially, the compressor develops sufficient energy to heat the air to about 300° F., which is then forced through the contaminated soil 398. When the temperature of the soil rises to 200° F., or so, the water moisture evaporates and is removed, thereby rendering the contaminated material 398 more porous. Thereafter, the burner is ignited to increase the outlet temperature of the air thereof to about 1200° F., thereby heating the contaminated material 398 upwardly to about 500°–800° F. Depending upon the type of contaminant in the material 398, which is determined by appropriate analysis, the maximum temperature of the material 398 can be determined. For high volatility contaminates such as gasoline, a material temperature of only about 300° F. is required for removal thereof. For other contaminants having lower volatilities, such as diesel fuel, a soil temperature of 500°–600° F. is required for complete removal thereof. Temperature probes located in the manifolds 390 and 392, as well as in the contaminated soil itself 398 may be employed for monitor purposes so that the temperature of the burner can be controlled accordingly. It should also be noted that the vapor recovery system is connected to an incinerator, catalytic converters or the like or other vapor disposal equipment to render the vapors harmless. Also, as noted above, a closed loop system can be employed, and to be discussed in more detail below in another embodiment, in which a certain amount the heated vapors removed by the vapor removal system can be recirculated through the burner and back through the contaminated soil 398.

After the contaminants in the material 398 have been vaporized or oxidized, the burner can be shut off while the blower is continued to run to circulate air through the decontaminated material to cool down both the material and the system. After the decontaminated material has sufficiently cooled, the vapor recovery system can be removed, as well as the barrier 42, and then the decontaminated soil can be loaded and trucked away. A new load of contaminated material can then be piled or dumped on the pipe network 370 to recommence the decontamination process. As can be appreciated, this technique is especially well adapted for decontaminating excavated soil of the type in which the contamination is shallow, located in a location that is not readily accessible for operation of a soil remediation system, or in an area that is water logged Or heavily saturated with liquids.

FIG. 24 depicts another embodiment of a material decontamination system 460 that is well adapted for decontaminating small volumes of excavated, contaminated material, and that can be readily moved from location to location. The system 460 includes a skid-mounted burner/blower assembly 462 and vapor disposal equipment, and a skid-mounted containment vessel 464 in which contaminated material can be loaded from the top and removed from the back. The burner/blower assembly 462 is coupled to the container 464 by a first flexible pipe 466 for removing vaporized contaminants from the container 464, and one or more other flexible pipes 468 for coupling pressurized, hot air to the container 364. Although the insulated flexible piping is convenient, the connections between the equipment skid 474 and the container skid 476 can be rigid pipes, preferably insulated. Also shown is a removable lid 470 for loading contaminated dirt or other material into the container 464, and a hinged door 472 that can be opened to remove decontaminated material therefrom. While the burner/blower assembly 462 and the container 464 can be fabricated as an integral unit, it is preferred for purposes of mobility that the burner/blower assembly 462 be mounted on a skid 474 so that such assembly 462 can be placed within an empty container 464 and transported together. The container 464 itself is also mounted on a skid 476 to provide a base and for allowing movement in the locale of the contaminated material. In the preferred form of the invention, the burner/blower assembly 462 includes three gas-powered burners 480, a compressor 482, a bank of catalytic converters 484, and a control panel 486 for manually controlling the operation of the system 460. While not specifically shown, the burners 480 are coupled to a single combustion chamber that has four outlets, each coupled to a corresponding injection pipe of the container 464.

FIG. 25 is a front plan view of the container 464 with the lid 470 shown removed upwardly from the container. In the preferred embodiment Of the invention, the container 464 is about twenty feet long, eight feet wide, and seven feet tall so that it can be transported on a trailer on public highways. The container 464 can accommodate about 35-38 ton of material, but preferably is not loaded completely full in order for a small air space to exist at the top thereof. The container 464 is of a double wall construction having an inner metal sidewall 500 of quarter inch carbon steel spaced apart from an outer quarter inch sidewall steel plate 502 by about one and one-half inches. Disposed between the sidewalls 500 and 502 is a one inch thick board-type insulation 504 to increase the thermal efficiency of the unit. Particularly, an insulation of the type Enerok 1200/80 that is bonded together at its ends and to the inner sidewall 500 with a Sairset AP Green Mortar. An air space 505 thus exists between the insulation 504 and the outer sidewall 502. With an insulated container 464, much of the heat energy is utilized to vaporize contaminants and little heat energy is lost through the sidewalls. The container 464 is a rigid unit with all metal seams welded, and with spaced apart upright steel supports (not shown) in the sidewalls, and to which the inner and outer walls 500 and 502 are welded.

The decontamination container 464 is described herein as being constructed using double sidewalls, with insulation therebetween. However, an alternate sidewall construction can have a single, sturdy inner sidewall, with insulation disposed on the outer surface thereof. With this sidewall arrangement, vertical channels can be welded to the four sidewalls so that the board-type insulation identified above can be inserted in the channels and held against the outside surface of the inner sidewall. During transportation, the insulation can be removed so that it is not damaged. The lid 470 can be similarly constructed and insulated to achieve a more cost effective container unit.

Multiple injection pipes, one shown as reference number 506 are spot welded to the floor of the container 464 to provide ducts for carrying hot air to the interior of the container 464. Each injection pipe 506 is four inches in diameter. Further, each injection pipe 506 has nineteen one-half inch holes formed on each lateral side thereof, staggered with respect to the holes on the other side, so that hot air can exit the pipes outwardly on opposite sides of the pipes at the 38 locations. The injection pipes 506 are each constructed of 316 type stainless steel and spot welded to the bottom of the container 564. In this manner, liquid that is drained from contaminated material can run under the injection pipes 506 to a central liquid outlet 508 formed at a front, lower corner of the container 464. The liquid drain 508 comprises a pipe extending through the double sidewall and can be capped to prevent the escape of hot air during the decontamination process. Each air injection pipe 506 includes a flange 510 that can be coupled either to the flexible pipe 468 extending from the burner/blower assembly 462, or to a rigid connection pipe.

The container 464 is mounted on a skid 476 comprising an "H" beam shown as reference character 512 extending along each side of the container 464, as well as an H-beam extending centrally under the floor of the container 464. Each H-beam has welded thereto a lateral front and rear pipe 514 to fix the ends of the H-beams together. Each H-beam is welded to the bottom of the container 464 to make an integral and rigid structure.

Further shown in FIG. 25 is the removable lid 470 which also includes a double wall, insulated construction. The general surface of the lid 470 includes an inner eighth inch carbon steel sidewall 520, an outer eighth inch carbon steel sidewall 522, with one and one-half inches of insulation 524 interposed therebetween. The peak of the lid 470 comprises a six inch diameter vapor outlet pipe 526 for withdrawing contaminated vapors from the material within the container 464. Eyelets 527 are welded to the outlet pipe 526 for lifting the lid off the container 464. The end of the vapor outlet pipe 526 has a flange 529 welded thereto. The inner and outer lid sidewalls 520 and 522 are welded to the vapor outlet pipe 526 which extends the entire length of the lid 470. As illustrated, the lid 470 includes a peripheral skirt 528 that fits down over the outer sidewall 502 of the container 464. As will be described in more detail below, the lid 470 includes an inner peripheral planar ledge that presses down tightly on a seal assembly 530 formed around the top edge of the container 464 to provide a seal. In the preferred embodiment of the invention, the lid 470 weighs about one ton and thus the weight thereof provides a compressive force on the seal assembly 530, thereby also sealing the unit from the escape of contaminated vapors.

Figure 26:
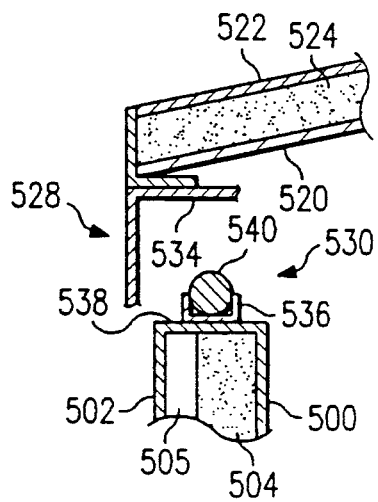
FIG. 26 is a partial cross-sectional view of the container lid and sidewall, with the seal assembly therebetween.
Figure 27:
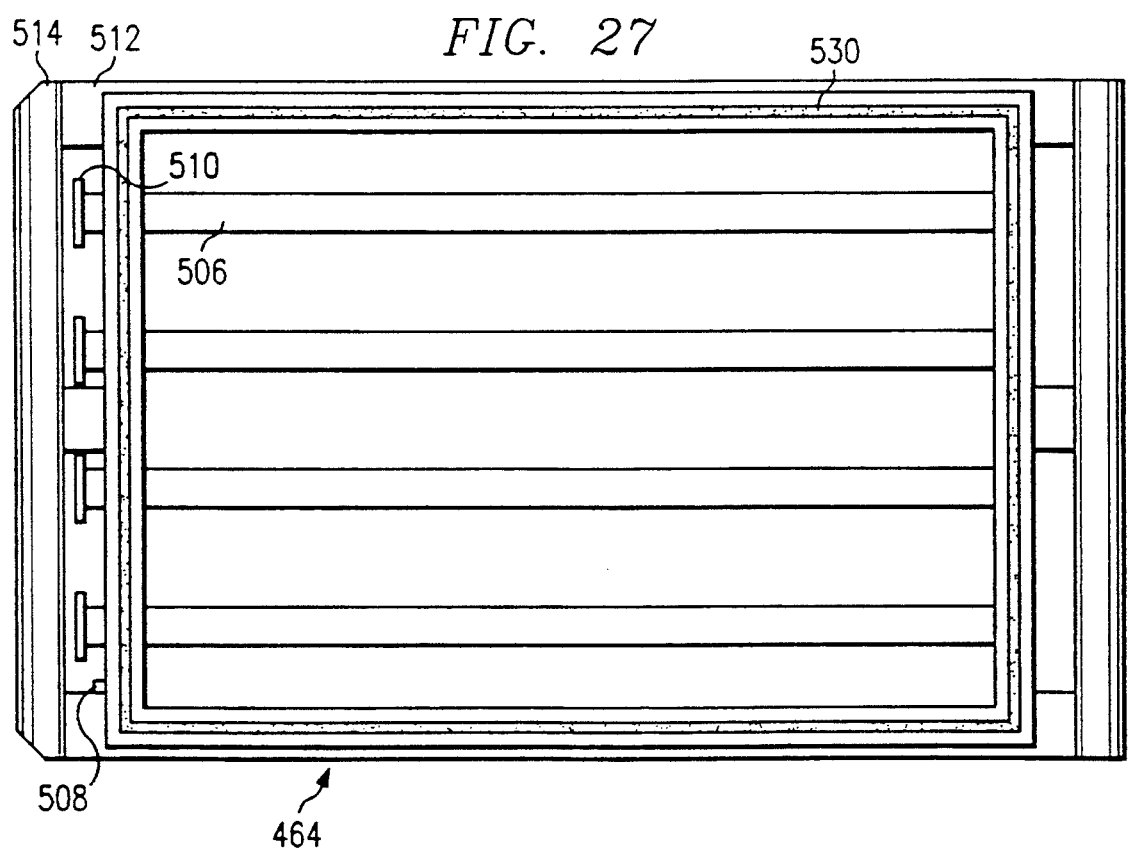
FIG. 27 is a top view of the container with the lid removed.

FIG. 26 illustrates a cross-sectional view of a portion of the lid 470 and a portion of the container sidewalls and the engagement therebetween. As can be seen, the skirt 528 of the lid 470 extends somewhat beyond the outer sidewall 502 of the container 464 so that the lid 470 can rest securely on top of the container 464 and cannot shift laterally when in place. Fabricated atop the double sidewall of the container 464 is the seal assembly 530 for sealing to the planar ledge 534 of the lid. The seal assembly 530 includes a metal channel 536 welded to the top edge 538 of the container sidewall. The channel 536 is welded around the peripheral edge 538 so that no leaks can occur under the channel 536. Fastened within the channel 436 is a packing rope 540. The packing rope 540 extends substantially above the channel 536 and deforms when the lid 470 rests thereon, thereby providing a seal. In the preferred form, the packing rope 540 can withstand temperatures of 2000°-2200° F. and is obtainable from McMaster-Carr Supply Company, Chicago, Ill. The seal assembly 530 is also shown in the top plan view of FIG. 27.

Figure 28:
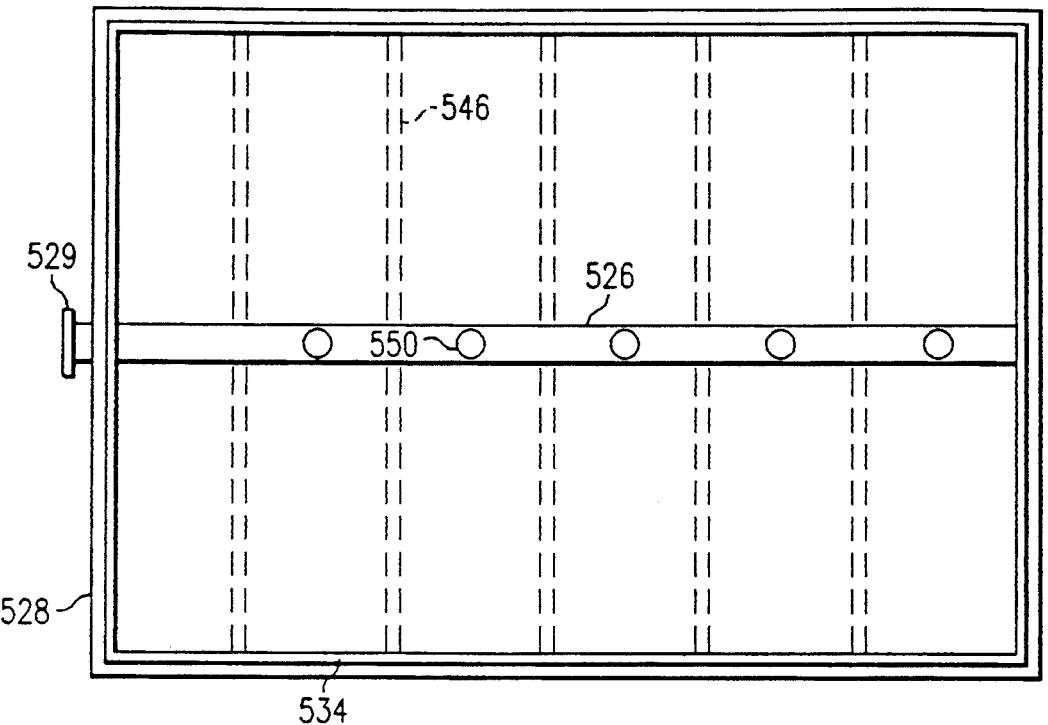
FIG. 28 is a plan view of the container lid, as viewed from below.

A view from the under surface of the container lid 470 is shown in FIG. 28. Shown in phantom are the internal supports 546 formed between the inner and outer walls 520 and 522 for support purposes. As can be seen, the vapor outlet pipe 526 extends the entire length of the lid 470 and includes a plurality of holes 550 for drawing therein vaporized contaminants. The vapor outlet pipe 426 includes a total of five, three-inch holes evenly spaced apart along the length of the pipe.

Figure 30:
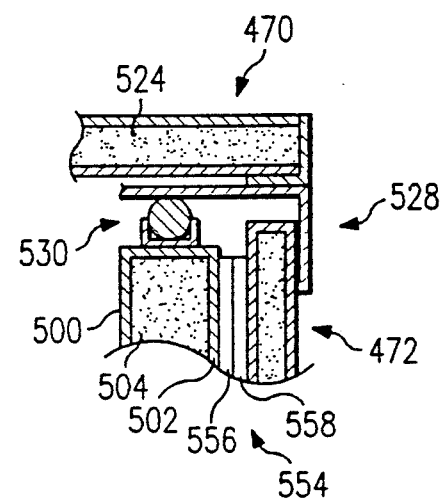
FIG. 30 is a cross-sectional view of a portion of the lid, with the container rear sidewall in the sealed engagement of the container door.
Figure 29:
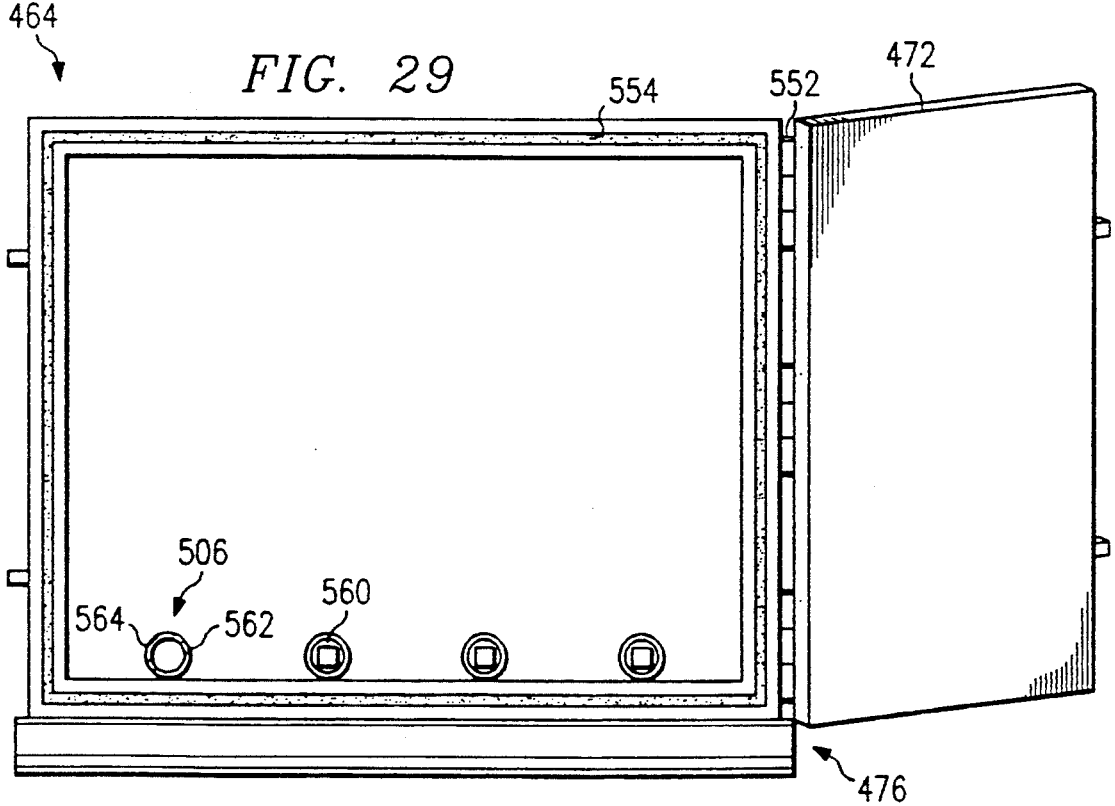
FIG. 29 is a rear view of the container of the invention with the door thereof shown in an opened position.

A plan view from the backside of the container 464 is shown in FIG. 29. The container 464 includes a double wall door 472 hinged to the container sidewall by three hinges, one shown as reference numeral 552. The hinges 552 are welded to the container as well as to the door 472. Like the sidewalls of the container 464, the door 472 is fabricated as two quarter inch steel plates spaced apart one and one-half inches. A board type insulation is placed between the door sidewalls to provide thermal insulation to the unit. While not shown, the door 472 is constructed with internal reinforcement to provide rigidity thereto and prevent distortion thereof due to heavy loading thereon, especially when waterlogged earth material is dumped in the container 464. The door opening edge of the container 464 also includes a seal assembly 554 that provides a hermetic seal between the container sidewalls and the door 472. The door seal assembly 554 is shown in more detail in FIG. 30. In this figure, the double wall door 472 is shown sealed against the back opening of the container 464, and with the lid 470 resting in a sealed relationship thereon. As described above, the lid 470 is sealed to the container top edge by way of the seal assembly 530. The door seal assembly 554 is constructed similarly, with a channel member 556 welded to the back edge sidewall 502 of the container 464, and with a packing rope 558 held in the channel. The packing rope 558 provides a tight seal with respect to the inside wall of the door 472. As can also be appreciated from FIG. 30, when the lid 470 rests on the top edge of the container 464, the lid skirt 528 extends downwardly in overhanging relationship with respect to the top of the hinged door 15 472. In this manner, once the lid 470 is placed on the container, the hinged door 472 cannot be opened. To that end, the skirting 528 of the lid 470 provides additional support to the hinged door 472 against internal loads within the container 464. While not shown, one or more support rods can be utilized to hold the container sides by turnbuckles so that the sides do not bow outwardly under loads.

With reference back to FIG. 29, one injection pipe 506 is shown sectioned to illustratethe lacation of the perforations 562 and 564. The injection pipe 506 includes a first hole 562 and an offset second hole 564. As noted above, the holes are half inch in diameter and formed in a staggered manner in the opposing sidewalls of the injection pipe 506. The holes 562 and 564 formed laterally in the injection pipes 506 tend to prevent material from falling into the injection pipe 506 and obstructing the flow of hot air therethrough. The injection pipes 506 also provide support and rigidity to the bottom of the container 464. The other injection pipes are shown with the back ends thereof capped by screw-on caps 560 secured to internal threads of the pipes. The removable caps 560 allow debris and other particles to be removed from the injection pipes 506, should such pipes become clogged or obstructed with contaminated material loaded in the container 464.

Advantageously, decontaminated material can be removed from the container 464 by opening the door 472 and scooping the decontaminated material out of the container 464 with a front end loader, or the like. Although decontaminated material located between the injection pipes 506 may not be easily removed, such remaining material is not significant.

An alternate floor construction of the container 464 is shown in FIG. 31. Here, a double wall, insulated floor structure is shown with spaced apart metal plates 570 and 572 with thermal insulation 574 disposed therebetween. Attached to the floor wall 572 is an apertured metal floor plate 576 spaced apart and supported by I-beam members 578. The I-beam members 578 may be welded to one wall structure and screwed or riveted to the other. The floor plate 576 is apertured with a number of holes 579 to allow hot air forced into the floor chambers 580 and 582 to be directed upwardly through the holes 579 and into the contaminated soil loaded on the floor. The front end of the floor chambers 580 and 582 are connected either to a manifold (not shown) with flanged injection pipe inlets or directly through inlets to a source of hot air. The back end of the floor chambers 580 and 582 can have access plates for cleaning residue that may have fallen through the holes 579, and in addition would have a liquid drain pipe for removing contaminated liquid that has drained from the material. Those skilled in the art may devise of many other types of apertured floor structures that can withstand the loads anticipated as well as provide ducting for the distribution of hot air into the container 464.

The container door 472 is locked in a closed condition with "over the center" type of latches, as shown in the side view of the container unit depicted in FIG. 32. The door latch assembly 590 comprises a pair of lever-operated latches that securely hold the door 472 in a sealed relationship with the back edges of the container 464. Although a pair of lever-operated latches 590 are shown, additional or other types of latching mechanisms may be utilized.

Also shown are a number of pluggable instrumentation ports 592 for use in inserting thermocouple probes or other instrumentation apparatus inside the container 464 to monitor the progress of the decontamination process. Temperature or instrumentation ports 592 are spaced vertically in the container 464 so that the temperature gradient of the material in the container can be monitored to assess the progress of the decontamination cycle. When not used, the instrumentation ports 592 can be capped to prevent the escape of the contaminated material or hot air. Preferably, after the container 464 is loaded with a material to be decontaminated, but before the decontamination process is commenced, a thermocouple probe can be inserted through the port 592 and partially into the material to monitor temperature, moisture or other parameters. After the material has been decontaminated, the probes are removed before removal of the decontaminated material from the container 464.

FIGS. 33a and 33b illustrate in more detail the lever-operated latches for maintaining the hinged door 472 in a closed and sealed condition. FIGS. 33a and 33b are top views of a portion of the container sidewall 600, the back peripheral edge 602 of the container and the hinged door 472. The lid seal assembly 530 as well as the door seal assembly 554 are also shown. The latch assembly 590 includes a door tab, shown as numeral 604, welded to the vertical edge of the door 472. A pair of connecting members, an upper one thereof shown as numeral 608, is hinged to the door tab 604 by a pin 606. Fastened in a hinged manner between the upper and lower connecting members 608 is a handle 610. The handle 610 is hinged by means of a pin 612, or the like. A short end of the handle 610 includes a camming surface 614 for engagement with a block 616 welded to the container sidewall 600. The latch parts are fabricated so that when the camming edge 614 of the handle 610 is engaged with the block 616, and the handle 610 forced clockwise, as shown in the drawings, to an over center position, the container door 472 is tightly secured against the seal assembly 554. The latched condition of the container door 472 is shown in FIG. 33b. As noted in the drawing, the handle 610 is rotated so that an elongate portion thereof is flush against the container and is disposed between an upper and lower lock tab 620. When in such a position, a bolt or rod 622 can be inserted through a hole in the locking tab 620 to maintain the latch in a locked position. Also noted in the drawings, the handle 610 is slightly angled along its length so that an end 624 is spaced from the container outer sidewall and grasping thereof is facilitated. Many other locking arrangements may be devised by those skilled in the art to secure the door 472 to the container 464.

Figure 34:
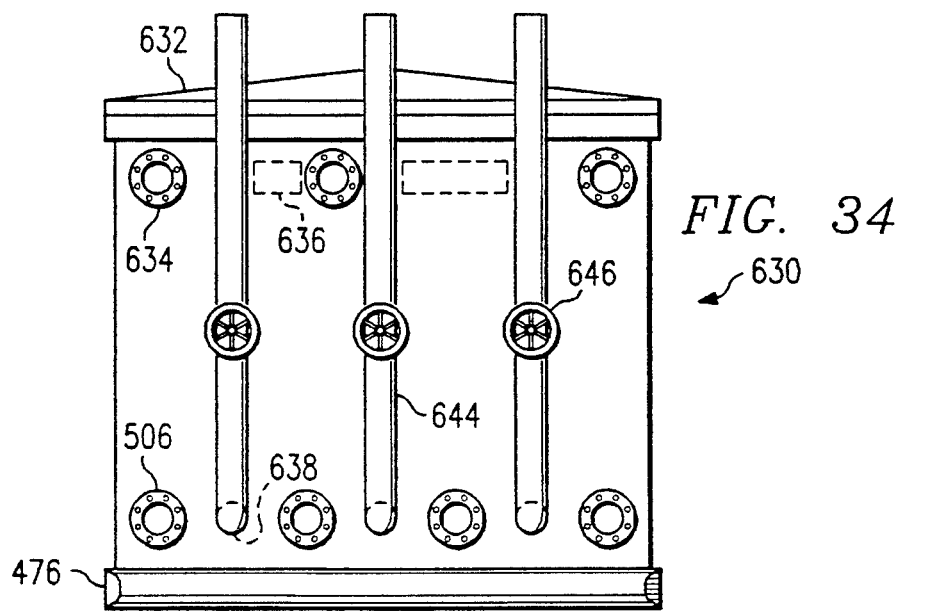
FIG. 34 is a frontal plan view of another embodiment of the decontamination container of the invention.
Figure 35:
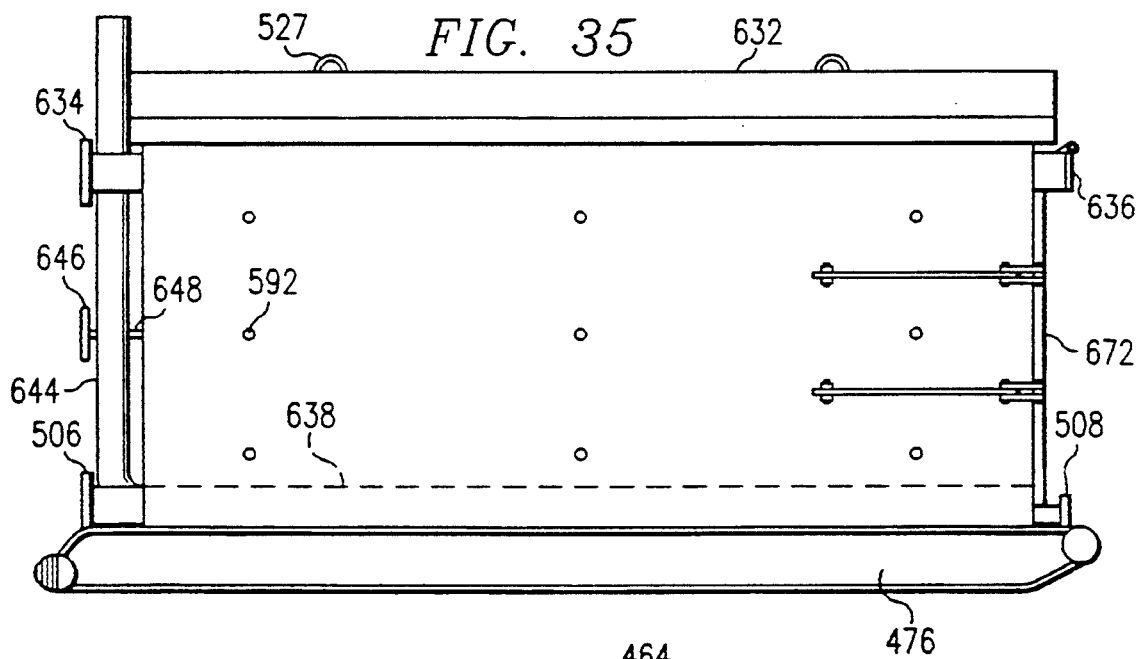
FIG. 35 is a side plan view of the container of FIG.

FIGS. 34 and 35 illustrate another embodiment of a decontamination unit adapted for incinerating the vaporized contaminants. The container 630 can have single or double sidewall construction, as described above, and insulated to increase the thermal efficiency. However, in this embodiment, the lid 632 functions solely as a cover to the container 630, without vapor outlets. Rather, one or more vent gas outlets 634 are constructed in the frontal sidewall of the container 630, preferably at the top in the air space area. It is contemplated that three six-inch diameter flanged pipes fabricated into the frontal wall of the container 630 will provide adequate area for removal of contaminated vapors from the container 630. Formed at the back part of the container 630 are one or more fresh air ports 636 functioning to admit fresh air into the container 630 for mixing with the contaminants that have been vaporized from the contaminated material loaded into the container 630. It is contemplated that a pair of fresh air ports 636, each having an opening of about twelve inches by six inches will provide adequate area for admitting a sufficient volume of make-up air to support combustion of fuel utilized to generate the thermal energy required in removing the contaminants from the contaminated material. While not shown, the fresh air ports 636 are open to the atmosphere, but can be provided with covers to prevent moisture or rain from entering the container.

Figure 37:
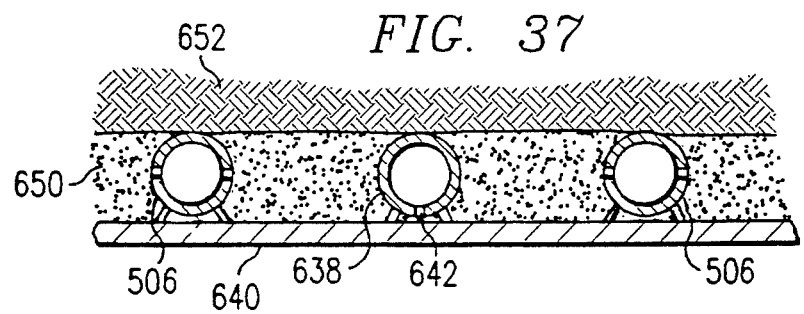
FIG. 37 is a sectional view of an arrangement of aggregate disposed on the floor of container decontamination unit.

The container 630 utilizes the injection pipes 506 welded to the container floor, as described above in the previous embodiment. The injection pipes 506 are flanged for connection to individual combustion chambers and associated burners, or connected to a manifold which, in turn, connects to one or more burners. Disposed between the injection pipes 506 are a number of exhaust pipes 638. FIG. 37 illustrates an exhaust pipe 638 supported slightly above the floor 640 of the container 630, and disposed between adjacent injection pipes 506. As noted, the injection pipes 506 each have holes formed laterally in the side walls thereof, while the exhaust pipes 638 have holes 642 formed in the bottom thereof, about one-half inch off the container floor 640. Plural holes 642 are formed along the bottom surface of each exhaust pipe 638. The back end of each exhaust pipe 638 is capped, while the front of each such pipe 638 extends through the frontal sidewall of the container 630, but is sealed therearound by welding, or the like. Further, and as illustrated in FIG. 35, each exhaust pipe 638 extends through the front sidewall of the container 630 and is directed upwardly above the top of the container for exhausting harmless gases into the air. Each vertical section 644 of the exhaust pipes includes an adjustable valve 646 that can be manually adjusted to control the flow of gases exhaust through the pipes 644. As will be explained in more detail below, the valves 646 are utilized to indirectly control the volume of fresh air admitted to the system control, the combustion in the burners, and thus, the temperature of the system. One or more standoffs 648 may be utilized to space the vertical section 644 of the exhaust pipes from the container, thereby facilitating movement of the lid 632 with respect to the container 630.

Figure 36:
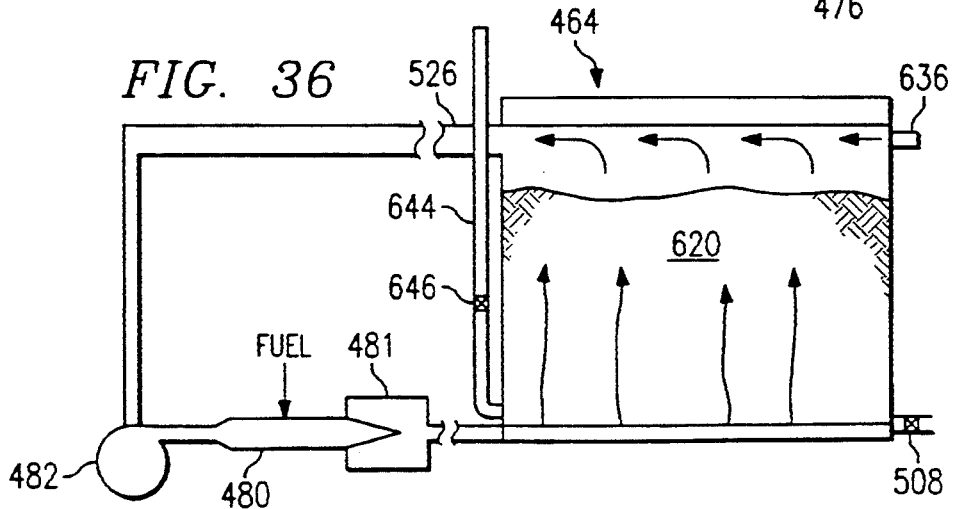
FIG. 36 is a schematic diagram of the decontamination system of the invention.

A closed loop system employing the container of FIGS. 34 and 35 is shown in FIG. 36. The vent pipes 634 are each connected to the input of a respective blower 482, the output of which is connected to a respective burner 480. Each burner 480 has an output coupled to a combustion chamber 481, and the output of the combustion chamber 481 is connected to the flanged input of the injection pipe 506. As can be seen from FIG. 36, the only air inlet to the closed loop system is via the fresh air inlets 636, and the only outlet of the system is via the exhaust pipes 644. As will be explained in more detail below, the valves 646 directly control the volume of gases exhaust from the system, which volume is less than the volume circulated through the system, thereby assuring incineration of the contaminated vapors. In order to assure a sufficient residence or contact time of the incinerated vapors, an exhaust to the system is provided out of the container 630, rather than at the output of the combustion chamber 481. Because of the relatively short contact time in the burners 480 and the associated combustion chambers 481, it is possible for trace amounts of hydrocarbons to escape destruction, due to imperfect mixing.

An increased contact time of hydrocarbons and other contaminated vapors is provided by the structure illustrated in FIG. 37. Here, an aggregate 650 is shoveled, or otherwise placed between the injection pipes 506 and the exhaust pipes 638. Preferably, the aggregate 650 is of a loose composition for allowing the flow of hot air therethrough, but is sufficiently large so as not to clog the holes in either the injection pipes 506 or the exhaust pipes 638. For processing material contaminated with hydrocarbons, the aggregate 650 can be small rocks or stones capable of withstanding the 1600° F. temperatures of the hot air injected into the pipes 506 and forced out of the holes in the sidewalls thereof. As can be appreciated, the aggregate 650 also becomes heated such that the hot air which is passed through the burner 480 and the combustion chamber 481 also passes through the hot aggregate 650 and exits the system via the exhaust pipes 638. It should be noted that the only gases that pass from the injection pipes 506 to the exhaust pipes 638 are incinerated gases, not the contaminated vapors.

As noted above, the rate at which the gases exit the system depends on the setting of the valves 646. The gases that pass from the injection pipe 506 to the exhaust pipes 638 is thereby controlled, and the path thereof is increased due to the aggregate 650, thereby increasing the residence time and assuring complete destruction of the contaminants. Preferably, the contact time of the gases depends on the type of aggregate and to the extent compacted, the exhaust rate of gases from the system, the spacing between the injection pipes 506 and the exhaust pipes 638, as well as other parameters. It is contemplated that the contact time utilizing the present invention will be greater than one second so that at 1200° F.-1500° F., the reaction goes to completion and only harmless gases are discharged into the atmosphere. As further noted in FIG. 37, the hydrocarbon contaminated material 652 can be loaded directly on the aggregate 650. The aggregate 650 need not be replenished every time a new load of contaminated material is processed.

The aggregate 650 can advantageously benefit the incineration process, especially when processing chlorinated hydrocarbons. When decontaminating chlorinated hydrocarbons, a hydrogen chloride gas is given off, which gas cannot be vented to the atmosphere. Rather, the hydrogen chloride gas itself must be removed before being exhausted to the atmosphere. Hence, when processing chlorinated hydrocarbons, the aggregate 650 can be graded and sized limestone such that when the hydrogen chloride passes therethrough, calcium chloride is formed, thereby tying up the chlorine in the aggregate 650. Limestone is an inexpensive and readily available aggregate that can be utilized in the bed of the container 630, in the path of the incinerated gases before being exhaust from the system. Other types of aggregate 650 can be utilized, such as iron shavings which, when reacted with hydrogen chloride, results in ferric chloride. Other aggregate materials such as sodium hydroxide and soda ash can also be utilized to destroy the hydrogen chloride gases and allow harmless gases to be exhausted to the atmosphere.

Figure 38:
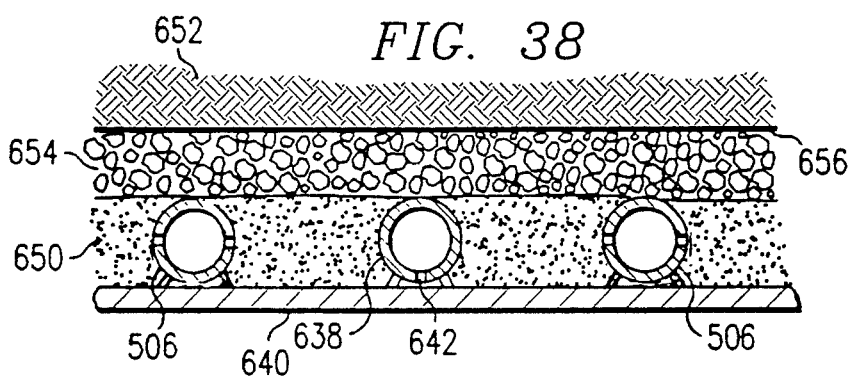
FIG. 38 is a sectional view depicting the use of a solid fuel in the container decontamination unit.

FIG. 38 illustrates another technique which increases the efficiency of the decontamination process carried out in either of the container embodiments described above, although FIG. 38 illustrates the apparatus of the container described in connection with FIGS. 34 and 35. An aggregate 650 is utilized around and above the injection pipes 506 and the exhaust pipes 638. Disposed above the aggregate 650 is a layer of solid fuel 654, such as coal. Other solid fuels can be utilized. Preferably, about a 1-2 inch layer of coal can simply be spread over the aggregate 650 so that when ignited, a source of heat internal to the container 630 is provided. In view that a solid fuel, such as coal, burns at a temperature of at least 2300° F., a substantial amount of thermal energy is generated, thereby expediting the decontamination process. As described above in connection with the embodiments utilizing solid fuel, the solid fuel can be ignited by hot air and then utilized as the sole source of thermal energy, or can be utilized in conjunction with the heat generated by a burner 480. The aggregate 650, or other material is utilized to prevent the floor and other metal structures of the container 630 from becoming too hot and susceptible to destruction.

Figure 39:
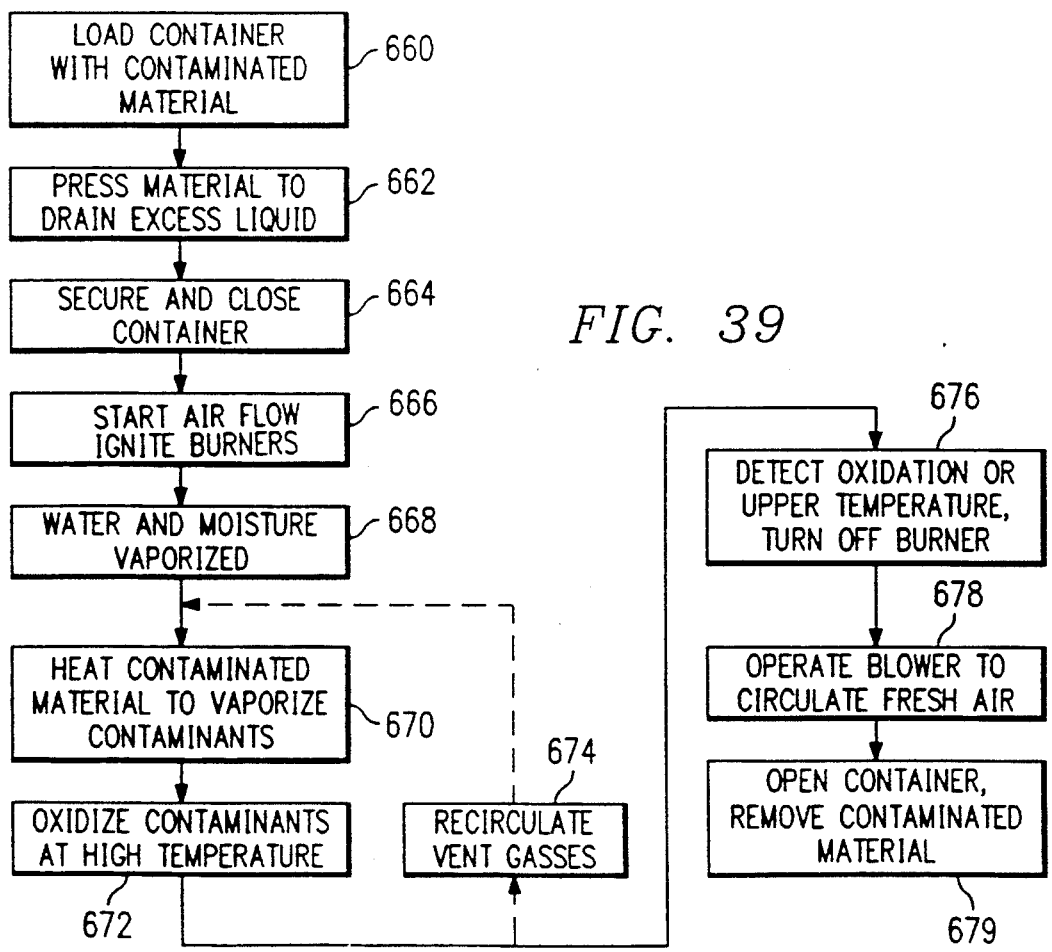
FIG. 39 is a flow chart of the steps carried out to decontaminate material using the mobile material decontaminator of the invention.

Am operational sequence for carrying out the decontamination process is illustrated in flow chart form in FIG. 39. The decontamination process is commenced by loading the container 630 with the contaminated material 652, leaving a sufficient air space above the material to allow the passage of the mixed contaminated vapors and fresh air to the vapor outlet 634. This is shown in block 660 of the flow chart. According to block 662, the excess liquid, if any, in the contaminated material 652 is allowed to drain out through the open drain 508. Liquid drainage can be facilitated by compressing the top of the contaminated material 652 with the bucket of a front end loader, or the like. Alternatively, excess liquid can be allowed to drain by simply allowing the material to remain for a period of time, such as 12-24 hours. Thereafter, temperature probes are inserted into the ports 592, the drain 508 is closed and the container 630 is closed, as noted in block 664. The blowers 482 are activated to start hot air circulation in the system and then the burners 480 are ignited. The exhaust pipe valves 646 are adjusted for a combustion chamber temperature of about 1500° F. Evaporated water and moisture are the first byproducts generated from the contaminated material 620 during the early stages of the contamination process. The process flow block 666 illustrates activation of the equipment, and step 668 shows the moisture vaporization step which continues while the temperature of the material 620 increases to around 200° F.–250° F. A number of temperature probes disposed in the instrumentation ports 592 can be utilized for measuring such parameter.

After a substantial amount of moisture has been removed from the contaminated material 620, the temperature of the contaminated material continues to increase because of the hot air forced into the container via the injection pipes 506. A pressure differential of about 3–5 psig exists between the top and bottom of the contaminated material 652. A maximum pressure exists at the bottom of the container 630, and essentially atmospheric pressure in the air space at the top. About 800 SCFM of air is compressed to about 3–8 psig, and heated by the burner 380 with a fuel, such as propane or other suitable fuel. As noted above, one or more burners 480 heat the compressed air to about 1600° F., or higher, as measured in the combustion chamber 481. The hot air enters the bottom of the container 630 and is forced upwardly from the holes in the injection pipes 506 through the contaminated material 652 which continues to rise in temperature and give off vapors, depending upon the type of contaminant and the temperature of volatilization thereof. This is depicted in block 670. The temperature of the contaminated material 652 is elevated gradually to an end point of about 900° F. or even higher to vaporize and oxidize all the contaminants. During the course of the temperature rise of the material 652, hydrocarbon contaminants are vaporized in an order of declining volatility, up to a temperature where none of the contaminants are sufficiently volatile to vaporize, namely, about 650°–750° F. During the course of the temperature rise of the material 652, the remaining water content is also vaporized, providing a reduction of partial pressure of the water insoluble hydrocarbons in the vapor phase, and thus increasing the driving force for vaporization of less volatile hydrocarbons. The water is evaporated over the initial temperature range from ambient to about 212° F. except for a very small amount of absorbed capillary moisture which may require temperatures ranging upwardly to about 300° F. This adsorbed moisture is of little consequence, and for all practical purposes may be ignored. The temperature at which the soil moisture is vaporized depends on the water vapor holding capacity of the air employed. Typically, most of the water initially evaporates between 140°–170° F.

During the decontamination process, the exhaust pipe valves 646 are adjusted to control the volume of incinerated gases removed from the system, which corresponds to the amount of fresh air entrained into the system. Since full combustion in the burners 482 is dependent on the availability of sufficient fresh air or oxygen, the valves 646 are adjusted to obtain optimum burner efficiency which, with the type of burners utilized, comprises a combustion temperature of about 1500° F. With insufficient fresh air, the temperature will drop, which is an indication to the operator to open the valves 646 to achieve a combustion chamber temperature of 1500° F. The temperature of the incinerated gases exhaust via pipes 644 is very close to the combustion chamber temperature. Importantly, the only valves controlling the volume of air and gases circulated in the system are the exhaust valves 646. It can De appreciated that the pressure differential between the ends of the exhaust pipes 644 is essentially equal to that in the contaminated material 652, and is controlled by the valves 646. It is contemplated that for every volume of incinerated gases vented through the exhaust pipes 644, about three volumes of gases will be circulated through the contaminated material 652, although a range of about 1:1 to 5:1 will provide acceptable results.

After the volatile hydrocarbons have been removed by vaporization, the involatile hydrocarbons, if any, are removed by slow oxidation occurring as the material 652 continues to be heated to 800°–900° F., as shown in block 672. At temperatures above about 650°–700° F., it is not necessary to incinerate or dispose of the vent gases and vapors since at such temperatures no volatile hydrocarbons are present.

In a closed loop decontamination system such as shown in FIG. 36, the vent gases are mixed with sufficient make-up air to support combustion, the mixture being recycled through the blower 482 and the burner 480, and the contaminated material 652. As noted above, it is contemplated that about 2–4 volumes of vent gas per volume of make-up air comprise the mixture that is recirculated through the burner/blower assemblies to be reheated and injected into the container 630. The burner 480 consumes the hydrocarbon vapors in the vent gas, which augments and reduces the amount of primary fuel required by the burner 480. The injection burner discharge is coupled via the Combustion chamber 481 to the injection pipes .506 for a residence time greater than one second, before at least a portion of the incinerated gas is vented to the atmosphere. The volume of gas exhausted from the system is replenished to the system as make-up air drawn in through the ports 636. The quantity of gas vented is controlled to maintain sufficient oxygen in the burner 480 and thus maintain the combustion chamber temperature at about 1600° F. If insufficient gas is vented, then the make-up air will be insufficient also, and the temperature within the system will begin to fall. Since the system is closed between the intake port 636 of the container 630 and the exhaust pipes 644, the make-up air, which enters and mixes with the vent gas from the material will automatically equate to the amount of incinerated gas discharged to the air. If excessive gas is vented, then oxygen available in the make-up air will exceed that needed to maintain the burner 480° at 1600° F., and the control of the temperature will revert to regulation of the amount of primary fuel. It can be appreciated that the amount of gas vented to the atmosphere can be increased within a suitable control range. Since the output of the blower 482 and burner 480 are preferably fixed, increasing the vent gas beyond that which provides a stoichiometric amount of oxygen to the burner 480, results in lower flow and thus slower heating of the contaminated material 652 and thus should be carefully monitored. In accordance with an important feature of the closed system of the invention, since about 2–4 volumes of air are passed through the contaminated material 652 for every volume vented, the amount of heat removed or exiting the system through the vent gas is greatly reduced. In other words, in contrast with a system in which all vent gases are first incinerated, or otherwise disposed of, and then exhausted, substantial energy is also lost. In the closed-loop system shown in FIG. 36, a substantial portion of the energy is maintained and recirculated in the system, thereby increasing the efficiency. In accordance with another feature of the invention, the requirements for incineration of the vaporized contaminants is reduced, as the recirculated vapors are incinerated in the high temperature burner 480 and reused as heated gases for further vaporization of the contaminants in the material 652. The recirculation of a portion of the vent gases is shown in flow diagram block 674.

A safety feature of the recycling system is also available. If the material 652 is excessively contaminated, the vent gases could have more than enough fuel to sustain temperature in the burner 480 (above a lower explosion concentration), in which event the vent gases cannot explode in the air space above the material 652 because the oxygen content will be insufficient. The result of this is that smoke will be noticed in the gases vented to the atmosphere. Corrective steps include reducing the primary fuel to maintain combustion chamber temperature, and throttling the burner 480 to reduce the amount of vent gases being cycled to the burner 480 until the smoke disappears.

As noted above, it is contemplated that the recirculation system will be operable for 10–12 hours to increase the temperature of the contaminated material 652 from about 150° F. to 212° F. for removal of moisture. Thereafter, the continued increase in temperature of the material 652 from about 212° F. to about 900° F. may take about ten hours, depending upon the type of material and extent of contamination. As noted above, the material temperature can be measured at various locations within the container 630 by the use of the probes inserted into the instrumentation ports 592. When the top portion of the material 652 reaches a temperature of about 900° F., it can be assured that most of the hydrocarbon contaminants have been vaporized and oxidized, whereupon the burner 480 can be turned off. Such steps are shown in block 676. The blower 482 is maintained operational (block 678) for a period of time to gradually cool the system down, as well as cool the decontaminated material in the container 630. 15 The exhaust valves 646 can be opened to bring in substantial cool outside air to facilitate the temperature reduction of the system. It is contemplated that about four-five hours will be necessary to reduce the temperature of the system so that the container 630 can be opened, preferably by way of the hinged door 472 to remove the decontaminated material. This final step of the process is shown in flow diagram block 679.

In the foregoing remediation systems, the source of hot air or gases is generated from a location remote from the actual perforated pipes, whether installed vertically in the ground, or horizontally in the ground or on the surface of the ground. While burners are available for generating the high temperature air required for volatilization and oxidation of contaminants, a certain amount of thermal energy is lost in transferring the heat to the perforated piping systems. Indeed, even though the surface pipes are insulated, the thermal energy lost between the burner and the perforated pipes can be as much as 300° F. With such an energy loss, the efficiency of the system is compromised. FIGS. 40 and 41 depict a technique for improving the efficiency of a hot gas remediation system by employing one or more burners connected directly to the perforated pipe, as shown in FIG. 40, or to a manifold as shown in FIG. 41.

With regard to FIG. 40, there is illustrated a casing 680 having perforations (not shown) along its length for dispersing the hot gases into the contaminated formation. A high temperature refractory material or mortar 682 is filled in around the upper portion of the casing 680 for withstanding the high temperatures experienced at the upper portion of the casing 680. A combustion chamber 684 is adapted for mounting a high temperature burner 686 to the casing 680. The combustion chamber 684 comprises an upper high temperature chamber 688 and a reducer 690 that is fixed by way of a flanged arrangement 692 to the casing 680. The combustion chamber 684 is constructed of a refractory material, such as Brick Cast 3000. In the preferred embodiment of the invention, the cylindrical portion of the combustion chamber 688 has an inside diameter of about 4.4 inches, and is about 2.5 foot in height. Another flanged arrangement 694 allows the burner 686 to be bolted directly atop the combustion chamber 688. The burner 686 has a fuel inlet 696 and is fired by 25 natural gas, or other fuels. A compressed air line 698 is connected to the top of the burner 686 for providing a supply of compressed air thereto so that the air can be heated and forced into the casing 680. Burners adapted for operating with pressurized air sources are available from Eclipse Combustion Division as type 84-10TBH. By providing a substantially constant stream of pressurized air to the burner 686, the output temperature thereof can be controlled by regulating the flow of fuel via line 696.

FIG. 41 illustrates the burner 686 coupled to a right angle combustion chamber 700. In this embodiment, the combustion chamber 700 allows the burner 686 to remain operating in an upright position, while redirecting the hot gases laterally into the manifold 392, such as shown above in FIG. 11. With respect to FIG. 21 in conjunction with FIG. 41, it should be noted that a burner 686 and corresponding combustion chamber 700 can be connected to one or more of the manifold sections 394, with the unused 10 manifold sections capped at the flange 396. In order to provide an efficient distribution of hot air to the manifold 392, a single burner assembly (FIG. 41) can be connected to the center manifold section, or if two burner assemblies are utilized, they can be connected to the 15 second and fourth manifold sections. If a significant amount of thermal energy is required for quickly heating the contaminated soil, a burner assembly can be connected directly to each of the input manifold sections shown in FIG. 21.

With regard to FIG. 41, the carbon steel end plate 702 is formed integral with the refractory material of the combustion chamber 704, as is a similar end plate 706 to the other face of the combustion chamber. A stainless steel flanged member 708 is welded to the end plate 702 and thereby fixed to the body 704 of the combustion chamber. The flanged member 708 has formed therein threaded studs 710 for fastening a flanged part of the burner 686 thereto. Threaded studs 712 are similarly fixed with respect to the end plate 706 so that the entire burner assembly can be fastened to the manifold 392. In order to withstand the substantial high temperatures generated by the burner 686, the combustion chamber body 704 is formed of a refractory Brick Cast 3000 material. A coupling 714 is formed in the refractor combustion chamber body for instrumentation purposes. Further, a pair of eye members 716 are formed integral with the combustion chamber body 704 to allow lifting or otherwise support to the burner assembly.

In view of the embodiments shown in FIGS. 40 and 41, those skilled in the art may readily realize that horizontal-operating burners can be utilized with similarly constructed combustion chambers so that the generation of the thermal energy can take place directly at the entrance of the perforated piping systems.

While the preferred and other embodiments of the invention have been disclosed with reference to specific hot gas injection apparatus and methods, it is to be understood that many changes in detail may be made as a matter of engineering choices without departing from the spirit and scope of the invention, as defined by the appended claims. Further, various different combinations of the apparatus described above can be utilized together to carry out decontamination processes.

What is claimed is:

1. Apparatus for decontaminating material, comprising:
   a container having at least one opening for transferring contaminated material with respect to an interior of the container;
   a cover for covering said opening;
   an injection inlet for delivering a heated gas into said container;
   a vapor outlet for removing vapors from said container;
   a burner/blower assembly coupled to said injection inlet for supplying the heated gas to the interior of said container for raising the temperature of contaminated material in said container and for vaporizing the contaminants, and said burner/blower assembly coupled to said vapor outlet to define a closed-loop system; and
   an exhaust outlet of said container and a fresh air inlet to said container.

2. The decontamination system of claim 1, further including means for recirculating vaporized contaminants removed from the material back to the burner for reheating and incineration thereof.

3. The decontamination system of claim 2, further including means for recirculating the incinerated vapors as a heated gas through the contaminated material.

4. The decontamination system of claim 1, further including an inlet to said apparatus for supplying make-up air to the burner, and an outlet from said apparatus for removing harmless vapors.

5. The decontamination system of claim 1, further including a blower for forcing heated air into the container via said injection inlet.

6. The decontamination system of claim 1, further including a combustion chamber connected directly to said container inlet, a high temperature burner connected to said combustion chamber, and a source of pressurized air coupled to said burner.

7. The decontamination system of claim 1, wherein said cover comprises a lid and a seal for sealing to said container opening, and wherein said vapor outlet comprises an apertured pipe formed along a length of the lid, said apertured pipe for drawing vaporized contaminants therethrough.

8. The decontamination system of claim 7, wherein said lid includes a skirt that fits over sidewalls of the container.

9. The decontamination system of claim 8, further including a hinged door attached to one sidewall of the container, said lid skirt overhanging a portion of said door to provide support thereto.

10. The decontamination system of claim 1, wherein said injection inlet is connected to a hot air distribution pipe having a plurality of holes therein.

11. The decontamination system of claim 1, wherein said container is mounted on a first skid, and further including in combination a blower for pressurizing air to be heated by said burner, and wherein said burner, blower and a disposal unit is mounted on a second skid, and wherein said second skid is fittable within said container opening and transported with said first skid.

12. The decontamination system of claim 1, wherein said exhaust outlet comprises apertured pipes inside said container, and said injection inlets comprise apertured pipes inside said container for transferring at least a portion of incinerated vapors therefrom to said exhaust outlets.

13. The decontamination system of claim 12, wherein said exhaust outlet comprises the only outlet of said closed loop system, and further including an adjustable valve for controlling the extent of incinerated vapors exhaust from said system.

14. The decontamination system of claim 12, further including a material disposed between said injection inlets and said exhaust outlet for removing hydrogen chloride.

15. A container for use in decontaminating material, comprising:
   an enclosure having insulated sidewalls, and an opening for transfer of material with respect to an interior portion of the enclosure;
   an insulated cover for covering the container opening;
   a seal disposed between the enclosure and the cover to prevent the passage of air or gas therebetween;
   a perforated structure for carrying a hot gas and for distributing the hot gas to the interior of the enclosure;
   a liquid drain located in a bottom portion of said enclosure;
   an injection inlet coupled to the perforated structure, said injection inlet being adapted for connection to a source of heated gas; and
   said enclosure including a vapor outlet adapted for connection to a vapor disposal unit for transferring vapors from the interior of the enclosure to the vapor disposal unit.

16. The container of claim 15, further including a door hinged to said enclosure, and a seal disposed between the door and the enclosure.

17. The container of claim 15, wherein the enclosure is double walled with an insulating material therebetween.

18. The container of claim 15, wherein said cover is insulated.

19. The container of claim 15, wherein said perforated structure includes a plurality of pipes with holes therein.

20. The container of claim 19, wherein said plurality of pipes are each fixed in a floor structure of the enclosure.

21. The container of claim 16, wherein said lid includes a skirting structure that overhangs a portion of the door to prevent opening of the door when the lid rests on the container.

22. The container of claim 15, wherein said seal comprises a channel with a rope packing held therein.

23. The container of claim 15, wherein said cover is constructed of metal and has substantial weight to deform said seal and provide a substantially airtight seal.

24. A method of decontaminating material, comprising the steps of:
   loading a container through an opening therein with contaminated material;
   closing the container so as to prevent undesired escape of contaminants therefrom;
   heating air with a burner to produce hot air;

forcing the hot air into an interior of the container so that the hot air circulates through the contaminated material and vaporizes the contaminants;

mixing the vaporized contaminants with fresh air to form a mixture and circulating the mixture to the burner to facilitate combustion;

recirculating the hot air resulting from the combustion of the mixture back through the contaminated material; and removing decontaminated material by opening a door on the container and removing the decontaminated material.

25. The method of claim 24, further including connecting a portable burner to the container for supplying a hot gas to the interior of the container.

26. The method of claim 24, further including injecting hot gases into a bottom portion of the container and distributing the hot gases generally uniformly into the contaminated material at the bottom of the container.

27. The method of claim 26, further including injecting the hot gases into perforated pipes located adjacent the bottom of the container so that the hot gases are uniformly dispensed into the contaminated material via the perforations in the pipes.

28. The method of claim 24, wherein a top of the container is sealed by using a flexible seal and using the weight of a lid, thereby sealing the lid to the container.

29. The method of claim 24, further including connecting each of a plurality of hot gas inlets to the container to a respective individual combustion chamber, and connecting respective inlets of the combustion chambers to a burner.

30. The method of claim 24, further including exhausting hot gases from the container to the atmosphere.

31. The method of claim 30, further including controlling the amount of hot gases exhaust from the container to control the temperature of hot gases injected into the container.

32. The method of claim 24, further including passing hot gases injected into the container through a heat ballast material and then exhausting the hot gases from the container, thereby increasing a residence time of the contaminants during destruction thereof.

33. The method of claim 24, further including passing the vaporized contaminants through a limestone to prevent the exhausting of chlorinated hydrocarbons.

34. The method of claim 24, further including placing a solid fuel in said container which can be ignited to provide additional thermal energy to enhance the decontamination process.

35. The method of claim 34, further including igniting the solid fuel with the hot gases injected into the container.

36. The method of claim 24, further including processing the vaporized contaminants removed from the container by directing such contaminants through a burner to increase the temperature thereof by reheating to incinerate the contaminants, injecting the reheated gas back into the container and exhausting incinerated contaminants from exhaust ports in the container.

37. A container for use in decontaminating material, comprising:

an enclosure having insulated sidewalls, and an opening for transfer of material with respect to an interior portion of the enclosure;

an insulated lid for covering the container opening and being removable from said opening;

a seal disposed between the enclosure and the lid to prevent the passage of air or gas therebetween;

a perforated structure for carrying a hot gas and for distributing the hot gas to the interior of the enclosure;

an injection inlet coupled to the perforated structure, said injection inlet being adapted for connection to a source of heated gas; and said enclosure including a vapor outlet formed integral with said lid, said vapor outlet being adapted for connection to a vapor disposal unit for transferring vapors from the interior of the enclosure to the vapor disposal unit.

38. A container for use in decontaminating material, comprising:

an enclosure having insulated sidewalls, and an opening for transfer of material with respect to an interior portion of the enclosure;

an insulated cover for covering the container opening;

a seal disposed between the enclosure and the cover to prevent the passage of air or gas therebetween;

a perforated structure located in said enclosure for carrying a hot gas and for distributing the hot gas to the interior of the enclosure;

an injection inlet coupled to the perforated structure, said injection inlet being adapted for connection to a source of heated gas;

said enclosure including a vapor outlet adapted for connection to a vapor disposal unit for transferring vapors from the interior of the enclosure to the vapor disposal unit; and a skid for mounting said container thereon.

39. A method of decontaminating material, comprising the steps of:

loading a container through an opening therein with contaminated material;

opening an outlet at a bottom of the container to drain liquid therefrom;

closing the container so as to be sealed to prevent undesired escape of contaminants therefrom;

forcing hot air into an interior of the container so that the hot air circulates through the contaminated material and is collected in a space between the top of the container and a top surface of the contaminated material;

removing vaporized contaminants from the space at the top of the container and disposing of the contaminants; and removing decontaminated material by opening a door on the container and removing the decontaminated material.

40. A method decontaminating material, comprising the steps of:

loading a container through an opening therein with contaminated material;

closing the container so as to be sealed to prevent undesired escape of contaminants therefrom;

forcing hot air of a temperature of at least 1200° F. into an interior of the container so that the hot air circulates through the contaminated material and volatizes contaminants therein, the volatized contaminants collecting in a space between the top of the container and a top surface of the contaminated material;

removing the volatized contaminants from the space at the top of the container and disposing of the contaminants; and removing decontaminated material by opening a door on the container and removing the decontaminated material.

41. A method of decontaminating material, comprising the steps of:

loading a container through an opening therein with contaminated material;

closing the container so as to be sealed to prevent undesired escape of contaminants therefrom;

forcing hot air into an interior of the container so that the hot air circulates through the contaminated material and is collected in a space between the top of the container and a top surface of the contaminated material;

monitoring sensors disposed in sidewalls of the container to obtain desired parameters of the contaminated material during removal of the contaminants;

removing vaporized contaminants from the space at the top of the container and disposing of the contaminants; and removing decontaminated material by opening a door on the container and removing the decontaminated material.

42. The method of claim 24, further including controlling the amount of fresh air mixed with the vaporized contaminants by controlling a valve for exhausting air heated by the burner.

43. The method of claim 24, further including exhausting hot combustion gasses by passing a portion of hot combustion gases from perforated injection pipes disposed within the container to perforated exhaust pipes spaced in said container from said injection pipes, and carrying the portion of hot combustion gasses from the exhaust pipes external to the container for disposal thereof.

44. The method of claim 43, further including passing the portion of hot combustion gasses from the perforated injection pipes to the exhaust pipes without passing through the contaminated material.

45. The method of claim 24, further including admitting the fresh air via fresh air inlets in said container.

46. Apparatus for decontaminating material, comprising:

a container having a top opening in which contaminated material can be dumped into the container, and a side opening through which decontaminated material can be removed for the container;

a movable lid for covering the top opening of the container;

a door hinged to the container for covering the side opening of the container;

a drain located at a bottom portion of the container, and a valve for closing the drain;

a hot air injection inlet system located at a bottom portion of the container, including a perforated structure for allowing hot air to be distributed into the container and rise through contaminated material dumped therein;

a vapor outlet located near a top portion of the container to allow contaminated vapors to be removed from the container;

a burner/blower arrangement, including a blower having an inlet coupled to the vapor outlet of the container, a blower outlet coupled to a burner for heating and incinerating vaporized contaminants, said burner having an outlet coupled to the hot air injection inlet system for providing a source of hot air to the container;

a fresh air inlet for admitting fresh air for combustion of the vaporized contaminants by said burner; and an exhaust outlet for allowing removal from said apparatus of a portion of incinerated vaporized contaminants, and a remaining portion thereof being recirculated through the contaminated material and for reheating by said burner before being removed via said exhaust outlet.

* * * * *